United States Patent
Yao et al.

(10) Patent No.: US 12,352,937 B2
(45) Date of Patent: Jul. 8, 2025

(54) ZOOM LENS, CAMERA MODULE, AND TERMINAL DEVICE

(71) Applicant: Huawei Technologies Co., Ltd., Shenzhen (CN)

(72) Inventors: Xiuwen Yao, Wuhan (CN); Shaopan Zhou, Dongguan (CN); Zhantao Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 17/948,335

(22) Filed: Sep. 20, 2022

(65) Prior Publication Data
US 2023/0023354 A1 Jan. 26, 2023

Related U.S. Application Data

(63) Continuation of application No. PCT/CN2021/080554, filed on Mar. 12, 2021.

(30) Foreign Application Priority Data

Mar. 20, 2020 (CN) .......................... 202020369892.3

(51) Int. Cl.
G02B 15/14 (2006.01)
(52) U.S. Cl.
CPC ................ *G02B 15/144113* (2019.08); *G02B 15/144105* (2019.08)
(58) Field of Classification Search
None
See application file for complete search history.

(56) References Cited

U.S. PATENT DOCUMENTS

| 5,798,872 A | * | 8/1998 | Uzawa | G02B 15/144113 |
| | | | | 359/686 |
| 6,510,008 B1 | * | 1/2003 | Miyauchi | G02B 15/144113 |
| | | | | 359/686 |

(Continued)

FOREIGN PATENT DOCUMENTS

| CN | 101414050 A | 4/2009 |
| CN | 102455496 A | 5/2012 |

(Continued)

OTHER PUBLICATIONS

Chapter 10: Seven ways to achieve optical zoom in mobile phone cameras, URL:https://blog.csdn.net/donghuaisuo/article/details/80176726, Posted at May 3, 2018, 6 pages.

*Primary Examiner* — Darryl J Collins
(74) *Attorney, Agent, or Firm* — Conley Rose, P.C.

(57) ABSTRACT

A zoom lens includes a first lens group, a second lens group, a third lens group, and a fourth lens group that are sequentially arranged from an object side to an image side along an optical axis. The first lens group and the third lens group are fastened, and the second lens group and the fourth lens group move along the optical axis. A first lens from the object side in the first lens group is a biconvex lens, and at least two lenses from the object side in the first lens group are glass lenses. A maximum clear aperture diameter of the zoom lens has the following relationship of 4 mm≤φ≤12 mm, where φ is the maximum clear aperture diameter of the zoom lens.

20 Claims, 56 Drawing Sheets

Embodiment 1

(56) References Cited

U.S. PATENT DOCUMENTS

| | | | |
|---|---|---|---|
| 2003/0072087 A1* | 4/2003 | Hoshi | G02B 15/144113 359/687 |
| 2004/0169934 A1 | 9/2004 | Oomura et al. | |
| 2007/0229985 A1 | 10/2007 | Nakatani et al. | |
| 2012/0099209 A1 | 4/2012 | Huang et al. | |
| 2014/0132830 A1* | 5/2014 | Izuhara | G02B 13/001 359/683 |
| 2014/0177068 A1* | 6/2014 | Tomioka | G02B 15/173 359/687 |
| 2015/0002943 A1* | 1/2015 | Ono | G02B 15/144113 359/684 |
| 2018/0299642 A1 | 10/2018 | Yonezawa et al. | |
| 2020/0124833 A1* | 4/2020 | Machida | G02B 15/145121 |
| 2020/0310089 A1* | 10/2020 | Aoki | G02B 9/34 |
| 2023/0023354 A1 | 1/2023 | Yao et al. | |

FOREIGN PATENT DOCUMENTS

| | | |
|---|---|---|
| CN | 102789044 A | 11/2012 |
| CN | 102998779 A | 3/2013 |
| CN | 107193117 A | 9/2017 |
| CN | 107957622 A | 4/2018 |
| CN | 108474927 A | 8/2018 |
| CN | 106842527 B | 9/2019 |
| CN | 110673315 A | 1/2020 |
| CN | 110749987 A | 2/2020 |
| CN | 212111958 U | 12/2020 |
| CN | 110764237 B | 12/2021 |
| JP | H0593862 A | 4/1993 |
| JP | H06230317 A | 8/1994 |
| JP | H06324265 A | 11/1994 |
| JP | 2003107347 A | 4/2003 |
| JP | 2005309059 A | 11/2005 |
| JP | 2007328006 A | 12/2007 |
| JP | 2009237400 A | 10/2009 |
| JP | WO2013125603 A1 | 7/2015 |
| JP | 2016118736 A | 6/2016 |
| JP | 2016118737 A | 6/2016 |
| JP | 2020086073 A | 6/2020 |
| JP | 2020160198 A | 10/2020 |
| WO | 2012063711 A1 | 5/2012 |
| WO | 2013027364 A1 | 2/2013 |

* cited by examiner

Embodiment 1

Embodiment 2

Embodiment 3

Embodiment 4

Embodiment 6

Embodiment 7

Embodiment 8

Embodiment 9

Embodiment 10

Embodiment 11

Embodiment 12

Embodiment 13

Embodiment 14

ZOOM LENS, CAMERA MODULE, AND TERMINAL DEVICE

CROSS-REFERENCE TO RELATED APPLICATIONS

This application is a continuation application of International Patent Application No. PCT/CN2021/080554, filed on Mar. 12, 2021, which claims priority to Chinese Patent Application No. 202020369892.3, filed on Mar. 20, 2020. The disclosures of the aforementioned applications are hereby incorporated by reference in their entireties.

TECHNICAL FIELD

This application relates to the field of optical device technologies, and in particular, to a zoom lens, a camera module, and a terminal device.

BACKGROUND

In recent years, with development of technologies, zoom lenses have been widely used in terminal products such as mobile phones. Currently, to balance wide-angle zoom, standard zoom, and telephoto zoom in a terminal product such as a mobile phone, two or three lenses with different focal lengths are usually used together, to form a hybrid optical zoom lens through algorithm-based digital zoom.

However, hybrid optical zoom is essentially continuous zoom implemented based on a plurality of lenses with different focal lengths and through algorithm processing, namely, "jump-type zoom". This causes limited imaging definition of the hybrid optical zoom lens when a focal length of the hybrid optical zoom lens is between different focal lengths of the zoom lenses, and thus causes poor imaging quality of a terminal device equipped with the hybrid optical zoom lens.

SUMMARY

An objective of embodiments of this application is to provide a zoom lens, a camera module, and a terminal device, to resolve a technical problem of poor imaging quality of a terminal device equipped with a hybrid optical zoom lens in the conventional technology.

To achieve the foregoing objective, technical solutions used in this application are as follows.

According to a first aspect, a zoom lens is provided, including a first lens group, a second lens group, a third lens group, and a fourth lens group that are sequentially arranged from an object side to an image side along an optical axis. The first lens group and the third lens group are fixedly disposed.

The second lens group is a focusing group and moves along the optical axis, and the fourth lens group is a compensation group and moves along the optical axis with the second lens group. Alternatively, the fourth lens group is a focusing group and moves along the optical axis, and the second lens group is a compensation group and moves along the optical axis with the fourth lens group. The first lens group and the third lens group are fixedly disposed to form a fixed group of zoom lens. The second lens group and the fourth lens move along the optical axis. In this way, when zoom is performed from a wide-angle end to a telephoto end, the second lens group and the fourth lens group move along the optical axis at the same time, to implement zoom and compensation for an aberration generated during zoom. In addition, this can meet a high zoom ratio of the zoom lens, and maintain good imaging definition of the zoom lens.

A first lens from the object side in the first lens group is a biconvex lens. This can improve light converging performance of the first lens group, and prolong a back focal length of the zoom lens, so that the zoom lens has good imaging effect and a thickness of the zoom lens is reduced as much as possible. In addition, at least two lenses from the object side in the first lens group are glass lenses. In this way, deep processing can be implemented on the two lenses close to the object side, so that the two lenses can be thin and have a good optical path adjustment capability.

A maximum clear aperture diameter of the zoom lens meets the following relationship: 4 millimeters (mm)$\leq \varphi \leq$12 mm, where $\varphi$ is the maximum clear aperture diameter of the zoom lens. The maximum clear aperture diameter of the zoom lens is set within a range from 4 mm to 12 mm. This can effectively reduce an overall height of the zoom lens, and improve luminous flux of the zoom lens. Due to the foregoing factors, this can improve overall imaging quality of the optical focal lens. In addition, the zoom lens can be made smaller, and can be easily used in a thin terminal device. In this way, the terminal device equipped with the zoom lens can implement continuous zoom, and maintain good imaging definition.

Optionally, the zoom lens meets the following relationship: $0.8 \leq TTL/ft \leq 1.5$, where TTL is a total optical length of the zoom lens, and ft is an effective focal length at a telephoto end of the zoom lens. A ratio of the total optical length to the effective focal length at the telephoto end of the zoom lens is set within a range from 0.8 to 1.5. In this way, the zoom lens can maintain a good width of an angle of view and a good zoom ratio, and can also correct an off-axis aberration.

Optionally, the zoom lens meets the following relationship: $0.02 \leq IMH/ft \leq 0.2$, where IMH is a height from an imaging edge to a center of an imaging plane of a lens of the zoom lens, and ft is an effective focal length at a telephoto end of the zoom lens. A ratio of the image height of the zoom lens to the effective focal length at the telephoto end of the zoom lens is set within a range from 0.02 to 0.2. This can improve the zoom ratio of the zoom lens, and reduce a total height of the zoom lens at the same time.

Optionally, the first lens group, the third lens group, and the fourth lens group have positive focal power, and the second lens group has negative focal power.

Optionally, the first lens group and the third lens group have positive focal power, and the second lens group and the fourth lens group have negative focal power.

Optionally, the first lens group meets the following relationship: $0.2 \leq f1/ft \leq 2.3$, where f1 is a focal length of the first lens group, and ft is an effective focal length at a telephoto end of the zoom lens. A ratio of the focal length of the first lens group to the effective focal length at a telephoto end of the zoom lens is set within a range from 0.2 to 2.3. This can effectively improve a light converging capability of the first lens group, and help reduce an axial chromatic aberration.

Optionally, the second lens group meets the following relationship: $0.02 \leq f2/ft \leq 0.6$, where f2 is a focal length of the second lens group, and ft is an effective focal length at a telephoto end of the zoom lens.

Optionally, the third lens group meets the following relationship: $0.1 \leq f3/ft \leq 4.5$, where f3 is a focal length of the third lens group, and ft is an effective focal length at a telephoto end of the zoom lens.

Optionally, the fourth lens group meets the following relationship: $0.12 \leq f4/ft \leq 200$, where f4 is a focal length of the fourth lens group, and ft is an effective focal length at a telephoto end of the zoom lens. In this way, the fourth lens group can widely compensate for an aberration generated by the second lens group in an entire moving process.

Optionally, a ratio of an effective focal length ft at a telephoto end of the zoom lens to an effective focal length fw at a wide-angle end of the zoom lens meets the following relationship: $1 \leq ft/fw \leq 3.7$.

Optionally, a ratio of a movement distance D1 of the second lens group along the optical axis to a total optical length TTL of the zoom lens meets the following relationship: $0.02 \leq D1/TTL \leq 0.3$.

A ratio of a movement distance D2 of the fourth lens group along the optical axis to the total optical length TTL of the zoom lens meets the following relationship: $0.02 \leq D2/TTL \leq 0.35$.

Optionally, a total quantity N of lenses included in the first lens group, the second lens group, the third lens group, and the fourth lens group meets the following relationship: $7 \leq N \leq 12$.

Optionally, a total quantity S of aspheric surfaces of the lenses included in the first lens group, the second lens group, the third lens group, and the fourth lens group meets the following relationship: $N \leq S \leq 2N$. This further achieves a high zoom ratio of the zoom lens and effectively reduces a total length or a total height of the zoom lens.

Optionally, the lens is a lens with a special-shaped aperture.

Optionally, a height H of the lens with a special-shaped aperture along an edge direction of the lens with a special-shaped aperture meets the following relationship: $4 \text{ mm} \leq H \leq 6 \text{ mm}$.

Optionally, the zoom lens further includes a prism and/or a mirror reflector, and the prism and/or the mirror reflector are/is disposed on a side of the first lens group facing the object side, and are/is configured to deflect a light ray to the first lens group.

According to a second aspect, a camera module is provided, including the foregoing zoom lens.

The camera module provided in this embodiment of this application includes the zoom lens. The zoom lens can implement continuous zoom, and improve overall imaging quality and miniaturization potential of the optical focal lens. In this way, the camera module with the zoom lens can improve imaging quality, and implement miniaturization.

According to a third aspect, a terminal device is provided, including the foregoing camera module.

The terminal device provided in this embodiment of this application includes the camera module. The terminal device with the foregoing disposed module implements continuous zoom by using one lens, and thereby changes a conventional mode in which a plurality of lenses perform "jump-type zoom". This significantly improves imaging definition in a continuous zoom process, and reduces assembly space of the lens.

Figure 1:
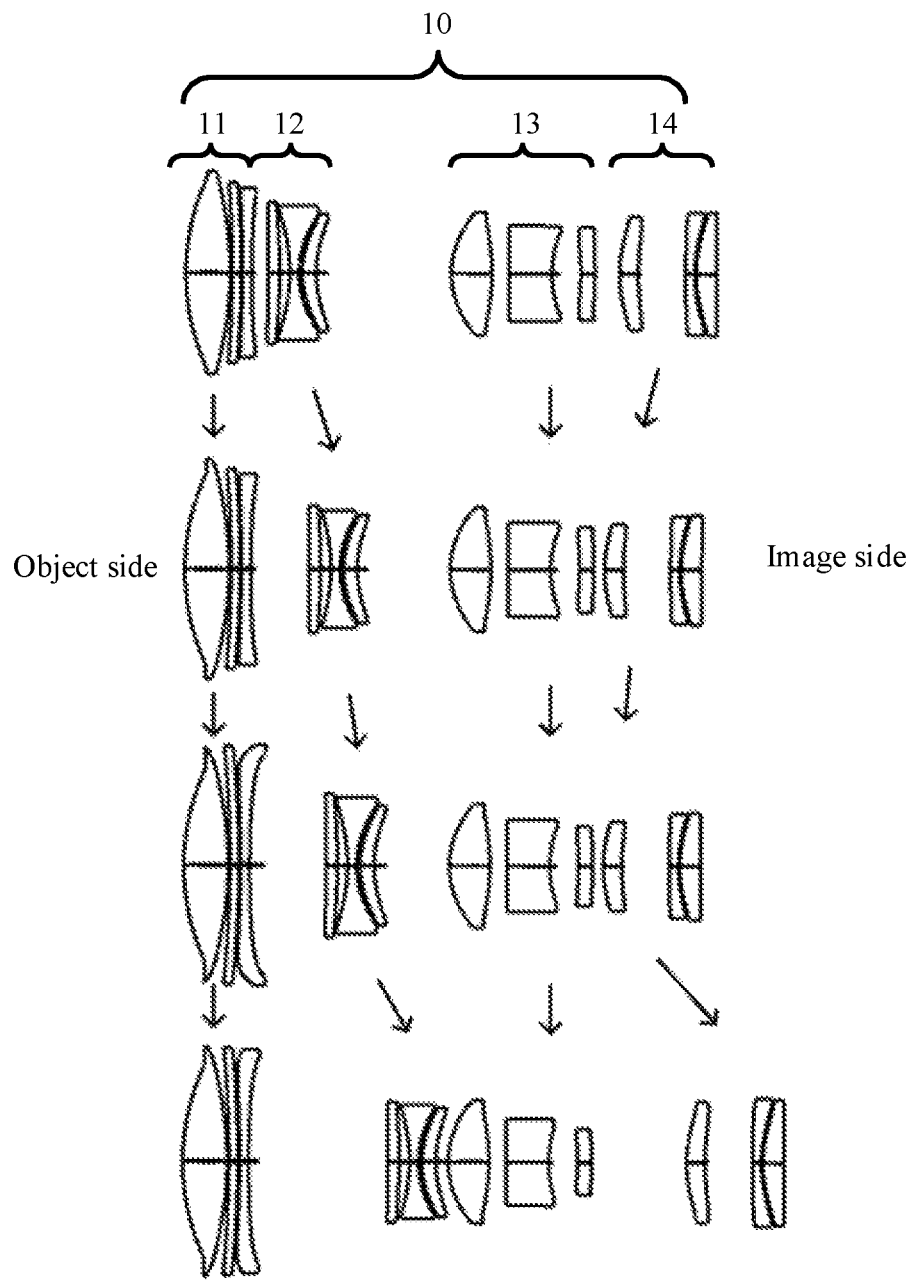
FIG. 1 is a schematic diagram of moving statuses of a second lens group and a fourth lens group when a zoom lens changes from a wide-angle state to a telephoto state according to an embodiment of this application.
Figure 2:
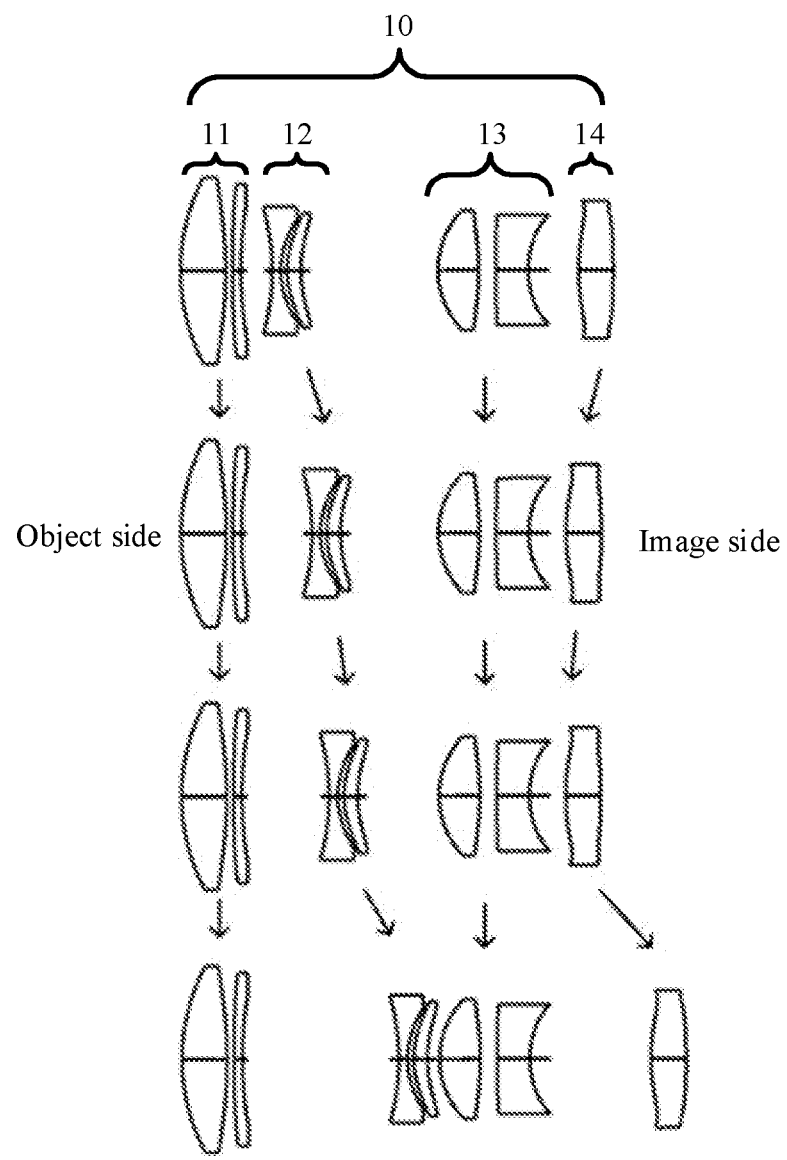
FIG. 2 is a schematic diagram of moving statuses of a second lens group and a fourth lens group when a zoom lens changes from a wide-angle state to a telephoto state according to an embodiment of this application.
Figure 3:
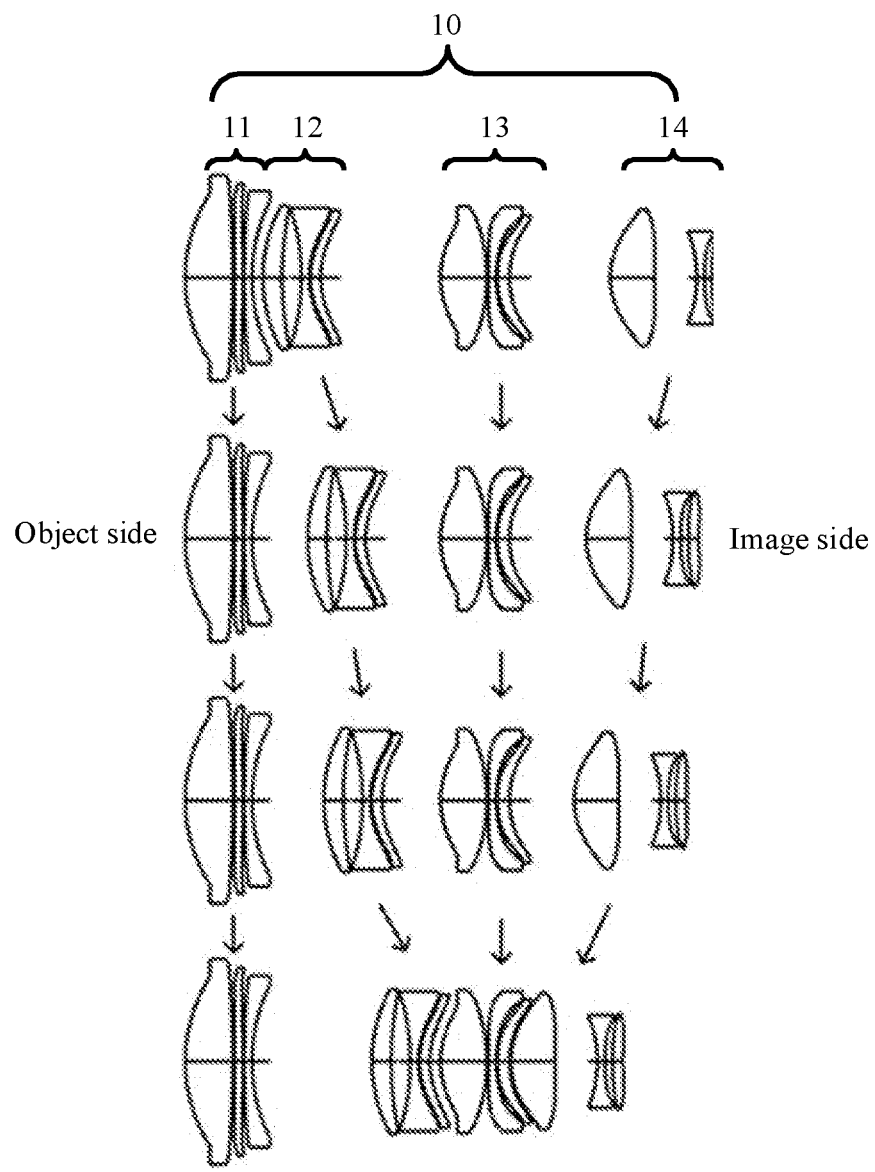
FIG. 3 is a schematic diagram of moving statuses of a second lens group and a fourth lens group when a zoom lens changes from a wide-angle state to a telephoto state according to an embodiment of this application.
Figure 4:
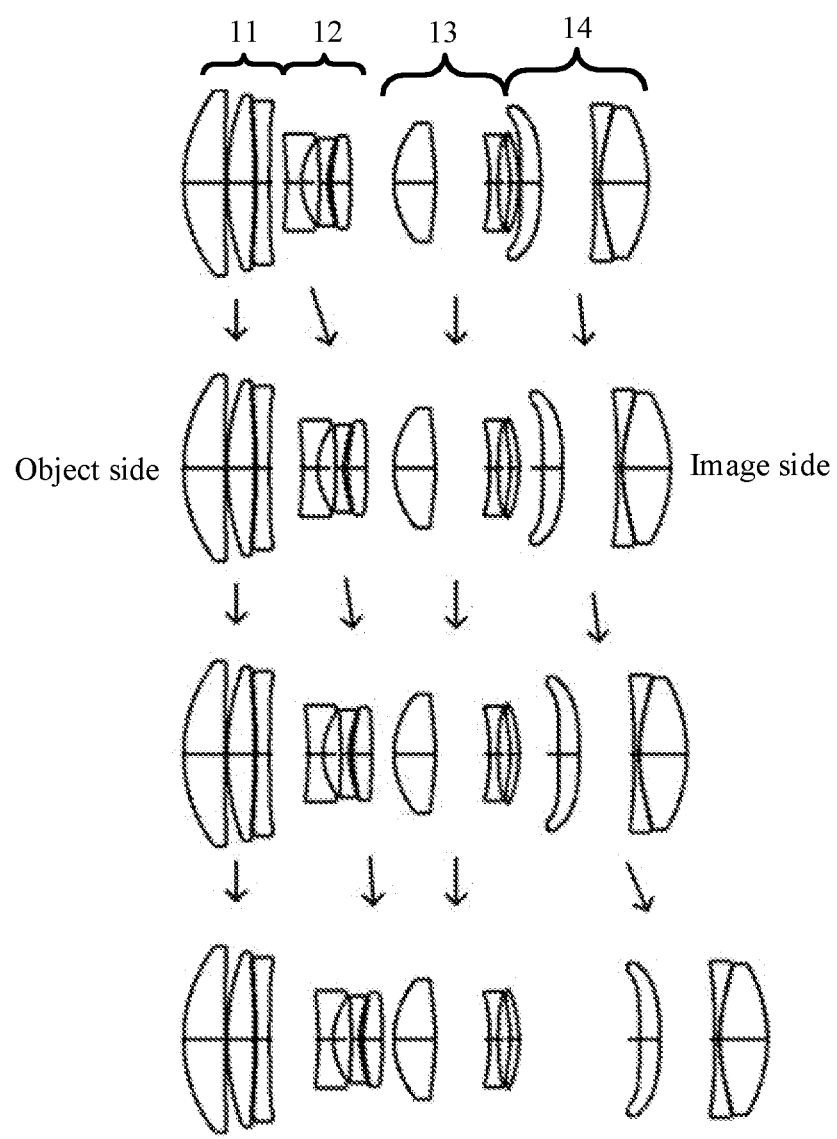
FIG. 4 is a schematic diagram of moving statuses of a second lens group and a fourth lens group when a zoom lens changes from a wide-angle state to a telephoto state according to an embodiment of this application.
Figure 5:
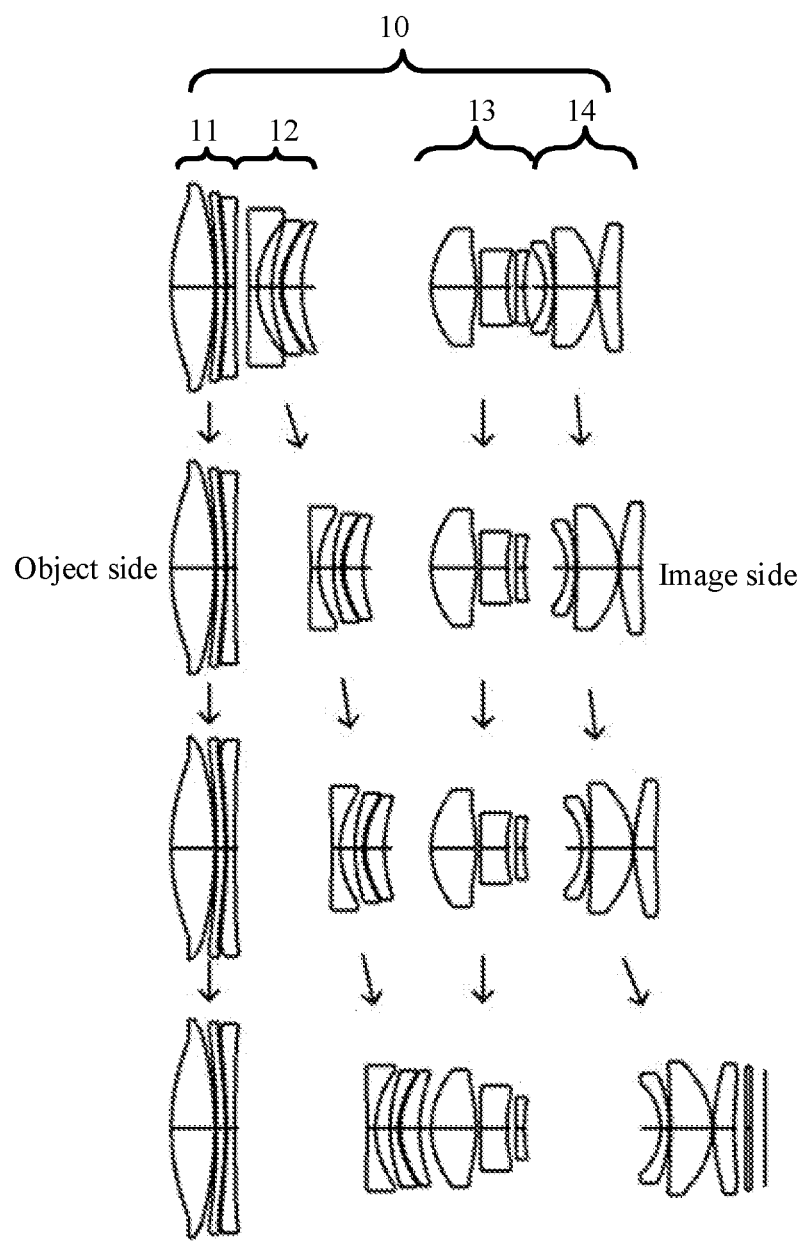
FIG. 5 is a schematic diagram of moving statuses of a second lens group and a fourth lens group when a zoom lens changes from a wide-angle state to a telephoto state according to an embodiment of this application.
Figure 6:
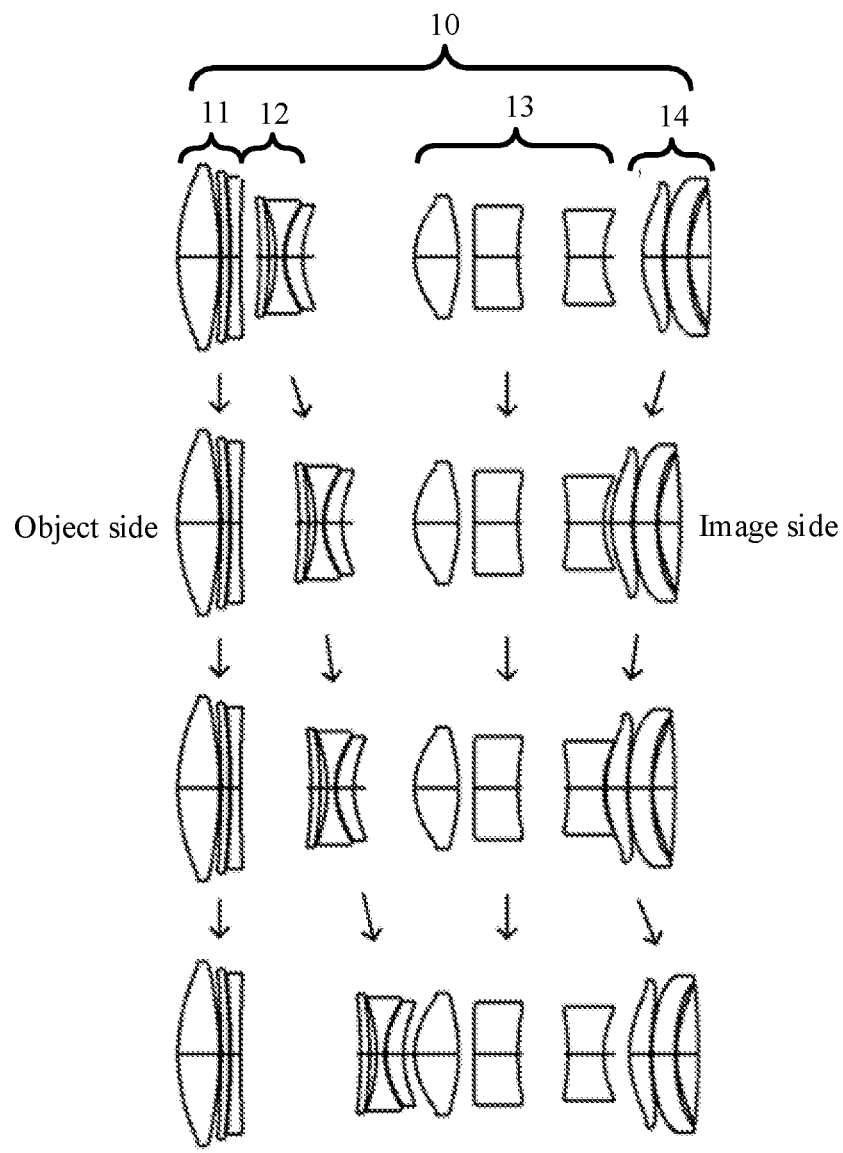
FIG. 6 is a schematic diagram of moving statuses of a second lens group and a fourth lens group when a zoom lens changes from a wide-angle state to a telephoto state according to an embodiment of this application.
Figure 7:
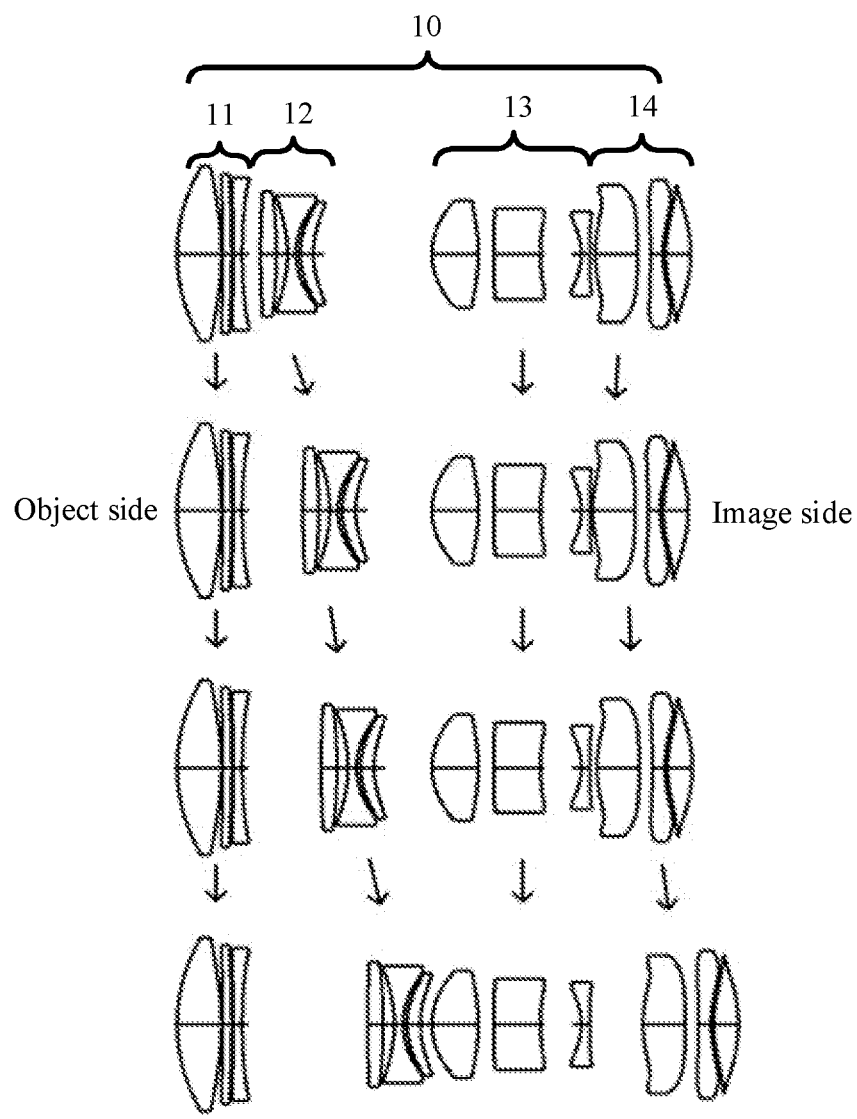
FIG. 7 is a schematic diagram of moving statuses of a second lens group and a fourth lens group when a zoom lens changes from a wide-angle state to a telephoto state according to an embodiment of this application.
Figure 8:
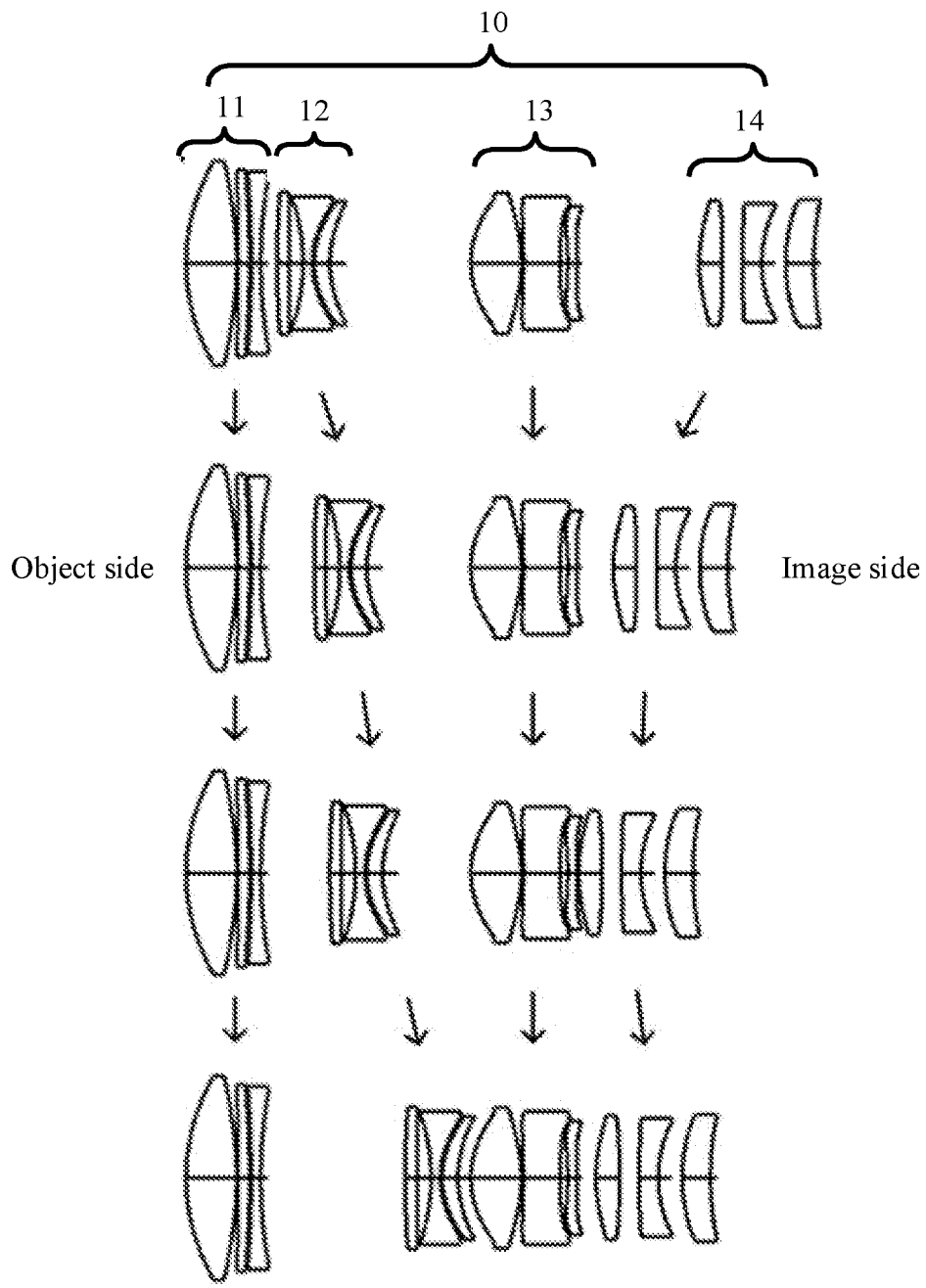
FIG. 8 is a schematic diagram of moving statuses of a second lens group and a fourth lens group when a zoom lens changes from a wide-angle state to a telephoto state according to an embodiment of this application.
Figure 9:
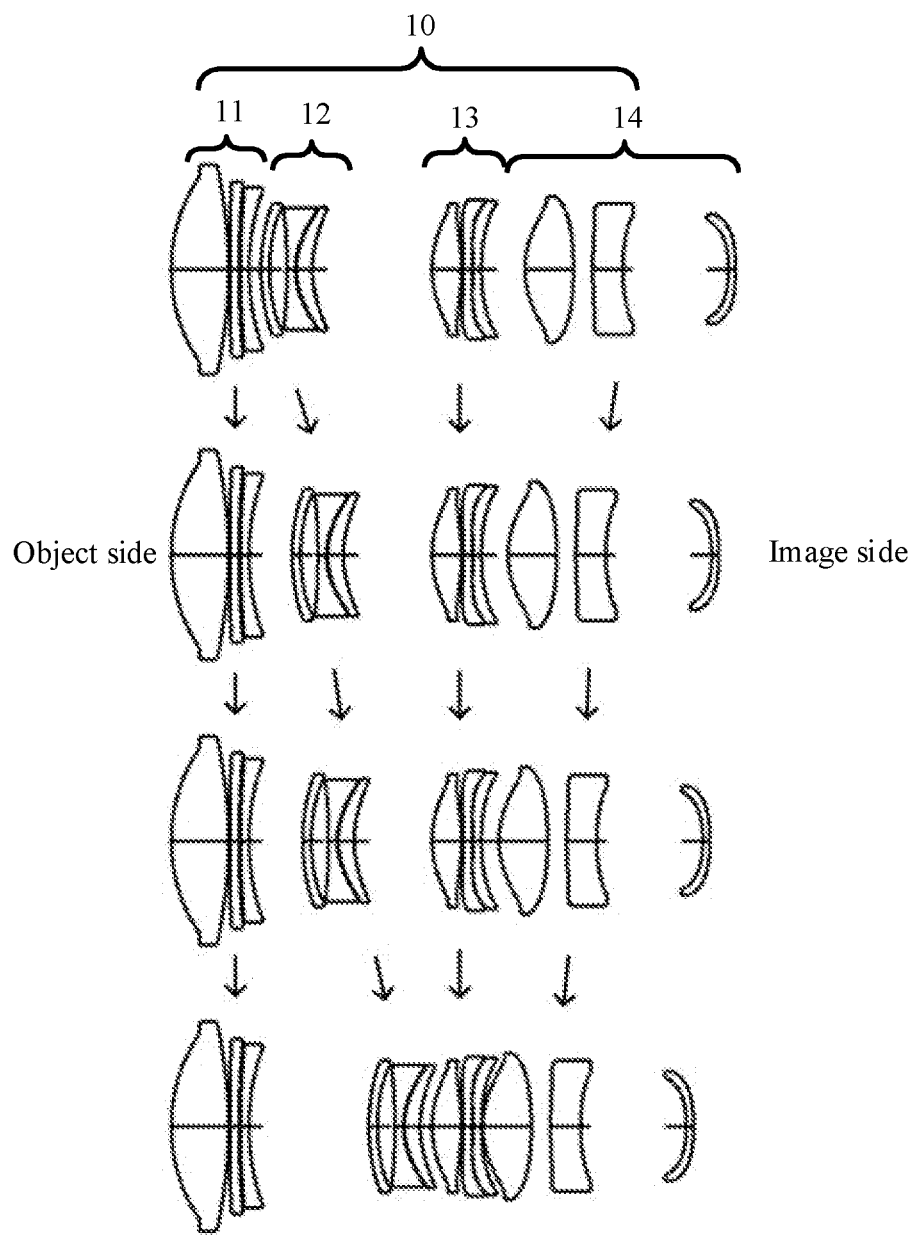
FIG. 9 is a schematic diagram of moving statuses of a second lens group and a fourth lens group when a zoom lens changes from a wide-angle state to a telephoto state according to an embodiment of this application.
Figure 10:
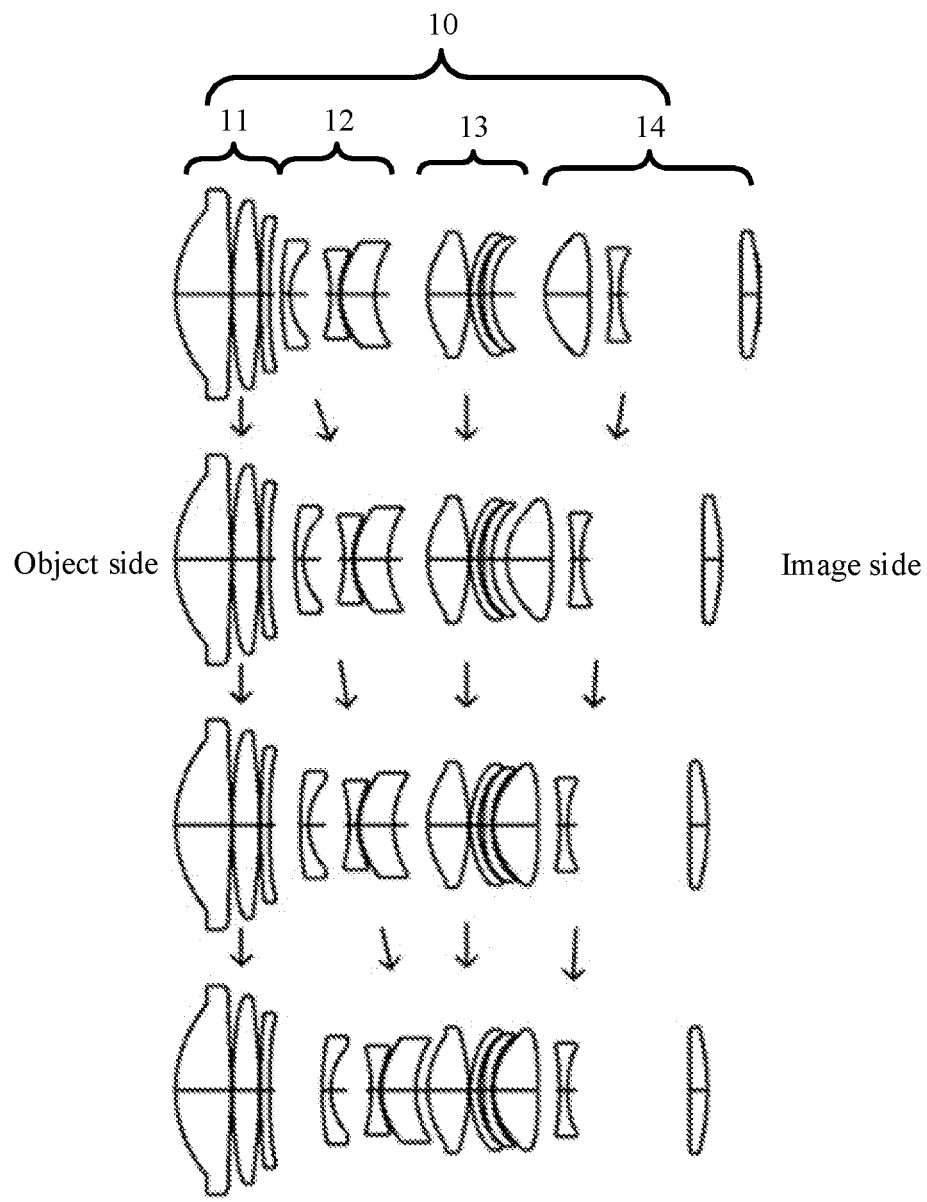
FIG. 10 is a schematic diagram of moving statuses of a second lens group and a fourth lens group when a zoom lens changes from a wide-angle state to a telephoto state according to Embodiment 10 of this application.
Figure 11:
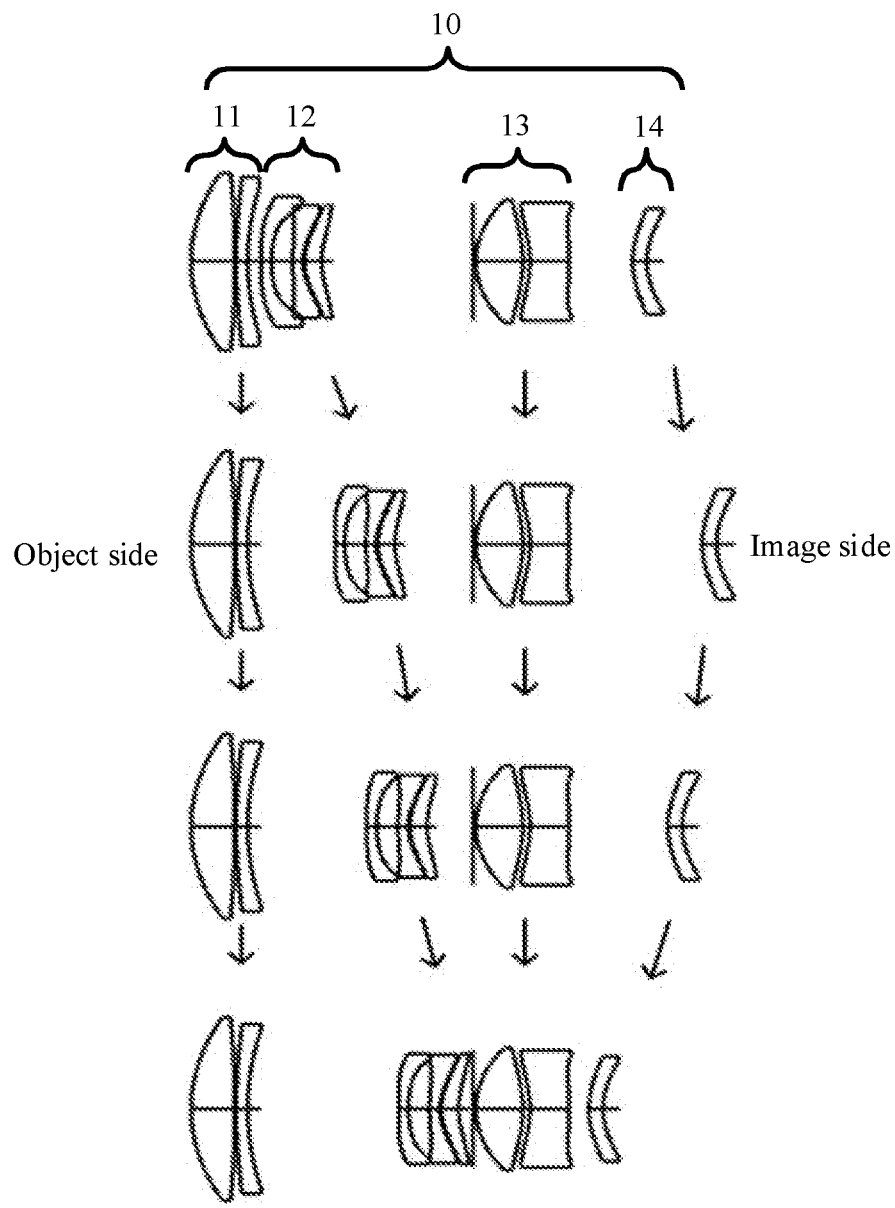
FIG. 11 is a schematic diagram of moving statuses of a second lens group and a fourth lens group when a zoom lens changes from a wide-angle state to a telephoto state according to an embodiment of this application.
Figure 12:
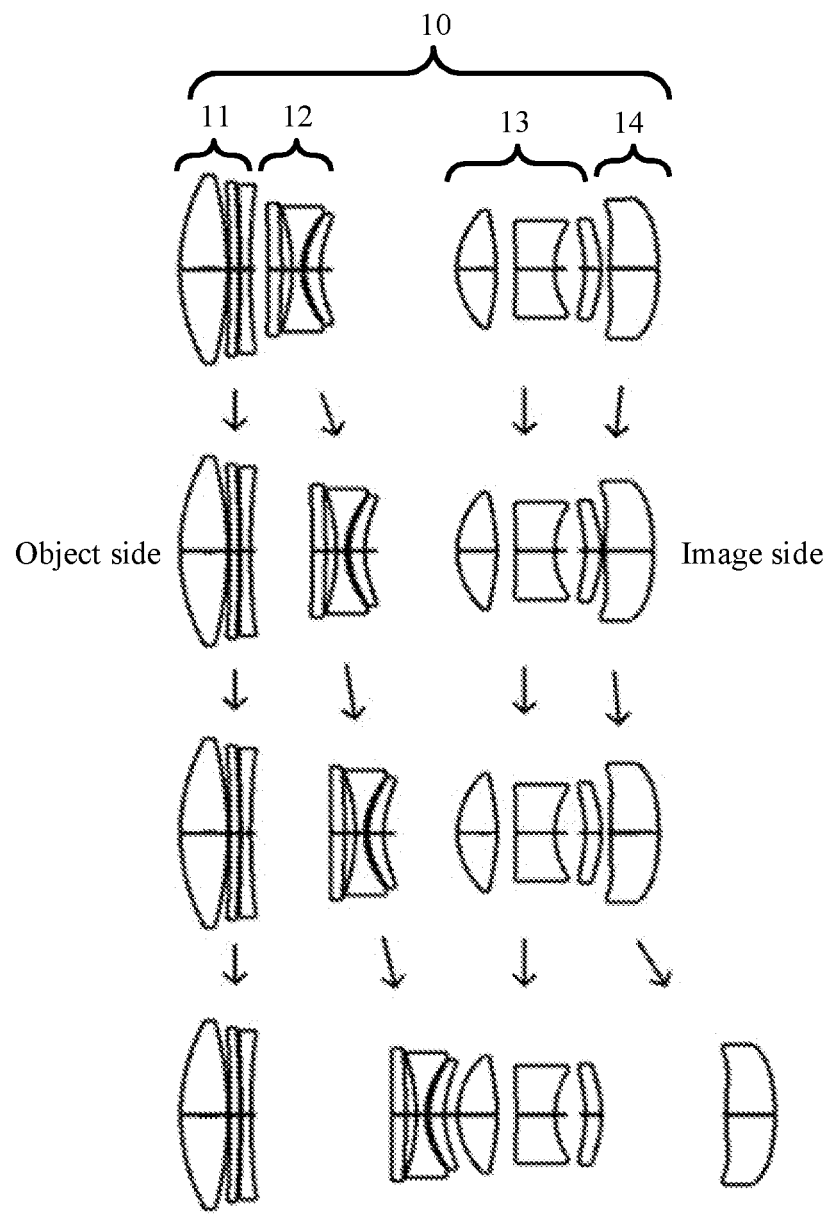
FIG. 12 is a schematic diagram of moving statuses of a second lens group and a fourth lens group when a zoom lens changes from a wide-angle state to a telephoto state according to an embodiment of this application.
Figure 13:
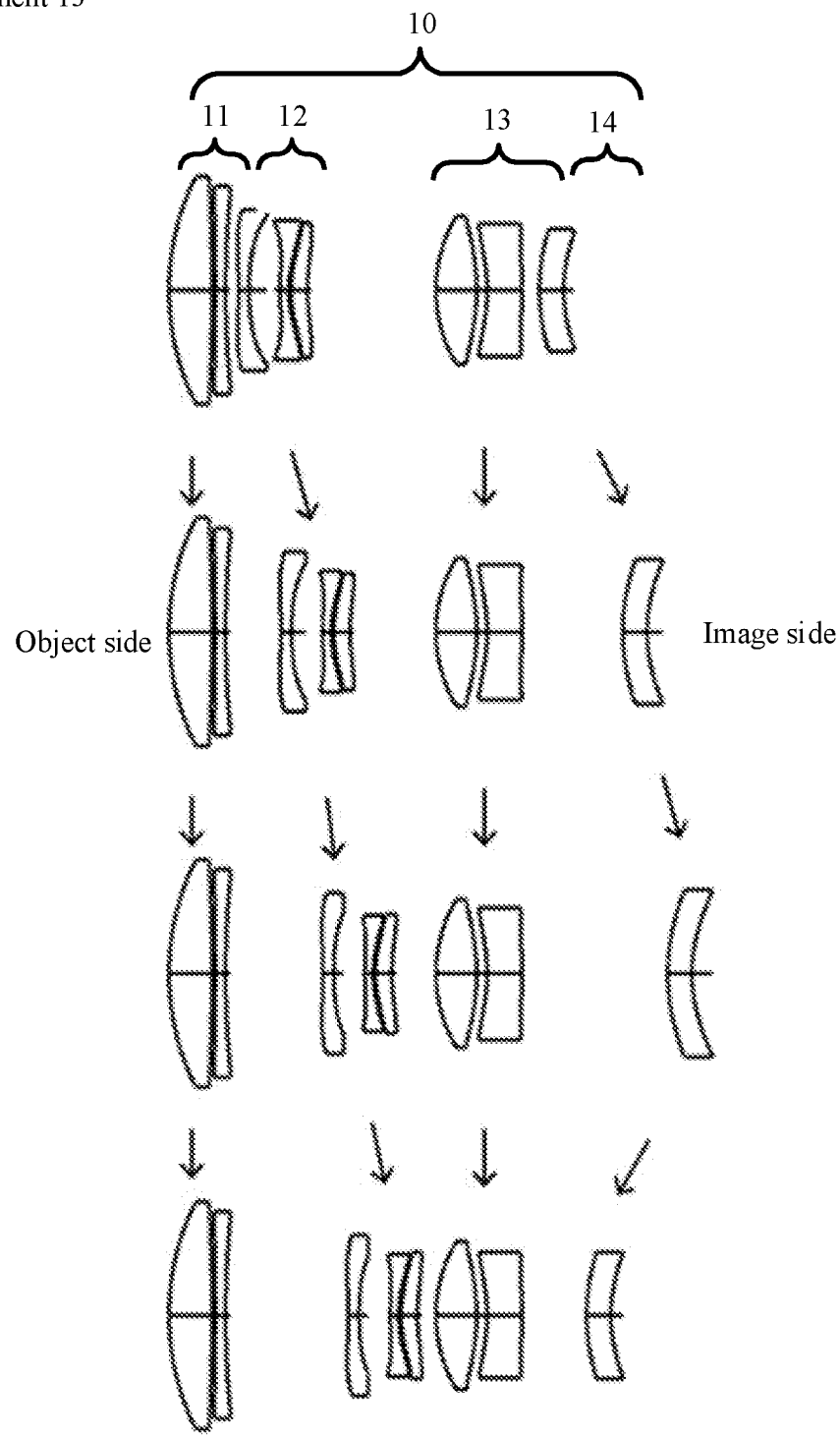
FIG. 13 is a schematic diagram of moving statuses of a second lens group and a fourth lens group when a zoom lens changes from a wide-angle state to a telephoto state according to an embodiment of this application.
Figure 14:
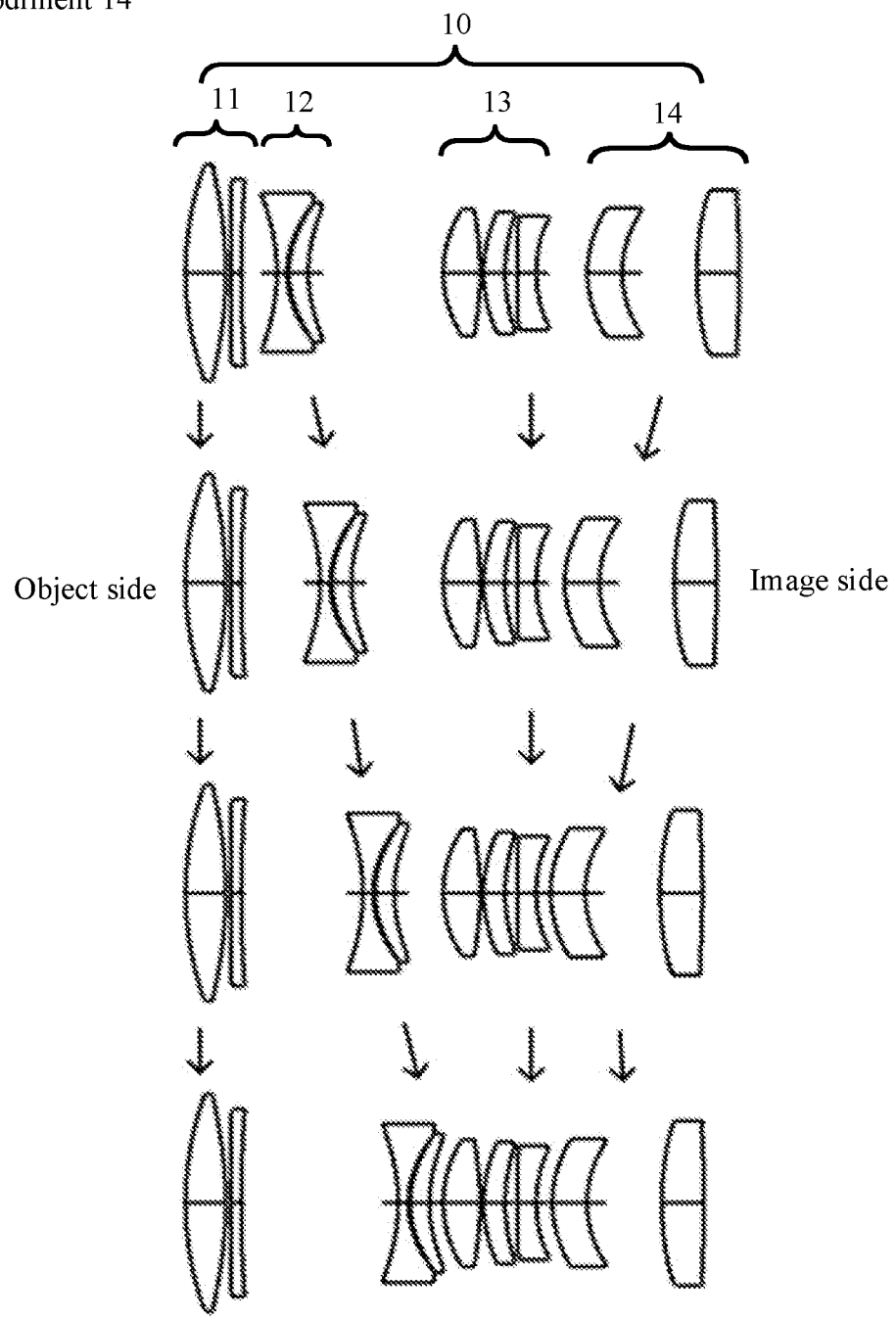
FIG. 14 is a schematic diagram of moving statuses of a second lens group and a fourth lens group when a zoom lens changes from a wide-angle state to a telephoto state according to an embodiment of this application.

Reference numerals in the drawings: 10—zoom lens; 11—first lens group; 12—second lens group; 13—third lens group; and 14—fourth lens group.

DESCRIPTION OF EMBODIMENTS

Figure 56:
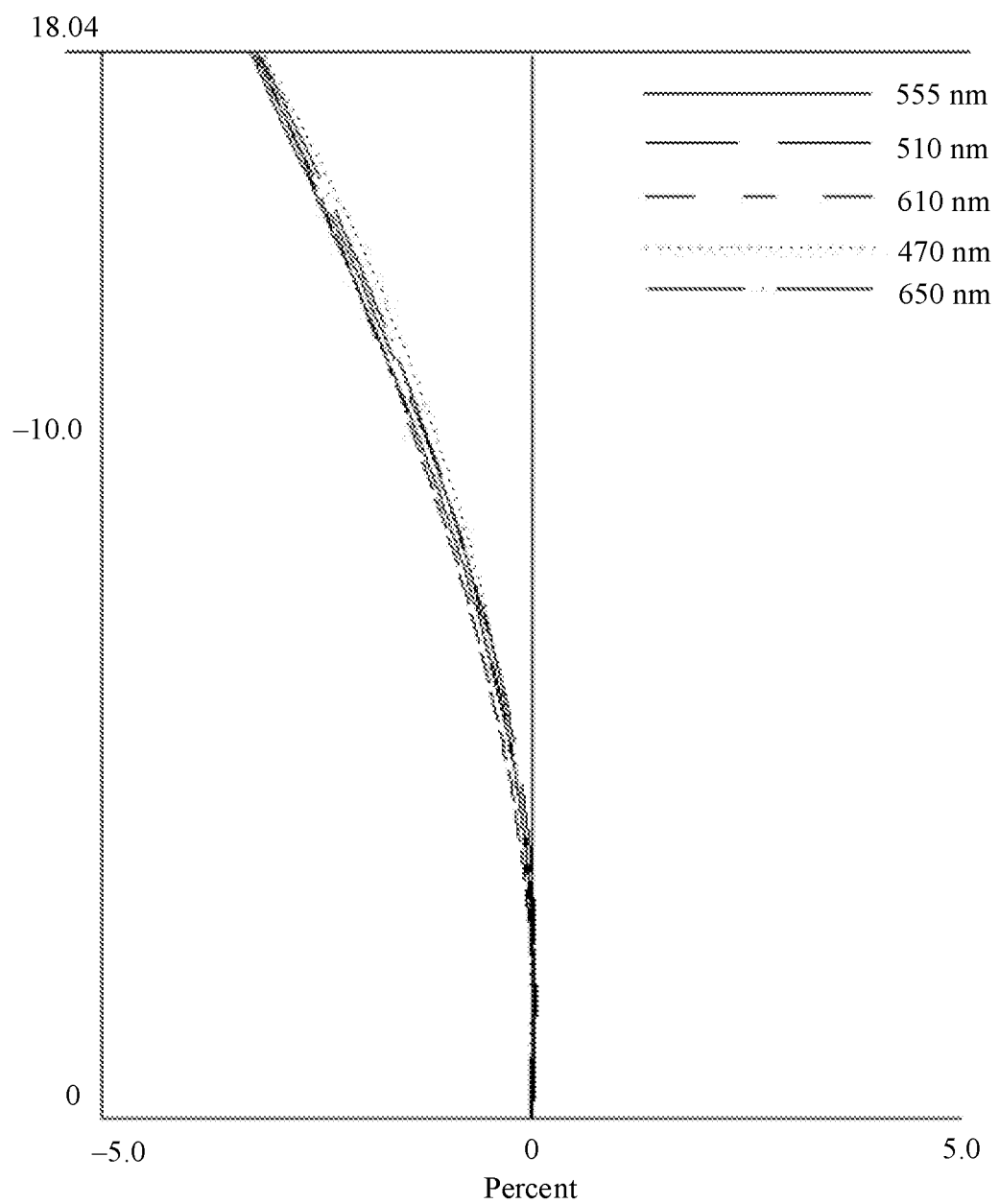
FIG. 56 shows distortion percentage curves of the zoom lens in the wide-angle state according to an embodiment of this application.

The following describes embodiments of this application. Examples of embodiments are shown in the accompanying drawings. Same or similar reference numerals are used to represent same or similar elements or elements having same or similar functions. Embodiments described below with reference to FIG. 1 to FIG. 56 are examples, and are intended to explain this application, but should not be understood as a limitation on this application.

It should be understood that, the terms "first" and "second" in descriptions of this application are intended for a purpose of description, and shall not be understood as an indication or implication of relative importance or implicit indication of the number of indicated technical features. Therefore, a feature limited by "first" or "second" may explicitly or implicitly include one or more features. In the description of this application, "a plurality of" means two or more than two, unless otherwise specifically limited.

In this application, terms "installation", "connect", "connection", "fix", and the like should be understood in a broad sense unless otherwise expressly specified and limited. For example, the "connection" may be a fixed connection, a removable connection, or an integrated connection; may be a mechanical connection or an electrical connection; or may be a direct connection, an indirect connection through an intermediate medium, or a connection inside two components or a mutual relationship between two components. A person of ordinary skill in the art may interpret specific meanings of the foregoing terms in this application according to specific cases.

Proper nouns and English abbreviations used in this specification are explained as follows:

A biconvex lens is a lens whose object side surface and image side surface are both convex spherical surfaces. A middle part of the lens is thick, and an edge part is thin. The biconvex lens has a light converging function.

A focusing group is a lens group that moves in a zoom lens 10 along an optical axis of the zoom lens 10 and that is configured to adjust a focal length of the zoom lens 10.

A compensation group is a lens group that moves in the zoom lens 10 along the optical axis of the zoom lens 10 with the focusing group and that is configured to balance and eliminate an aberration impact generated by the focusing group in a moving process.

An image height (IMH) is a height from an imaging edge to a center of an imaging plane of a lens of an optical system.

An F-number is a ratio (a reciprocal of a relative aperture) of a focal length of an optical system to a diameter of a clear aperture of a lens. A smaller aperture F-number indicates more light passing through the lens per unit time period. A larger aperture F-number indicates a smaller depth of field and blurring of a background of a photo. This effect is similar to that of a telephoto lens.

An effective focal length (EFL) usually indicates a focal length of a thick lens (a lens that has a non-negligible thickness), or an optical system with several lenses or mirrors (such as a camera lens, a telescope, and a lens on a mobile terminal such as a mobile phone), to distinguish the focal length from other commonly used parameters.

A front focal length (FFL) is a distance from a front focal point of an optical system to a vertex of a first optical surface.

A back focal length (BFL) is a length from a vertex of a last optical surface of an optical system to a back focal point.

For an optical system in the air, an effective focal length is a distance from a front principal plane and a back-principal plane to corresponding focal points. If a surrounding medium is not air, then the distance is multiplied by a refractive index of the medium. These distances are referred to as front/back focal lengths, to be distinguish from front/back focal distances defined above.

A field of view (FOV) is a field of view of the zoom lens 10. In an optical system, an included angle formed, by using a lens of the optical system as a vertex, by two edges of a maximum range that an objective image of a measured object forms when passing through the lens is referred to as a field of view. The field of view determines a view range of an optical instrument. A larger field of view indicates a larger view range and smaller optical power.

A total track length (TTL) is a total optical height or a total optical length of an optical system, namely, a total length from a head of the optical system to an image.

A total track length 1 (TTL1) is a distance from a vertex of a curved surface of a first surface of an optical system to a vertex of a curved surface of a last surface of the optical system.

A telephoto end of a zoom lens 10 indicates a value range of a focal length when the zoom lens 10 is in a telephoto state.

A wide-angle end of a zoom lens 10 indicates a value range of a focal length when the zoom lens 10 is in a wide-angle state and a captured image presents a large foreground and a small distant view.

D1 is a travel distance range when the second lens group 12 moves along the optical axis as a zoom group or a compensation group.

D2 is a travel distance range when the fourth lens group 14 moves along the optical axis as a zoom group or a compensation group.

An imaging edge is an edge position of a lens of the zoom lens 10.

A center of an imaging plane is a central position of a lens of the zoom lens 10.

A zoom ratio is a ratio of a maximum focal length to a minimum focal length of the zoom lens 10.

A focal length (focal length) is a measure of how strongly an optical system converges or diverges light, and is a vertical distance from an optical center of a lens or a lens group to a focal plane when a clear image of an infinite scene is formed on the focal plane by using the lens or the lens group. From a practical perspective, the focal length may be understood as a distance from a center of a lens to an imaging plane. For a prime lens, a position of an optical center of the prime lens is fixed. For a zoom lens, a change of an optical center of the lens causes a change of a focal length of the lens.

An aperture is a device that controls an amount of light when light rays pass through a lens and enters a photosensitive surface of a body. The aperture is usually inside the lens. An aperture size is represented by F-number.

The F-number is a ratio (a reciprocal of a relative aperture) of a focal length of a lens to a diameter of a clear aperture of the lens. A smaller aperture F-number indicates more light passing through the lens per unit time period. A larger aperture F-number indicates a smaller depth of field and blurring of a background of a photo. This is similar to effect achieved by a telephoto lens.

Positive refractive power, also referred to as positive dioptric power, indicates that a lens has a positive focal length and has effect of converging light rays.

Negative refractive power, also referred to as negative dioptric power, indicates that a lens has a negative focal length and has effect of diverging light rays.

Positive focal power indicates that a zoom lens 10 refracts and converges an incident light beam. A larger positive focal power value indicates stronger refractive and converging capabilities.

Negative focal power indicates that a zoom lens 10 refracts and diverges an incident light beam. A larger negative focal power value indicates stronger refractive and diverging capabilities.

The Abbe number, namely, a dispersion coefficient, is a refractive index difference ratio of an optical material at different wavelengths, and indicates a dispersion degree of the material.

An optical axis is a light ray that passes vertically through a center of an ideal lens. When light rays parallel to the optical axis pass through a convex lens, in an ideal convex lens, all the light rays converges at one point behind the lens. This point at which all the light rays converge is a focal point.

An object side is space that is bounded by a lens and in which a photographed object is located, also referred to as object space.

An image side is space that is bounded by a lens and in which an image formed after light emitted by a photographed object passes through the lens is located, also referred to as image space.

An axial chromatic aberration is also called a longitudinal chromatic aberration, a position chromatic aberration, or an axial aberration. A beam of light rays parallel to an optical axis converges at different positions after passing through a lens. This aberration is called a position chromatic aberration or an axial chromatic aberration. This is because a lens images light with different wavelengths at different locations, so that focal planes of images of light of different colors cannot overlap during final imaging, and polychromatic light disperses to form dispersion.

A lateral chromatic aberration, also referred to as a chromatic difference of magnification, is a difference of magnification of an optical system for light of different colors. A wavelength causes a change in the magnification of the optical system, and a size of an image changes accordingly.

Distortion is a degree at which an image formed by an optical system for an object is distorted relative to the object. Distortion is caused because a height of a point at which chief rays with different fields of view intersect a Gaussian image plane after the chief rays pass through the optical system is not equal to an ideal image height due to an impact of a stop spherical aberration, and a difference between the two heights is distortion. Therefore, distortion only changes an imaging position of an off-axis object point on an ideal plane, so that a shape of an image is distorted, but definition of the image is not affected.

Optical distortion is a deformation degree obtained through optical theoretical calculation.

A diffraction limit means that an ideal object point is imaged through an optical system, and due to a diffraction limitation, it is impossible to obtain the ideal image point, but a Fraunhofer diffraction image is obtained. Since an aperture of an optical system is generally circular, the Fraunhofer diffraction image is known as an Airy disk. In this way, an image of each object point is a blur spot. It is difficult to distinguish between two blur spots after the two blur spots are close to each other. This limits a resolution of the system. A larger blur spot indicates a lower resolution.

A lens with a special-shaped aperture is a lens with an edge contour of an irregular shape instead of a conventional circular shape.

An edge direction of a lens with a special-shaped aperture is a direction in which a cutter moves when the lens is cut, and usually includes a vertical edge direction, a horizontal edge-cutting direction, or the like.

As shown in FIG. 1 to FIG. 14, embodiments of this application provide a zoom lens 10. The zoom lens 10 is used in a camera module, and the camera module with the zoom lens 10 may be used in a terminal device. The camera module may include the zoom lens 10, a voice coil motor, an infrared light filter, an image sensor, an analog-to-digital (A/D) signal converter, and a processor.

The terminal device provided in embodiments of this application may include but is not limited to a camera, a mobile phone, a tablet computer, a wearable device, a vehicle-mounted device, an augmented reality (AR) device/a virtual reality (VR) device, a notebook computer, an ultra-mobile personal computer (UMPC), a netbook, or a personal digital assistant (PDA). A specific type of the terminal device is not limited in embodiments of this application. For ease of description, the terminal device in an embodiment of this application is described by using a mobile phone as an example. It should be understood that this should not be construed as a limitation on this application.

In an example, the zoom lens 10 includes a first lens group 11, a second lens group 12, a third lens group 13, and a fourth lens group 14 that are sequentially arranged from an object side to an image side along an optical axis. The first lens group 11 and the third lens group 13 are fixedly disposed. The second lens group 12 and the fourth lens group 14 move along the optical axis. The first lens group 11 and the third lens group 13 are fixedly disposed to form a fixed group of zoom lens 10. The second lens group 12 and the fourth lens group 14 move along the optical axis, to implement zoom and compensation for an aberration generated during zoom.

Optionally, the second lens group 12 may be a zoom group, and the fourth lens group may be a compensation group. The second lens group 12 may continuously enlarge an imaging size of the first lens group 11 in a process of moving along the optical axis, to change a focal length of the zoom lens 10, so that the zoom lens 10 implements continuous zoom. The fourth lens group 14 with focal power may move along the optical axis in a moving process of the second lens group 12, to compensate for image plane displacement generated by the second lens group 12 in a moving process.

Alternatively, the second lens group 12 may be a compensation group, and the fourth lens group 14 may be a zoom group. This can meet a high zoom ratio of the zoom lens, and maintain good imaging definition of the zoom lens.

A first lens from the object side in the first lens group 11 is a biconvex lens. This can improve light converging performance of the first lens group 11, and prolong a back focal length of the zoom lens 10, so that the zoom lens 10 has good imaging effect and a thickness of the zoom lens 10 is reduced as much as possible. At least two lenses from the object side in the first lens group 11 are glass lenses. In this way, deep processing can be implemented on the two lenses close to the object side, so that the two lenses can be thin and have a good optical path adjustment capability. A maximum clear aperture diameter of the zoom lens 10 meets the following relationship: 4 mm≤φ≤12 mm, where φ is the maximum clear aperture diameter of the zoom lens.

In addition, the maximum clear aperture diameter of the zoom lens is set within a range from 4 mm to 12 mm. This can effectively improve an amount of light passing through the zoom lens 10, and effectively prevent a depth of field from being excessively small, thereby avoiding partial blurring of an imaging background. Further, this can effectively reduce an overall height of the zoom lens, and improve luminous flux of the zoom lens. Due to the foregoing factors, this can improve overall imaging quality of the optical focal lens. In addition, the zoom lens can be made smaller, and can be easily used in a thin terminal device. In this way, the terminal device equipped with the zoom lens can implement continuous zoom, and maintain good imaging definition, thereby improving overall imaging quality of the terminal device.

In the zoom implementation, the first lens group 11 and the third lens group 13 are fastened, and the second lens group 12 and the fourth lens group 14 move. This can reduce structure complexity of the zoom lens 10, reduce engineering implementation difficulty of the zoom lens 10, and make the zoom lens 10 smaller, so that the zoom lens 10 can be easily used in a mobile terminal device such as a mobile phone.

Optionally, the maximum clear aperture diameter of the zoom lens may further meet the following relationship: 4 mm≤φ≤6 mm.

In an example, the maximum clear aperture diameter of the zoom lens is set within a range from 4 mm to 6 mm. This allows a sufficient amount of light passing through the zoom lens 10, and reduces an overall height of the zoom lens. Therefore, miniaturization potential of the zoom lens 10 is improved, and the zoom lens 10 can be used in a thinner terminal device. In addition, the zoom lens 10 provided in this embodiment further includes a stop. The stop may be located on an object side of the third lens group 13, or may be located at another location.

A camera module provided in an embodiment of this application includes the zoom lens 10. The zoom lens 10 can implement continuous zoom, and improve overall imaging quality and miniaturization potential of the zoom lens 10. In this way, the camera module with the zoom lens 10 can improve imaging quality, and implement miniaturization.

A terminal device provided in an embodiment of this application includes the camera module. The terminal device with the foregoing disposed module implements continuous zoom by using one lens, and thereby changes a conventional mode in which a plurality of lenses performs "jump-type zoom". This significantly improves imaging definition in a continuous zoom process, and reduces assembly space of the zoom lens 10.

Optionally, the zoom lens 10 meets the following relationship: 0.8≤TTL/ft≤1.5, where TTL is a total optical length of the zoom lens 10, and ft is an effective focal length at a telephoto end of the zoom lens 10. In this way, when the zoom lens 10 changes from a wide-angle end to the telephoto end, a ratio of the total optical length to the effective focal length at the telephoto end of the zoom lens 10 is set within a range from 0.8 to 1.5. In this way, the zoom lens 10 can maintain a good width of an angle of view and a good zoom ratio, and can also correct an off-axis aberration. Optionally, a ratio of the total optical length to the effective focal length at the telephoto end of the zoom lens 10 is further set within a range from 0.8 to 1, so that a width of an angle of view and a zoom ratio of the zoom lens 10 reach an optimal state.

Optionally, the zoom lens 10 further meets the following relationship: 0.02≤IMH/ft≤0.2, where IMH is a height from an imaging edge to a center of an imaging plane of the zoom lens 10, also referred to as a half-image height, and ft is an effective focal length at the telephoto end of the zoom lens 10.

In this way, a ratio of the image height of the zoom lens 10 to the effective focal length at the telephoto end of the zoom lens 10 is set within a range from 0.02 to 0.2. This can improve a zoom ratio of the zoom lens 10, and reduce a total height of the zoom lens at the same time. Therefore, the zoom lens 10 has a smaller height and can be more easily used in a thin terminal device.

Optionally, the first lens group 11, the third lens group 13, and the fourth lens group 14 may have positive focal power, and the second lens group 12 may have negative focal power. Alternatively, the first lens group 11 and the third lens group 13 may have positive focal power, and the second lens group 12 and the fourth lens group 14 may have negative focal power. In this way, a plurality of positive and negative focal power combinations can be implemented, so that the zoom lens 10 in this embodiment has a plurality of different zoom manners, and an appropriate positive and negative focal power combination can be formed based on actual requirements for imaging quality, zoom efficiency, and a zoom ratio.

Optionally, as shown in FIG. 1 to FIG. 12, when the zoom lens 10 changes from the wide-angle end to the telephoto end, and positions of the first lens group 11 and the third lens group 13 remain unchanged, moving statuses of the second lens group 12 and the fourth lens group 14 may be as follows. The second lens group 12 moves towards the image side along the optical axis, and the fourth lens group 14 first moves towards the object side and then moves towards the image side along the optical axis. The second lens group 12 moves at a constant speed along the optical axis, to continuously adjust the focal length. The fourth lens group 14 may move at a non-constant speed relative to the second lens group 12, to dynamically compensate in real time for image plane displacement generated by the second lens group 12 in a moving process. In this way, a picture captured by the zoom lens 10 always maintains good definition and high quality in a continuous zoom process.

In addition, the second lens group 12 may also move towards the image side along the optical axis, and the fourth lens group 14 moves towards the object side along the optical axis. Alternatively, both the second lens group 12 and the fourth lens group 14 move towards the image side along the optical axis, or the second lens group 12 moves towards the image side along the optical axis, and the fourth lens group 14 first moves towards the image side and then moves towards the object side along the optical axis. The foregoing moving manners of the second lens group 12 and the fourth lens group 14 can implement change of the zoom lens 10 from the wide-angle end to the telephoto end.

Optionally, the first lens group 11 meets the following relationship: 0.2≤f1/ft≤2.3, where f1 is a focal length of the first lens group 11, and ft is an effective focal length at the telephoto end of the zoom lens 10.

A ratio of the focal length of the first lens group 11 to the effective focal length at a telephoto end of the zoom lens 10 is set within a range from 0.2 to 2.3. This can effectively improve a light converging capability of the first lens group 11, and help reduce an axial chromatic aberration.

Optionally, the first lens group 11 may further meet the following relationship: 0.2≤f1/ft≤0.69; 0.75≤f1/ft≤1.3; or 1.95≤f1/ft≤2.15, where f1 is a focal length of the first lens group 11, and ft is a focal length of the zoom lens 10.

A ratio of the focal length of the first lens group 11 to the effective focal length at a telephoto end of the zoom lens 10 is further set within a range from 0.2 to 0.69, 0.75 to 1.3, or 1.95 to 2.15. This can improve a light converging capability of the first lens group 11, reduce an axial chromatic aberration, and correct an off-axis field curvature aberration and an off-axis coma aberration, so that ideal imaging definition and imaging quality are maintained in a continuous zoom process.

Optionally, the second lens group 12 meets the following relationship: 0.02≤f2/ft≤0.6, where $f_2$ is a focal length of the second lens group 12, and ft is an effective focal length at the telephoto end of the zoom lens 10.

A ratio of the focal length of the second lens group 12 to the effective focal length at a telephoto end of the zoom lens 10 is set within a range from 0.02 to 0.09 or 0.13 to 0.54. This can help correct an aberration generated by the second lens group 12 in a zoom process.

Optionally, the second lens group 12 may further meet the following relationship: 0.02≤f2/ft≤0.09; or 0.13≤f2/ft≤0.54, where $f_2$ is a focal length of the second lens group 12, and ft is a focal length of the zoom lens 10.

A ratio of the focal length of the second lens group 12 to the effective focal length at a telephoto end of the zoom lens 10 is further set within a range from 0.02 to 0.09 or 0.13 to 0.54. This can help, in an example, to correct system dispersion and system spherical aberration generated by the second lens group 12 in a zoom process.

Optionally, the third lens group 13 meets the following relationship: $0.1 \leq f3/ft \leq 4.5$, where f3 is a focal length of the third lens group 13, and ft is an effective focal length at the telephoto end of the zoom lens 10.

The third lens group 13 may further meet the following relationship: $0.12 \leq f3/ft \leq 0.35$; $0.52 \leq f3/ft \leq 0.61$; or $3.85 \leq f3/ft \leq 4.5$, where f3 is a focal length of the third lens group 13, and ft is a focal length of the zoom lens 10.

A ratio of the focal length of the third lens group 13 to the effective focal length at a telephoto end of the zoom lens 10 is set within a range from 0.12 to 0.35, 0.52 to 0.61, or 3.85 to 4.5. This can improve a light converging capability of the third lens group 13, and effectively correct an off-axis field curvature aberration and an off-axis coma aberration.

Optionally, the fourth lens group 14 meets the following relationship: $0.12 \leq f4/ft \leq 200$, where f4 is a focal length of the fourth lens group 14, and ft is an effective focal length at the telephoto end of the zoom lens 10.

A ratio of the focal length of the fourth lens group 14 to the effective focal length at a telephoto end of the zoom lens 10 is set within a range from 0.12 to 200. In this way, in a zoom process in which the second lens group 12 moves along the optical axis, the fourth lens group 14 can widely compensate for an aberration generated by the second lens group 12 in an entire moving process.

Optionally, the fourth lens group 14 may further meet the following relationship: $0.12 \leq f4/ft \leq 0.43$; $0.65 \leq f4/ft \leq 0.85$; or $70 \leq f4/ft \leq 200$, where f4 is a focal length of the fourth lens group 14, and ft is a focal length of the zoom lens 10.

A ratio of the focal length of the fourth lens group 14 to the effective focal length at a telephoto end of the zoom lens 10 is further set within a range from 0.12 to 0.43, 0.65 to 0.85, or 70 to 200. In this way, in a zoom process in which the second lens group 12 moves along the optical axis, the fourth lens group 14 can effectively compensate for an aberration generated by the second lens group 12 in a moving process, and effectively correct an off-axis field curvature aberration and an off-axis coma aberration.

Optionally, a ratio of an effective focal length ft at the telephoto end of the zoom lens 10 to an effective focal length fw at the wide-angle end of the zoom lens 10 meets the following relationship: $1 \leq ft/fw \leq 3.7$. This can improve a zoom ratio of the zoom lens 10 during continuous zoom from the wide-angle end to the telephoto end. This can further improve a zoom ratio of the zoom lens 10.

Optionally, a ratio of a movement distance D1 of the second lens group 12 along the optical axis to a total optical length of the zoom lens 10 (TTL) meets the following relationship: $0.02 \leq D1/TTL \leq 0.3$.

A ratio of a movement distance D2 of the fourth lens group 14 along the optical axis to the total optical length of the zoom lens 10 (TTL) meets the following relationship: $0.02 \leq D2/TTL \leq 0.35$.

In an example, the ratio of the movement distance D1 of the second lens group 12 along the optical axis to the total optical length of the zoom lens 10 (TTL) and the ratio of the movement distance D2 of the fourth lens group 14 along the optical axis to the total optical length of the zoom lens 10 may further be: $0.176 \leq D1/TTL \leq 0.215$, and $0.05 \leq D2/TTL \leq 0.09$; or $0.049 \leq D1/TTL \leq 0.086$, and $0.21 \leq D2/TTL \leq 0.35$.

In this way, the ratio of the movement distance of the second lens group 12 along the optical axis to the total optical length of the zoom lens 10 and the ratio of the movement distance of the fourth lens group 14 along the optical axis to the total optical length of the zoom lens are set within the foregoing parameter range. With reference to the foregoing parameters and movement directions of the second lens group 12 and the fourth lens group 14 along the optical axis, stable and continuous change of the zoom lens 10 from the wide-angle end to the telephoto end can be implemented, and various aberrations such as a field curvature aberration can be corrected.

Optionally, when the zoom lens 10 is at the wide-angle end, a spacing distance between the first lens group 11 and the second lens group 12 meets the following relationship: $0.5 \text{ mm} \leq L1 \leq 1.35 \text{ mm}$; a spacing distance between the second lens group 12 and the third lens group 13 meets the following relationship: $1.8 \text{ mm} \leq L2 \leq 6.0 \text{ mm}$; and a spacing distance between the third lens group 13 and the fourth lens group 14 meets the following relationship: $0.05 \text{ mm} \leq L3 \leq 4.8 \text{ mm}$, where L1 is the spacing distance between the first lens group 11 and the second lens group 12, L2 is the spacing distance between the second lens group 12 and the third lens group 13, and $L_3$ is the spacing distance between the third lens group 13 and the fourth lens group 14.

When the zoom lens 10 is at the wide-angle end, the first lens group 11, the second lens group 12, the third lens group 13, and the fourth lens group 14 meet the foregoing spacing distances. This can improve imaging definition of the zoom lens 10 at the wide-angle end, increase system luminous flux, and correct distortion.

Optionally, when the zoom lens 10 is in a first intermediate focal length state, a spacing distance between the first lens group 11 and the second lens group 12 meets the following relationship: $1.05 \text{ mm} \leq L1 \leq 2.95 \text{ mm}$.

A spacing distance between the second lens group 12 and the third lens group 13 meets the following relationship: $1.1 \text{ mm} \leq L2 \leq 4.1 \text{ mm}$.

A spacing distance between the third lens group 13 and the fourth lens group 14 meets the following relationship:

When the zoom lens 10 is in a second intermediate focal length state, a spacing distance between the first lens group 11 and the second lens group 12 meets the following relationship: $1.3 \text{ mm} \leq L1 \leq 4.2 \text{ mm}$.

A spacing distance between the second lens group 12 and the third lens group 13 meets the following relationship: $0.9 \text{ mm} \leq L2 \leq 3.4 \text{ mm}$.

A spacing distance between the third lens group 13 and the fourth lens group 14 meets the following relationship: $0.05 \text{ mm} \leq L3 \leq 3.1 \text{ mm}$.

When the zoom lens 10 is in the first intermediate focal length state and the second intermediate focal length state, the first lens group 11, the second lens group 12, the third lens group 13, and the fourth lens group 14 meet the foregoing spacing distances. This can improve imaging definition of the zoom lens 10 in the first middle focal length state and the second middle focal length state.

When the zoom lens 10 is at the telephoto end, a spacing distance between the first lens group 11 and the second lens group 12 meets the following relationship: $2 \text{ mm} \leq L1 \leq 6.5 \text{ mm}$.

A spacing distance between the second lens group 12 and the third lens group 13 meets the following relationship: $0.5 \text{ mm} \leq L2 \leq 0.9 \text{ mm}$.

A spacing distance between the third lens group 13 and the fourth lens group 14 meets the following relationship: 0.05 mm≤L3≤5.1 mm.

When the zoom lens 10 is in the first intermediate focal length state and the second intermediate focal length state, the first lens group 11, the second lens group 12, the third lens group 13, and the fourth lens group 14 meet the foregoing spacing distances. In this way, the distances between the first lens group 11, the second lens group 12, the third lens group 13, and the fourth lens group 14 cooperate to improve imaging definition of the zoom lens 10 at the telephoto end.

Optionally, a total quantity N of lenses included in the first lens group 11, the second lens group 12, the third lens group 13, and the fourth lens group 14 meets the following relationship: 7≤N≤12.

In addition, a total quantity S of aspheric surfaces of the lenses included in the first lens group 11, the second lens group 12, the third lens group 13, and the fourth lens group 14 meets the following relationship: N≤S≤2N.

In this way, a reasonable proportional relationship can be formed between the quantity of aspheric surfaces and the quantity of lenses. This further achieves a high zoom ratio of the zoom lens 10, and effectively reduces a total length or a total height of the zoom lens 10.

Optionally, the first lens group 11, the second lens group 12, the third lens group 13, and the fourth lens group 14 each have three lenses arranged from the object side to the image side along the optical axis. In addition, the first lens group 11, the second lens group 12, the third lens group 13, and the fourth lens group 14 include 12 to 24 aspheric surfaces in total.

Alternatively, the first lens group 11, the second lens group 12, and the third lens group 13 each have two lenses arranged from the object side to the image side along the optical axis, and the fourth lens group 14 has one lens arranged from the object side to the image side. In addition, the first lens group 11, the second lens group 12, the third lens group 13, and the fourth lens group 14 include 7 to 14 aspheric surfaces in total.

In an example, a quantity of lenses in a lens group and a total quantity of aspheric surfaces are limited. This can effectively correct an aberration and avoid distortion of a field of view by combining the quantity of lenses and the aspheric surfaces of the lens. In addition, this can effectively reduce a total length of an optical path of the zoom lens 10, so that the zoom lens 10 has a high zoom ratio, good overall imaging quality, a reduced total length of the zoom lens 10. Therefore, the zoom lens 10 can be more easily used in the terminal device.

Optionally, a first lens, a second lens, and a third lens are sequentially arranged in the first lens group 11 from the object side to the image side along the optical axis. The first lens, the second lens, and the third lens meet the following relationships: 20≤V1−V2≤55; and 12≤V1−V3≤65.

Alternatively, a first lens and a second lens are sequentially arranged in the first lens group 11 from the object side to the image side along the optical axis. The first lens and the second lens meet the following relationship: 25≤V1−V2≤45.

V1 is an abbe coefficient of the first lens, V2 is an abbe coefficient of the second lens, and V3 is an abbe coefficient of the third lens.

A difference between abbe coefficients of the first lens, the second lens, and the third lens in the first lens group 11 is limited to the foregoing relationships. This can effectively reduce system dispersion through cooperation of the lenses, thereby improving imaging definition of the zoom lens, and enabling the zoom lens to present good imaging effect.

Optionally, a first lens, a second lens, and a third lens are sequentially arranged in the second lens group 12 from the object side to the image side along the optical axis. The first lens, the second lens, and the third lens meet the following relationships: −20≤V1−V2≤35; and −18≤V1−V3≤62.

Alternatively, a first lens and a second lens are sequentially arranged in the second lens group 12 from the object side to the image side along the optical axis. The first lens and the second lens meet the following relationship: −18≤V1−V2≤47.

Optionally, a first lens, a second lens, and a third lens are sequentially arranged in the third lens group 13 from the object side to the image side along the optical axis. The first lens, the second lens, and the third lens meet the following relationships: −35≤V1−V2≤67; and −12≤V1−V3≤56.

Alternatively, a first lens and a second lens are sequentially arranged in the third lens group 13 from the object side to the image side along the optical axis. The first lens and the second lens meet the following relationship: −38≤V1−V2≤42.

A difference between abbe coefficients of the first lens, the second lens, and the third lens in the second lens group 12 is limited to the foregoing relationships. This can further effectively reduce system dispersion through cooperation of the lenses, thereby further improving imaging definition of the zoom lens.

Optionally, a first lens, a second lens, and a third lens are sequentially arranged in the third lens group 13 from the object side to the image side along the optical axis. The first lens, the second lens, and the third lens meet the following relationships: 5≤V1−V2≤34; and −26≤V1−V3≤27.

Alternatively, a first lens and a second lens are sequentially arranged in the third lens group from the object side to the image side along the optical axis. The first lens and the second lens meet the following relationship: 13≤V1−V2≤32.

A difference between abbe coefficients of the first lens, the second lens, and the third lens in the third lens group 13 is limited to the foregoing relationships. This can effectively reduce, through cooperation between the lenses, an aberration generated when the third lens group 13 moves along the optical axis, thereby further improving imaging definition of the zoom lens in a continuous zoom process.

Optionally, a first lens, a second lens, and a third lens are sequentially arranged in the fourth lens group 14 from the object side to the image side along the optical axis. The first lens, the second lens, and the third lens meet the following relationships: −19≤V1−V2≤54; and −42≤V1−V3≤55.

Alternatively, a lens is arranged in the fourth lens group 14 from the object side to the image side along the optical axis. The first lens meets the following relationship: 35≤V1≤95.

A difference between abbe coefficients of the first lens, the second lens, and the third lens in the fourth lens group 14 is limited to the foregoing relationships. This can effectively correct, through cooperation between the lenses, image plane displacement generated by the second lens group 12 in a moving process, thereby further improving imaging definition of the zoom lens in a continuous zoom process.

Optionally, the lens may be processed into a lens with a special-shaped aperture based on an actual situation. The lens is processed into a lens with a special-shaped aperture, so that the zoom lens 10 can better adapt to assembly space in a terminal. A processing technology of the lens with a special-shaped aperture may be I-CUT, D-CUT, or the like. A height of the lens with a special-shaped aperture along an edge direction of the lens with a special-shaped aperture (the edge direction is a direction in which a cutter moves when the lens is cut, and usually includes a vertical edge direction, a horizontal edge-cutting direction, or the like) meets the following relationship: 4 mm≤H≤6 mm, where H is a height of the lens with a special-shaped aperture along an edge direction of the lens with a special-shaped aperture. This can increase luminous flux of the lens and properly reduce a height direction size of the lens.

Optionally, the zoom lens 10 further includes a prism and/or a mirror reflector (that is, the zoom lens 10 may further include a prism or a mirror reflector, or may further include a prism and a mirror reflector), and the prism and/or the mirror reflector are/is disposed on a side of the first lens group 11 facing the object side, and are/is configured to deflect a light ray to the first lens group 11. The prism may be a corner cube prism. A prism or a mirror reflector may be separately disposed in the zoom lens 10, or both a prism and a mirror reflector may be disposed in the zoom lens 10. This can properly reflect and split, by disposing the prism and/or the mirror reflector, a light ray emitted to the first lens group 11.

Optionally, the zoom lens 10 may perform clear imaging at an object distance ranging from infinity to about 40 mm away from the zoom lens 10.

The following provides 14 embodiments with reference to FIG. 15 to FIG. 56 and based on the technical parameters mentioned above, to describe some specific but non-limiting examples of embodiments of this application in more detail.

Embodiment 1

In this embodiment, ratios of focal lengths of the first lens group 11, the second lens group 12, the third lens group 13, and the fourth lens group 14 to a focal length at the telephoto end of the zoom lens 10 are determined to be 0.572, 0.182, 0.28, and 0.41 respectively.

When the zoom lens 10 changes from the wide-angle end to the telephoto end, the first lens group 11 and the third lens group 13 are fastened, the second lens group 12 moves towards the image side, and the fourth lens group 14 first moves towards the object side and then moves towards the image side.

The maximum clear aperture diameter of the zoom lens 10, namely, a maximum diameter of a lens in the zoom lens 10, is determined to be 7.878 mm.

In this case, the first lens group 11, the second lens group 12, the third lens group 13, and the fourth lens group 14 each have three lenses arranged from the object side to the image side along the optical axis. In addition, the first lens group 11, the second lens group 12, the third lens group 13, and the fourth lens group 14 include 19 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 0.95, and a ratio of an image height of the zoom lens 10 to the effective focal length at the telephoto end of the zoom lens 10 is determined to be 0.093.

When the zoom lens 10 changes from the wide-angle end to the telephoto end, a ratio of a movement distance of the second lens group 12 along the optical axis to the total optical length of the zoom lens is determined to be 0.1936, and a ratio of a movement distance of the fourth lens group 14 along the optical axis to the total optical length of the zoom lens is determined to be 0.1329.

After the foregoing parameters are used, technical effect that can be achieved by the zoom lens 10 is shown in Table 1A to Table 1D.

TABLE 1A

|  | W | M1 | M2 | T |
|---|---|---|---|---|
| Focal length (mm) | 9.300 | 13.000 | 15.041 | 26.800 |
| F-number | 2.864 | 2.930 | 2.950 | 3.527 |
| Image height IMH (mm) | 2.500 | 2.500 | 2.500 | 2.500 |
| Half FOV (°) | 15.488 | 10.774 | 9.257 | 5.139 |
| BFL (mm) | 4.142 | 4.703 | 4.713 | 1.323 |
| TTL (mm) | 25.500 | 25.500 | 25.500 | 25.500 |
| Designed wavelength | 650 nm, 610 nm, 555 nm, 510 nm, and 470 nm | | | |

Table 1A indicates basic optical parameters of the zoom lens 10 at the wide-angle end, a first intermediate focal length, a second intermediate focal length, and the telephoto end when wavelengths of the zoom lens are respectively 650 nm, 610 nm, 555 nm, 510 nm, and 470 nm. W indicates the wide-angle state, M1 indicates the first intermediate focal length state, M2 indicates the second intermediate focal length state, T indicates the telephoto state, BFL indicates a back focal length (of the zoom lens 10), TTL indicates a total length (of the lens) from a head of a lens tube to an imaging plane, FOV indicates a field of view in degrees, and an F-number indicates a ratio of a focal length of the zoom lens 10 to a diameter of a clear aperture of the zoom lens 10. It can be seen from Table 1A that when the image height and TTL remain unchanged, both the focal length and the F-number increase.

TABLE 1B

| R |  | Thickness |  | nd |  | vd |  |
|---|---|---|---|---|---|---|---|
| R1 | 9.427 | d1 | 1.786 | n1 | 1.55 | v1 | 69.0 |
| R2 | −12.819 | a1 | 0.070 |  |  |  |  |
| R3 | −48.300 | d2 | 0.360 | n2 | 1.95 | v2 | 17.9 |
| R4 | −45.863 | a2 | 0.071 |  |  |  |  |
| R5 | −43.002 | d3 | 0.360 | n3 | 1.82 | v3 | 23.1 |
| R6 | 42.580 | a3 | 0.662 |  |  |  |  |
| R7 | −145.963 | d4 | 0.456 | n4 | 1.87 | v4 | 19.4 |
| R8 | −27.629 | a4 | 0.411 |  |  |  |  |
| R9 | −7.072 | d5 | 0.360 | n5 | 1.69 | v5 | 54.3 |
| R10 | 3.656 | a5 | 0.144 |  |  |  |  |
| R11 | 3.569 | d6 | 0.558 | n6 | 1.95 | v6 | 17.9 |
| R12 | 4.436 | a6 | 5.436 |  |  |  |  |
| R13 | 3.432 | d7 | 1.636 | n7 | 1.55 | v7 | 69.1 |
| R14 | −8.146 | a7 | 0.695 |  |  |  |  |
| R15 | −287.23 | d8 | 1.717 | n8 | 1.76 | v8 | 22.6 |
| R16 | 4.927 | a8 | 1.156 |  |  |  |  |
| R17 | −8.684 | d9 | 0.570 | n9 | 1.85 | v9 | 42.7 |
| R18 | −11.222 | a9 | 0.995 |  |  |  |  |
| R19 | 5.139 | d10 | 0.748 | n10 | 1.64 | v10 | 35.6 |
| R20 | 9.417 | a10 | 1.904 |  |  |  |  |
| R21 | 48.091 | d11 | 0.360 | n11 | 1.60 | v11 | 35.1 |
| R22 | 5.641 | a11 | 0.070 |  |  |  |  |
| R23 | 5.343 | d12 | 0.831 | n12 | 1.70 | v12 | 34.7 |
| R24 | Infinity | a12 | 3.332 |  |  |  |  |
| R25 | Infinity | d13 | 0.210 | n13 | 1.52 | v13 | 64.2 |
| R26 | Infinity | a13 | 0.600 |  |  |  |  |

Table 1B indicates a curvature, a thickness, a refractive index, and an abbe coefficient of each lens from the object side to the image side when the zoom lens 10 is at the wide-angle end. R1 to R26 indicate surfaces from the object side to the image side of each lens, R indicates a curvature, Thickness indicates a thickness, nd indicates a refractive index, and vd indicates an abbe coefficient. In this application, the foregoing parameter symbols have the same meanings, and details are not described below again.

TABLE 1C

| | Type | K | A2 | A3 | A4 | A5 | A6 | A7 |
|---|---|---|---|---|---|---|---|---|
| | | | Aspheric coefficient | | | | | |
| R1 | Even aspheric | 0.00 | 1.57E−04 | −1.75E−05 | 4.21E−06 | −5.64E−07 | 3.58E−08 | −9.42E−10 |
| R2 | Even aspheric | 0.00 | 5.82E−04 | −6.39E−06 | −1.03E−06 | 1.02E−07 | −2.88E−09 | −6.23E−11 |
| R5 | Even aspheric | 0.00 | 2.28E−05 | 2.28E−05 | 5.41E−07 | −1.83E−07 | 1.00E−08 | 0.00E+00 |
| R6 | Even aspheric | 0.00 | 1.59E−05 | 1.18E−05 | 6.01E−06 | −9.98E−07 | 6.45E−08 | −1.31E−09 |
| R9 | Even aspheric | 0.00 | 3.10E−04 | 2.39E−04 | −4.19E−05 | 2.69E−06 | 1.22E−07 | −1.60E−08 |
| R10 | Even aspheric | 0.00 | −1.85E−03 | −5.13E−05 | −4.35E−05 | 7.06E−06 | −9.06E−07 | 5.54E−08 |
| R11 | Even aspheric | 0.00 | −3.68E−03 | −3.68E−04 | −6.99E−06 | 3.03E−06 | −6.95E−07 | −3.36E−08 |
| R12 | Even aspheric | 0.00 | −4.19E−03 | −1.70E−04 | 2.23E−06 | −6.71E−07 | −3.60E−07 | −3.49E−08 |
| R13 | Even aspheric | 0.00 | −1.94E−03 | −8.37E−05 | −1.03E−05 | 3.96E−07 | −1.54E−07 | 1.44E−08 |
| R14 | Even aspheric | 0.00 | 2.23E−03 | −5.47E−05 | 8.42E−06 | −2.20E−06 | 4.48E−07 | −2.59E−08 |
| R15 | Even aspheric | 0.00 | −5.87E−04 | 8.27E−05 | 3.00E−05 | −3.37E−06 | 5.40E−07 | −1.04E−07 |
| R16 | Even aspheric | 0.00 | 2.95E−03 | 7.03E−04 | 2.03E−04 | 8.18E−06 | −5.31E−07 | −4.88E−08 |
| R17 | Even aspheric | 0.00 | 1.19E−02 | 3.87E−06 | 1.25E−04 | −3.21E−05 | 9.48E−07 | −1.43E−08 |
| R18 | Even aspheric | 0.00 | 1.04E−02 | 9.61E−05 | 5.52E−05 | −2.16E−05 | 1.81E−08 | 1.46E−09 |
| R19 | Even aspheric | 0.00 | −3.38E−03 | −2.18E−04 | −4.42E−05 | 6.37E−06 | −3.46E−07 | −4.87E−08 |
| R20 | Even aspheric | 0.00 | −4.21E−03 | −1.76E−04 | −3.10E−05 | 7.57E−06 | −9.79E−07 | 1.57E−08 |
| R21 | Even aspheric | 0.00 | −1.36E−03 | 5.30E−04 | −3.27E−05 | 9.47E−07 | 2.63E−08 | −7.77E−10 |
| R22 | Even aspheric | −1.29 | −2.63E−04 | −4.54E−04 | 9.55E−06 | 0.00E+00 | 0.00E+00 | 0.00E+00 |
| R23 | Even aspheric | 0.00 | −2.70E−04 | −9.03E−04 | 9.09E−05 | −1.12E−05 | 7.06E−07 | −1.73E−08 |

In Table 1C, R1 to R23 indicate mirrors that are aspheric surfaces, K is a conic constant, and A2, A3, A4, A5, A6, and A7 are aspheric coefficients respectively. It can be seen from Table 1C that, in Embodiment 1, the first lens group 11, the second lens group 12, the third lens group 13, and the fourth lens group 14 of the zoom lens 10 include 19 aspheric surfaces in total.

After the aspheric coefficients are obtained, the aspheric coefficients may be substituted into the following formula to obtain a solution:

$$z = \frac{cr^2}{1+\sqrt{1-Kc^2r^2}} + A_2r^4 + A_3r^6 + A_4r^8 + A_5r^{10} + A_6r^{12} + A_7r^{14} \quad (1)$$

In formula (1), z indicates a vector height of the aspheric surface, r indicates a radial coordinate of the aspheric surface, and c is a spherical curvature of a vertex on the aspheric surface.

TABLE 1D

| | W | M1 | M2 | T |
|---|---|---|---|---|
| a3 | 0.662 mm | 2.360 mm | 3.070 mm | 5.599 mm |
| a6 | 5.436 mm | 3.739 mm | 3.029 mm | 0.500 mm |
| a9 | 0.995 mm | 0.434 mm | 0.424 mm | 3.814 mm |
| a12 | 3.332 mm | 3.893 mm | 3.903 mm | 0.513 mm |

Table 1D indicates spacings between the first lens group 11 to the fourth lens group 14 when the zoom lens 10 is in the wide-angle state, the first intermediate focal length state, the second intermediate focal length state, and the telephoto state.

Figure 15:
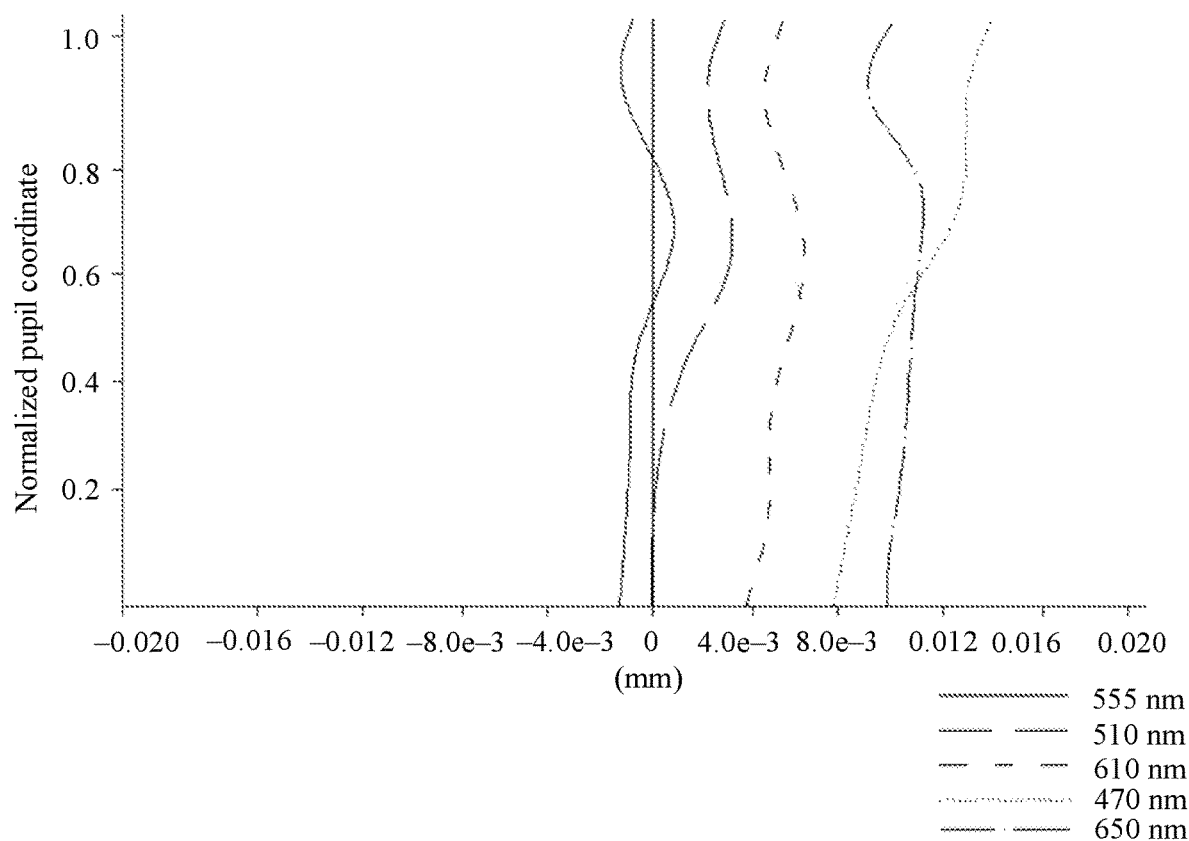
FIG. 15 shows axial chromatic aberration curves of the zoom lens in the wide-angle state according to an embodiment of this application.

FIG. 15 shows axial chromatic aberration curves of the zoom lens 10 at the wide-angle end at different wavelengths (555 nm, 510 nm, 610 nm, 470 nm, and 650 nm, and different wavelengths appearing in the following all use the foregoing five wavelength values). It can be seen from FIG. 15 that, in Embodiment 1, an axial chromatic aberration of the zoom lens 10 using the foregoing technical parameters can be controlled within a small change range from 0.01 mm to 0.02 mm.

Figure 29:
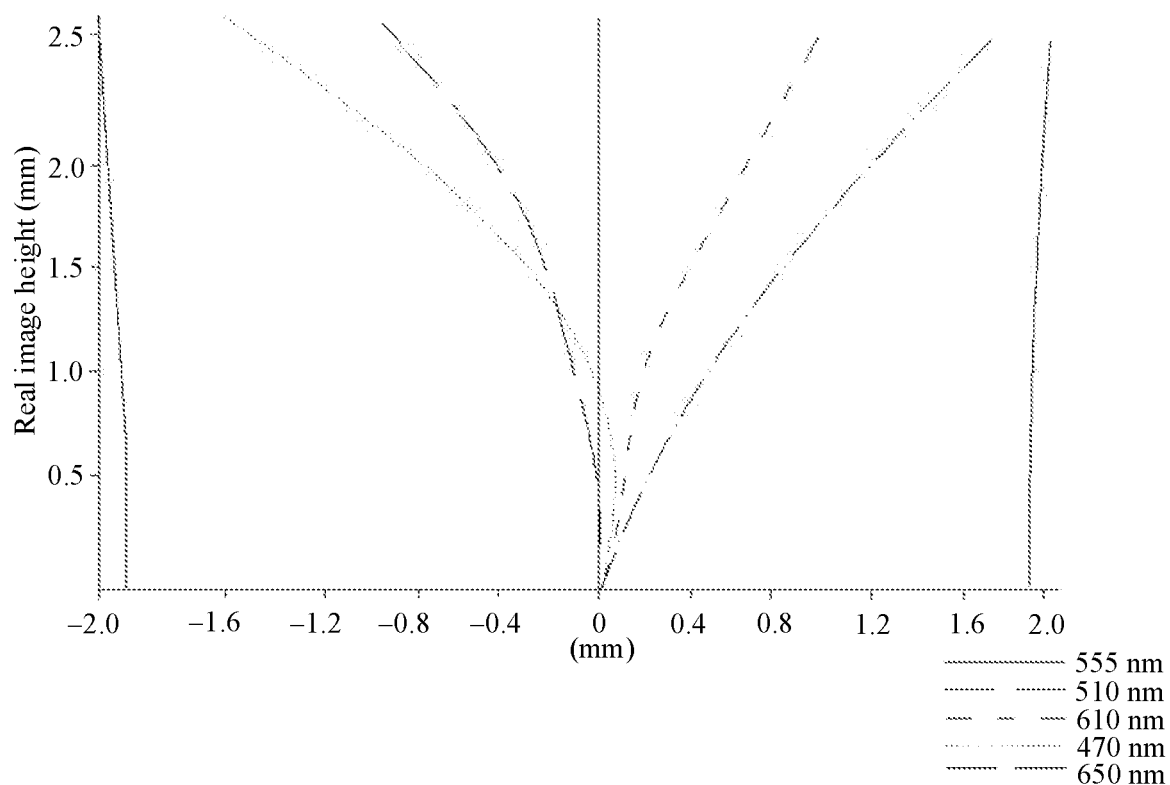
FIG. 29 shows lateral chromatic aberration curves of the zoom lens in the wide-angle state according to an embodiment of this application.

FIG. 29 shows lateral chromatic aberration curves of the zoom lens 10 at the wide-angle end at different wavelengths. It can be seen from FIG. 29 that, in Embodiment 1, a lateral chromatic aberration of the zoom lens 10 using the foregoing technical parameters can be controlled within a lateral diffraction limit range.

Figure 43:
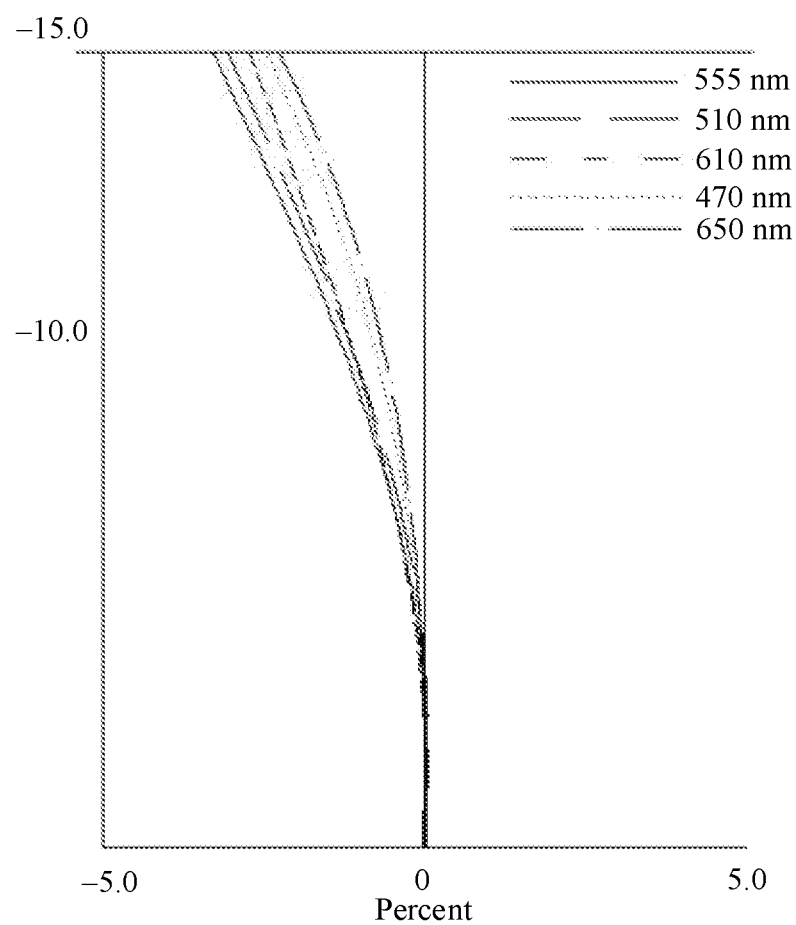
FIG. 43 shows distortion percentage curves of the zoom lens in the wide-angle state according to an embodiment of this application.

FIG. 43 shows distortion curves of the zoom lens 10 at the wide-angle end at different wavelengths. The distortion curve indicates a deviation between imaging deformation and an ideal shape. It can be seen from FIG. 43 that, in Embodiment 1, a distortion rate of the zoom lens 10 using the foregoing technical parameters can be effectively controlled below 4%.

Embodiment 2

In this embodiment, ratios of focal lengths of the first lens group 11, the second lens group 12, the third lens group 13, and the fourth lens group 14 to a focal length at the telephoto end of the zoom lens 10 are determined to be 0.57, 0.18, 0.32, and 0.40 respectively.

When the zoom lens 10 changes from the wide-angle end to the telephoto end, the first lens group 11 and the third lens group 13 are fastened, the second lens group 12 moves towards the image side, and the fourth lens group 14 first moves towards the object side and then moves towards the image side.

The maximum clear aperture diameter of the zoom lens 10, namely, a maximum diameter of a lens in the zoom lens 10, is determined to be 7.8 mm.

In this case, the first lens group 11, the second lens group 12, and the third lens group 13 each have two lenses arranged from the object side to the image side along the optical axis, and the fourth lens group 14 has one lens arranged. The first lens group 11, the second lens group 12, the third lens group 13, and the fourth lens group 14 include 14 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 0.95, and a ratio of an image height of the zoom lens 10 to the effective focal length at the telephoto end of the zoom lens 10 is determined to be 0.093.

When the zoom lens 10 changes from the wide-angle end to the telephoto end, a ratio of a movement distance of the second lens group 12 along the optical axis to the total optical length of the zoom lens is determined to be 0.2036, and a ratio of a movement distance of the fourth lens group 14 along the optical axis to the total optical length of the zoom lens is determined to be 0.1385.

After the foregoing parameters are used, technical effect that can be achieved by the zoom lens 10 is shown in Table 2A to Table 2D.

TABLE 2A

|  | W | M1 | M2 | T |
|---|---|---|---|---|
| Focal length (mm) | 9.300 | 13.000 | 15.041 | 26.800 |
| F-number | 2.879 | 2.954 | 2.976 | 3.505 |
| Image height IMH (mm) | 2.500 | 2.500 | 2.500 | 2.500 |
| Half FOV (°) | 15.493 | 10.833 | 9.309 | 5.175 |
| BFL (mm) | 7.521 | 8.054 | 8.098 | 4.566 |
| TTL (mm) | 25.500 | 25.500 | 25.500 | 25.500 |
| Designed wavelength | 650 nm, 610 nm, 555 nm, 510 nm, and 470 nm | | | |

Table 2A indicates basic optical parameters of the zoom lens 10 at the wide-angle end, the first intermediate focal length, the second intermediate focal length, and the telephoto end. It can be seen from Table 2A that when the image height and TTL remain unchanged, both the focal length and the F-number increase. The zoom lens 10 shows a typical feature of implementing a focal length change from zoom from the wide-angle end to the telephoto end.

TABLE 2B

|  | R |  | Thickness |  | nd |  | vd |
|---|---|---|---|---|---|---|---|
| R1 | 8.516 | d1 | 1.870 | n1 | 1.55 | v1 | 70.0 |
| R2 | −17.274 | a1 | 0.277 | | | | |
| R3 | 49.166 | d2 | 0.360 | n2 | 1.84 | v2 | 21.9 |
| R4 | 16.993 | a2 | 1.303 | | | | |
| R5 | −9.476 | d3 | 0.360 | n3 | 1.69 | v3 | 54.3 |
| R6 | 3.537 | a3 | 0.258 | | | | |
| R7 | 3.809 | d4 | 0.569 | n4 | 1.95 | v4 | 17.9 |
| R8 | 4.952 | a4 | 5.692 | | | | |
| R9 | 3.457 | d5 | 1.694 | n5 | 1.55 | v5 | 70.2 |
| R10 | −10.754 | a5 | 0.702 | | | | |
| R11 | 41.187 | d6 | 1.361 | n6 | 1.74 | v6 | 23.6 |
| R12 | 3.982 | a6 | 2.083 | | | | |
| R13 | 8.275 | d7 | 1.450 | n7 | 1.63 | v7 | 34.5 |
| R14 | −32.609 | a7 | 6.711 | | | | |
| R15 | Infinity | d8 | 0.210 | n8 | 1.76 | v8 | 22.6 |
| R16 | Infinity | a8 | 0.600 | | | | |

Table 2B indicates a curvature, a thickness, a refractive index, and an abbe coefficient of each lens from the object side to the image side when the zoom lens 10 is at the wide-angle end. R1 to R16 indicate surfaces from the object side to the image side of each lens, R indicates a curvature, Thickness indicates a thickness, nd indicates a refractive index, and vd indicates an abbe coefficient.

TABLE 2C

| | | | | Aspheric coefficient | | | | |
|---|---|---|---|---|---|---|---|---|
| | Type | K | A2 | A3 | A4 | A5 | A6 | A7 |
| R1 | Even aspheric | 0.00 | 1.29E−04 | −1.59E−05 | 4.12E−06 | −5.65E−07 | 3.63E−08 | −9.47E−10 |
| R2 | Even aspheric | 0.00 | 5.13E−04 | −6.75E−06 | −1.04E−06 | 1.03E−07 | −2.86E−09 | −7.43E−11 |
| R3 | Even aspheric | 0.00 | 2.66E−06 | 2.00E−05 | 6.59E−07 | −1.77E−07 | 1.02E−08 | 0.00E+00 |
| R4 | Even aspheric | 0.00 | 3.43E−05 | 1.34E−05 | 5.70E−06 | −9.74E−07 | 6.70E−08 | −1.36E−09 |
| R5 | Even aspheric | 0.00 | −2.66E−04 | 2.00E−04 | −4.11E−05 | 3.03E−06 | 1.93E−07 | −2.40E−08 |
| R6 | Even aspheric | 0.00 | −1.81E−03 | −9.23E−05 | −6.03E−05 | 3.61E−06 | −1.07E−08 | 5.50E−08 |
| R7 | Even aspheric | 0.00 | −3.23E−03 | −3.88E−04 | −1.63E−05 | −1.27E−06 | −3.13E−07 | −3.28E−08 |
| R8 | Even aspheric | 0.00 | −3.96E−03 | −2.32E−04 | −6.80E−06 | −2.77E−06 | −2.32E−07 | −3.53E−08 |
| R9 | Even aspheric | 0.00 | −1.66E−03 | −2.64E−05 | −5.78E−06 | 8.57E−07 | −8.58E−08 | 6.82E−09 |
| R10 | Even aspheric | 0.00 | 2.35E−03 | −4.25E−05 | 1.08E−05 | −2.17E−06 | 4.23E−07 | −3.02E−08 |

TABLE 2C-continued

| | | | Aspheric coefficient | | | | | |
|---|---|---|---|---|---|---|---|---|
| | Type | K | A2 | A3 | A4 | A5 | A6 | A7 |
| R11 | Even aspheric | 0.00 | 8.84E−05 | −6.55E−05 | −1.09E−05 | 2.88E−06 | −1.73E−07 | −1.06E−07 |
| R12 | Even aspheric | 0.00 | 1.88E−03 | 1.78E−04 | 5.31E−05 | 9.79E−06 | −6.76E−07 | −4.88E−08 |
| R13 | Even aspheric | 0.00 | −1.05E−03 | −1.82E−04 | −3.36E−05 | 3.37E−06 | −1.67E−07 | −3.83E−08 |
| R14 | Even aspheric | 0.00 | −1.01E−03 | −1.74E−04 | −3.27E−05 | 3.73E−06 | −3.88E−07 | 7.17E−09 |

In Table 2C, R1 to R14 indicate mirrors that are aspheric surfaces, K is a conic constant, and A2, A3, A4, A5, A6, and A7 are aspheric coefficients respectively. It can be seen from Table 2C that, in Embodiment 2, the first lens group 11, the second lens group 12, the third lens group 13, and the fourth lens group 14 of the zoom lens 10 include 14 aspheric surfaces in total.

Table 2D indicates spacings between the first lens group 11 to the fourth lens group 14 when the zoom lens 10 is in the wide-angle state, the first intermediate focal length state, the second intermediate focal length state, and the telephoto state.

Figure 16:
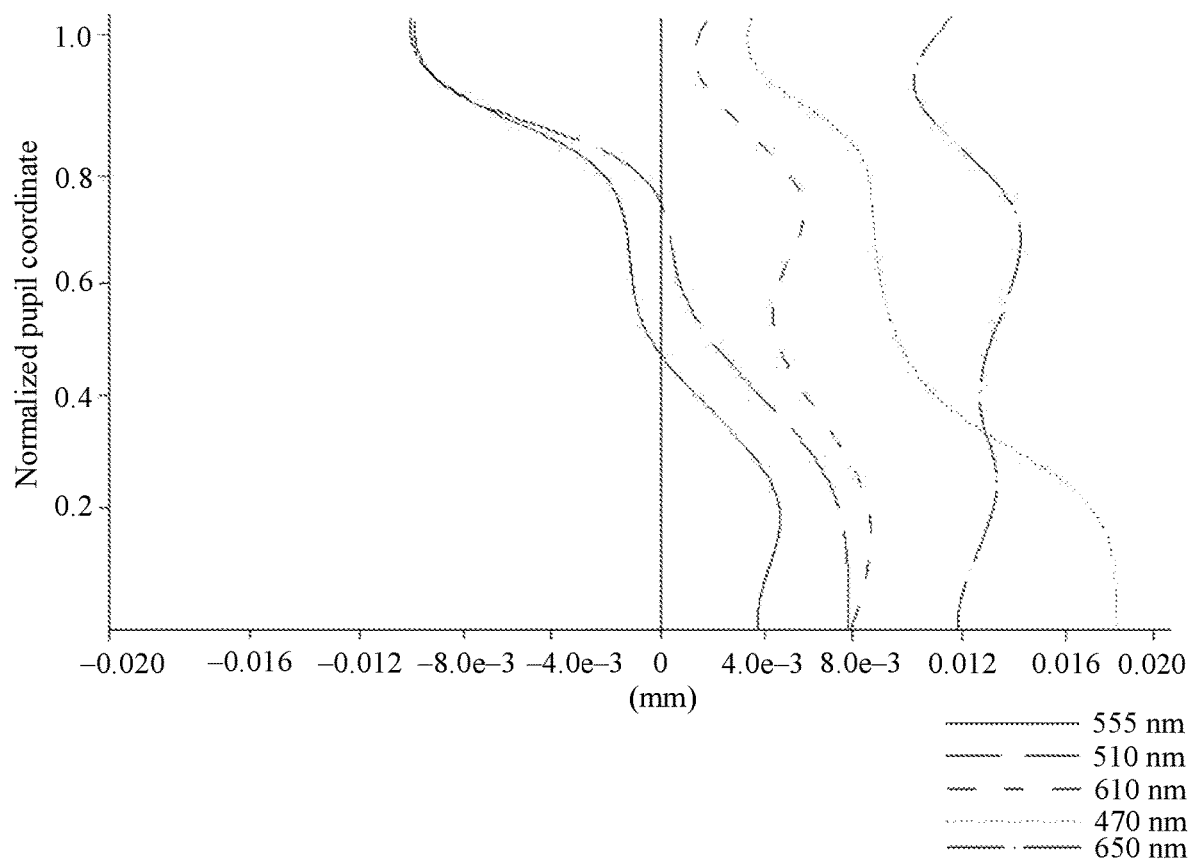
FIG. 16 shows axial chromatic aberration curves of the zoom lens in the wide-angle state according to Embodiment 2 of this application.

FIG. 16 shows axial chromatic aberration curves of the zoom lens 10 at the wide-angle end at different wavelengths. It can be seen from FIG. 16 that, in Embodiment 2, an axial chromatic aberration of the zoom lens 10 using the foregoing technical parameters can be controlled within a small change range from 0.015 mm to 0.025 mm.

Figure 30:
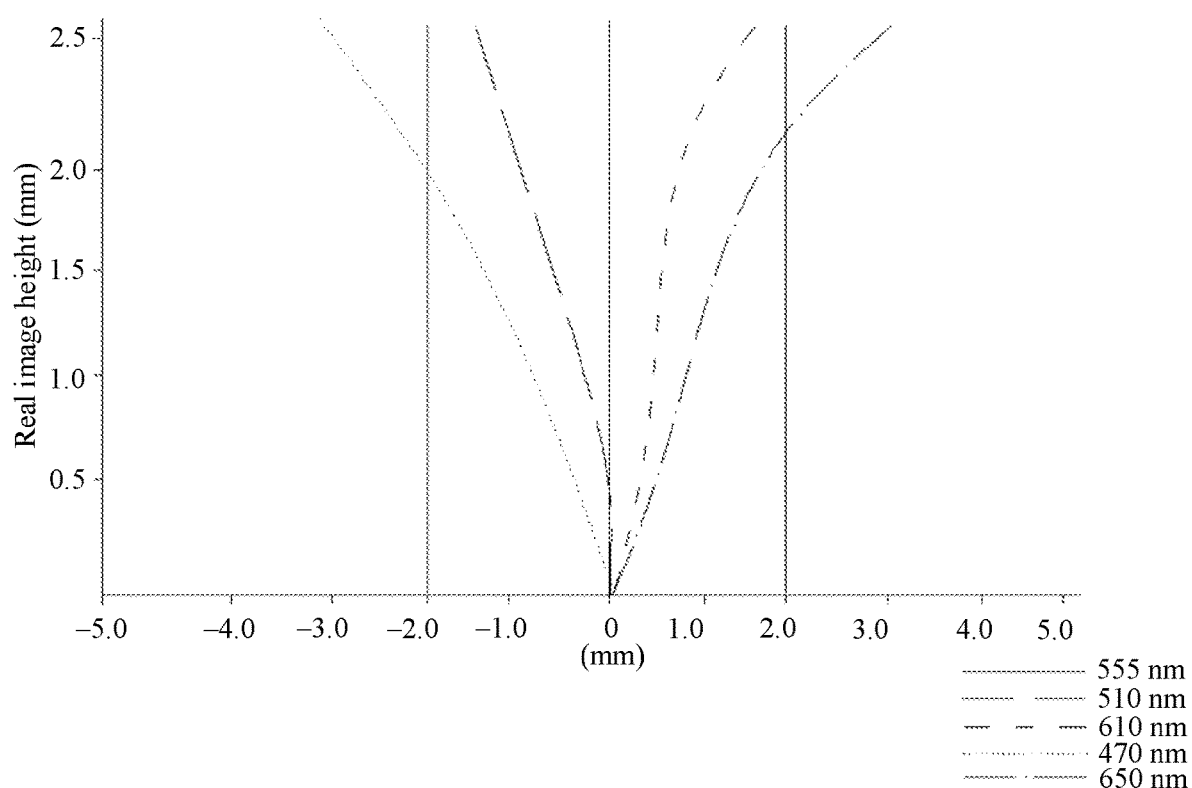
FIG. 30 shows lateral chromatic aberration curves of the zoom lens in the wide-angle state according to an embodiment of this application.

FIG. 30 shows lateral chromatic aberration curves of the zoom lens 10 at the wide-angle end at different wavelengths. It can be seen from FIG. 26 that, in Embodiment 2, for lateral chromatic aberrations of the zoom lens 10 using the foregoing technical parameters at the wide-angle end and the telephoto end at different wavelengths, a light ray with a wavelength of 650 nm and a light ray with a wavelength of 470 nm exceeds lateral diffraction limits.

TABLE 2D

| | W | M1 | M2 | T |
|---|---|---|---|---|
| a2 | 1.303 mm | 2.925 mm | 3.622 mm | 6.495 mm |
| a4 | 5.692 mm | 4.071 mm | 3.373 mm | 0.500 mm |
| a6 | 2.083 mm | 1.550 mm | 1.506 mm | 5.038 mm |
| a7 | 6.711 mm | 7.244 mm | 7.288 mm | 3.756 mm |

Figure 44:
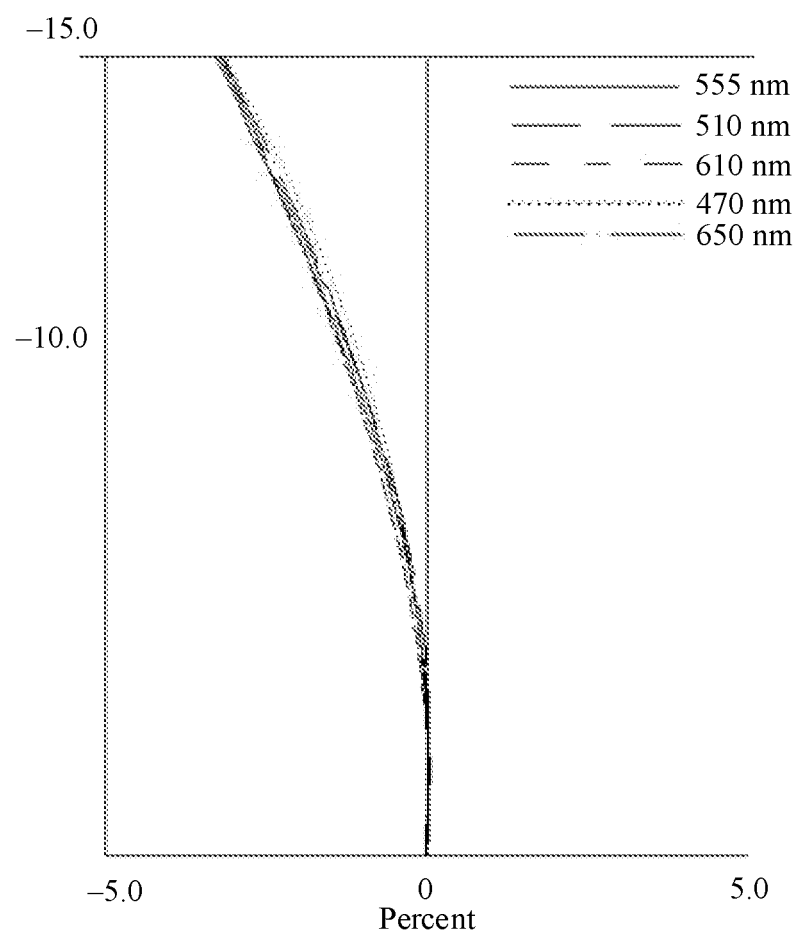
FIG. 44 shows distortion percentage curves of the zoom lens in the wide-angle state according to an embodiment of this application.

FIG. 44 shows distortion curves of the zoom lens 10 at the wide-angle end at different wavelengths. The distortion curve indicates a deviation between imaging deformation and an ideal shape. It can be seen from FIG. 44 that, in Embodiment 2, a distortion rate of the zoom lens 10 using the foregoing technical parameters can be effectively controlled below 3.8%.

Embodiment 3

In this embodiment, ratios of focal lengths of the first lens group 11, the second lens group 12, the third lens group 13, and the fourth lens group 14 to a focal length at the telephoto end of the zoom lens 10 are determined to be 2.09, 0.33, 0.33, and 0.75 respectively.

When the zoom lens 10 changes from the wide-angle end to the telephoto end, the first lens group 11 and the third lens group 13 are fastened, the second lens group 12 moves towards the image side, and the fourth lens group 14 moves towards the object side.

The maximum clear aperture diameter of the zoom lens 10, namely, a maximum diameter of a lens in the zoom lens 10, is determined to be 8.654 mm.

In this case, the first lens group 11, the second lens group 12, the third lens group 13, and the fourth lens group 14 each have three lenses arranged from the object side to the image side along the optical axis. The first lens group 11, the second lens group 12, the third lens group 13, and the fourth lens group 14 include 24 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 0.95, and a ratio of an image height of the zoom lens 10 to the effective focal length at the telephoto end of the zoom lens 10 is determined to be 0.093.

When the zoom lens 10 changes from the wide-angle end to the telephoto end, a ratio of a movement distance of the second lens group 12 along the optical axis to the total optical length of the zoom lens is determined to be 0.1960, and a ratio of a movement distance of the fourth lens group 14 along the optical axis to the total optical length of the zoom lens is determined to be 0.1789.

After the foregoing parameters are used, technical effect that can be achieved by the zoom lens 10 is shown in Table 3A to Table 3D.

TABLE 3A

| | W | M1 | M2 | T |
|---|---|---|---|---|
| Focal length (mm) | 9.300 | 13.000 | 15.041 | 26.797 |
| F-number | 2.786 | 2.872 | 2.908 | 3.625 |
| Image height IMH (mm) | 2.500 | 2.500 | 2.500 | 2.500 |
| Half FOV (°) | 15.143 | 10.992 | 9.474 | 5.277 |
| BFL (mm) | 0.860 | 1.954 | 2.516 | 5.423 |
| TTL (mm) | 25.500 | 25.500 | 25.500 | 25.500 |
| Designed wavelength | 650 nm, 610 nm, 555 nm, 510 nm, and 470 nm | | | |

Table 3A indicates basic optical parameters of the zoom lens 10 at the wide-angle end, the first intermediate focal length, the second intermediate focal length, and the telephoto end. It can be seen from Table 3A that when the image height and TTL remain unchanged, both the focal length and the F-number increase. The zoom lens 10 shows a typical feature of implementing a focal length change from zoom from the wide-angle end to the telephoto end.

TABLE 3B

| | R | | Thickness | nd | | vd | |
|---|---|---|---|---|---|---|---|
| R1 | 7.078 | d1 | 2.196 | n1 | 1.56 | v1 | 67.3 |
| R2 | −29.021 | a1 | 0.070 | | | | |
| R3 | −367.032 | d2 | 0.369 | n2 | 1.65 | v2 | 29.9 |
| R4 | −323.264 | a2 | 0.070 | | | | |
| R5 | 48.946 | d3 | 0.360 | n3 | 1.93 | v3 | 24.7 |
| R6 | 8.115 | a3 | 0.500 | | | | |
| R7 | 7.212 | d4 | 0.875 | n4 | 1.93 | v4 | 18.2 |
| R8 | 14.459 | a4 | 0.890 | | | | |
| R9 | −10.416 | d5 | 0.360 | n5 | 1.69 | v5 | 54.1 |
| R10 | 4.019 | a5 | 0.050 | | | | |
| R11 | 3.492 | d6 | 0.474 | n6 | 1.95 | v6 | 17.9 |
| R12 | 3.856 | a6 | 5.499 | | | | |
| R13 | 3.982 | d7 | 2.118 | n7 | 1.57 | v7 | 66.4 |
| R14 | −6.900 | a7 | 0.070 | | | | |
| R15 | 86.504 | d8 | 0.360 | n8 | 1.93 | v8 | 24.2 |
| R16 | 6.032 | a8 | 0.050 | | | | |
| R17 | 4.494 | d9 | 0.566 | n9 | 1.50 | v9 | 81.6 |
| R18 | 4.734 | a9 | 4.613 | | | | |
| R19 | 3.434 | d10 | 2.039 | n10 | 1.57 | v10 | 41.6 |
| R20 | 26.077 | a10 | 1.925 | | | | |
| R21 | −8.158 | d11 | 0.360 | n11 | 1.91 | v11 | 35.3 |
| R22 | 18.132 | a11 | 0.354 | | | | |
| R23 | −278.845 | d12 | 0.472 | n12 | 1.50 | v12 | 81.6 |
| R24 | 10.229 | a12 | 0.050 | | | | |
| R25 | Infinity | d13 | 0.210 | n13 | 1.52 | v13 | 64.2 |
| R26 | Infinity | a13 | 0.600 | | | | |

Table 3B indicates a curvature, a thickness, a refractive index, and an abbe coefficient of each lens from the object side to the image side when the zoom lens 10 is at the wide-angle end. R1 to R26 indicate surfaces from the object side to the image side of each lens, R indicates a curvature, Thickness indicates a thickness, nd indicates a refractive index, and vd indicates an abbe coefficient.

TABLE 3C

| | | Aspheric coefficient | | | | | | |
|---|---|---|---|---|---|---|---|---|
| | Type | K | A2 | A3 | A4 | A5 | A6 | A7 |
| R1 | Even aspheric | 0.00 | −7.88E−05 | −1.69E−05 | 4.67E−06 | −5.82E−07 | 3.45E−08 | −8.17E−10 |
| R2 | Even aspheric | 0.00 | 5.55E−04 | −2.91E−06 | −8.76E−07 | 1.08E−07 | −3.27E−09 | −5.88E−11 |
| R3 | Even aspheric | 0.00 | 3.10E−05 | −1.85E−07 | 2.36E−07 | 1.48E−08 | 1.33E−09 | 7.27E−11 |
| R4 | Even aspheric | 0.00 | −3.68E−05 | 1.34E−06 | −8.48E−08 | 4.41E−09 | 7.55E−10 | 9.43E−11 |
| R5 | Even aspheric | 0.00 | 1.52E−04 | 1.98E−05 | 3.86E−07 | −2.24E−07 | 8.12E−09 | 0.00E+00 |
| R6 | Even aspheric | 0.00 | −9.44E−05 | 2.70E−05 | 5.09E−06 | −1.04E−06 | 6.51E−08 | −1.19E−09 |
| R7 | Even aspheric | 0.00 | 2.11E−04 | 3.13E−05 | −2.04E−06 | −1.00E−07 | 4.60E−09 | −3.21E−10 |
| R8 | Even aspheric | 0.00 | 1.09E−05 | −7.62E−06 | −1.40E−06 | −3.10E−07 | −1.54E−08 | 2.08E−09 |
| R9 | Even aspheric | 0.00 | −1.99E−04 | 1.53E−04 | −3.73E−05 | 3.20E−06 | −9.33E−08 | 5.25E−10 |
| R10 | Even aspheric | 0.00 | −1.87E−03 | −1.19E−06 | −4.89E−05 | 6.45E−06 | −1.02E−06 | 4.73E−08 |
| R11 | Even aspheric | 0.00 | −4.07E−03 | −3.38E−04 | −4.37E−07 | 1.86E−06 | −8.23E−07 | 3.13E−08 |
| R12 | Even aspheric | 0.00 | −4.16E−03 | −1.47E−04 | −5.91E−06 | 2.06E−06 | −4.68E−07 | 1.69E−08 |
| R13 | Even aspheric | 0.00 | −2.17E−03 | −3.78E−05 | −1.06E−05 | −6.10E−07 | −2.60E−07 | 4.49E−09 |
| R14 | Even aspheric | 0.00 | 2.30E−03 | −1.54E−04 | 7.41E−06 | −2.90E−06 | 3.22E−07 | −1.69E−08 |
| R15 | Even aspheric | 0.00 | −3.21E−04 | 3.67E−04 | 3.33E−05 | −3.26E−06 | 5.46E−07 | −3.62E−08 |
| R16 | Even aspheric | 0.00 | 1.86E−03 | 3.83E−04 | 9.45E−05 | −1.30E−06 | −3.63E−07 | −3.51E−08 |
| R17 | Even aspheric | 0.00 | 8.84E−03 | −2.75E−04 | 1.97E−04 | −4.99E−05 | 2.49E−06 | −3.23E−08 |
| R18 | Even aspheric | 0.00 | 5.41E−03 | 3.02E−04 | −4.30E−07 | −2.06E−05 | 3.94E−07 | 4.92E−08 |
| R19 | Even aspheric | 0.00 | −2.33E−03 | −9.78E−05 | −2.06E−05 | −2.43E−06 | 5.68E−07 | −5.32E−08 |
| R20 | Even aspheric | 0.00 | −7.99E−03 | 3.66E−04 | −2.31E−05 | 6.78E−06 | −9.28E−07 | 3.43E−08 |
| R21 | Even aspheric | 0.00 | −1.43E−02 | 3.17E−04 | 5.59E−04 | −5.66E−05 | 8.54E−07 | −1.37E−09 |
| R22 | Even aspheric | −1.29 | 1.91E−02 | 5.84E−05 | −1.89E−04 | 0.00E+00 | 0.00E+00 | 0.00E+00 |
| R23 | Even aspheric | 0.00 | 2.12E−02 | −2.51E−03 | 1.07E−04 | 1.48E−05 | −2.81E−06 | −1.82E−08 |
| R24 | Even aspheric | 0.00 | −2.20E−02 | 1.98E−03 | −3.88E−05 | −2.16E−05 | 3.58E−15 | 2.68E−16 |

In Table 3C, R1 to R24 indicate mirrors that are aspheric surfaces, K is a conic constant, and A2, A3, A4, A5, A6, and A7 are aspheric coefficients respectively. It can be seen from Table 3C that, in Embodiment 3, the first lens group 11, the second lens group 12, the third lens group 13, and the fourth lens group 14 of the zoom lens 10 include 24 aspheric surfaces in total.

TABLE 3D

|  | W | M1 | M2 | T |
|---|---|---|---|---|
| a3 | 0.500 mm | 2.556 mm | 3.301 mm | 5.499 mm |
| a6 | 5.499 mm | 3.444 mm | 2.698 mm | 0.500 mm |
| a9 | 4.613 mm | 3.519 mm | 2.956 mm | 0.050 mm |
| a12 | 0.050 mm | 1.144 mm | 1.706 mm | 4.613 mm |

Table 3D indicates spacings between the first lens group 11 to the fourth lens group 14 when the zoom lens 10 is in the wide-angle state, the first intermediate focal length state, the second intermediate focal length state, and the telephoto state.

Figure 17:
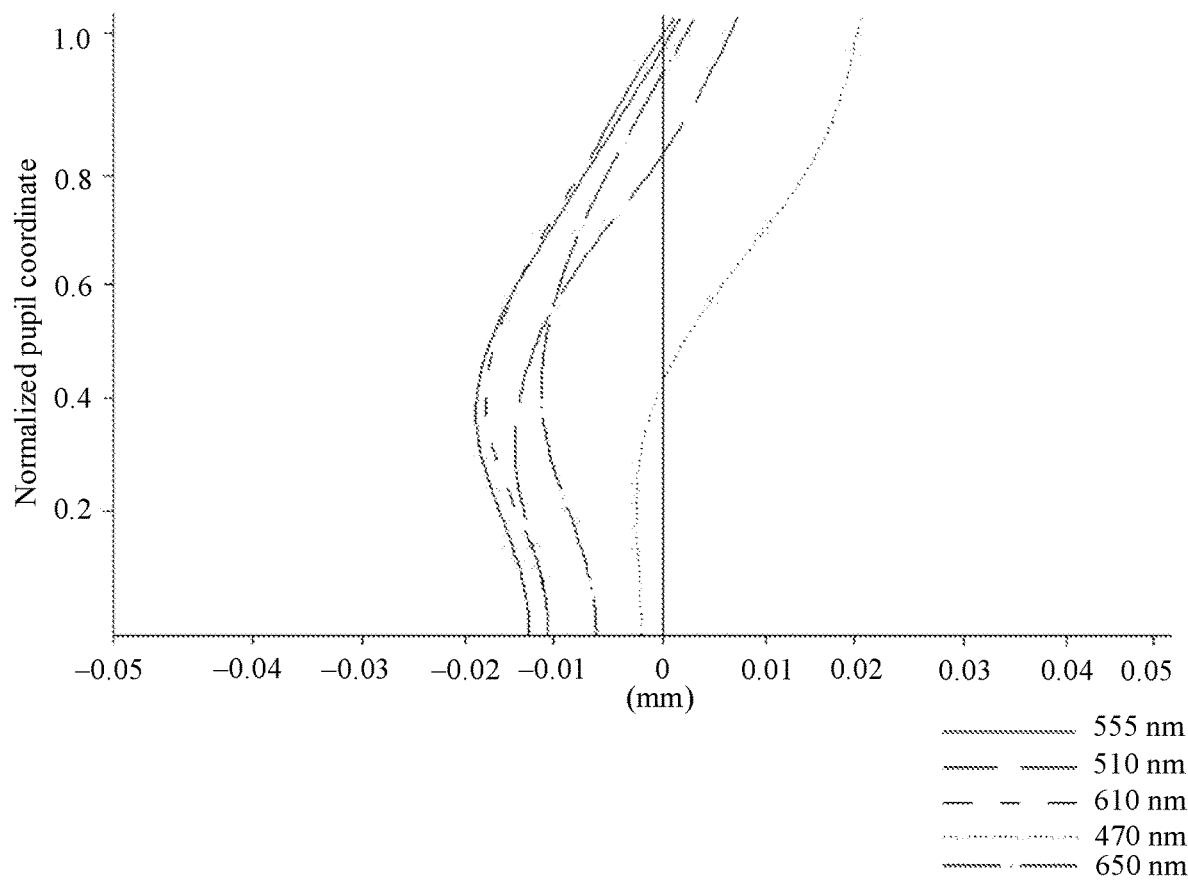
FIG. 17 shows axial chromatic aberration curves of the zoom lens in the wide-angle state according to an embodiment of this application.

FIG. 17 shows axial chromatic aberration curves of the zoom lens 10 at the wide-angle end at different wavelengths. It can be seen from FIG. 17 that, in Embodiment 3, an axial chromatic aberration of the zoom lens 10 using the foregoing technical parameters can be controlled within a small change range from 0.014 mm to 0.021 mm.

Figure 31:
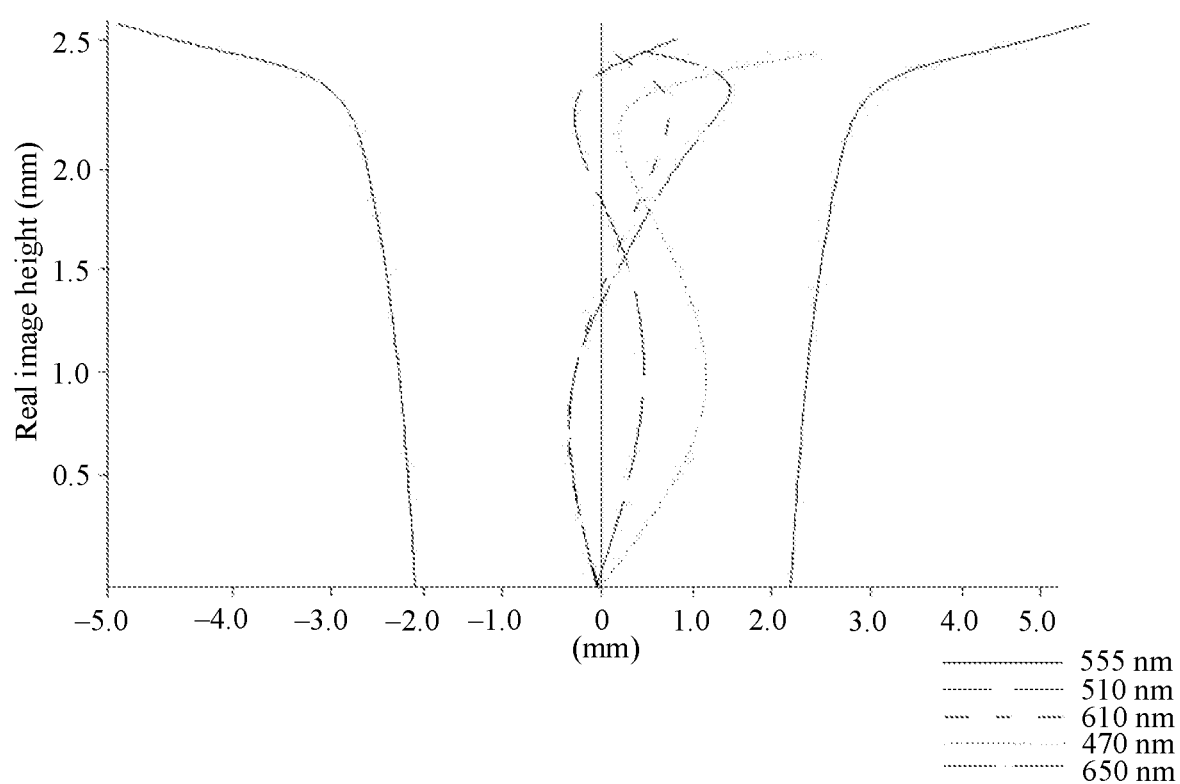
FIG. 31 shows lateral chromatic aberration curves of the zoom lens in the wide-angle state according to an embodiment of this application.

FIG. 31 shows lateral chromatic aberration curves of the zoom lens 10 at the wide-angle end at different wavelengths. It can be seen from FIG. 31 that, in Embodiment 3, lateral chromatic aberrations of the zoom lens 10 using the foregoing technical parameters at the wide-angle end and in the first intermediate focal length state and the second intermediate focal length state at different wavelengths can be controlled around a lateral diffraction limit range.

Figure 45:
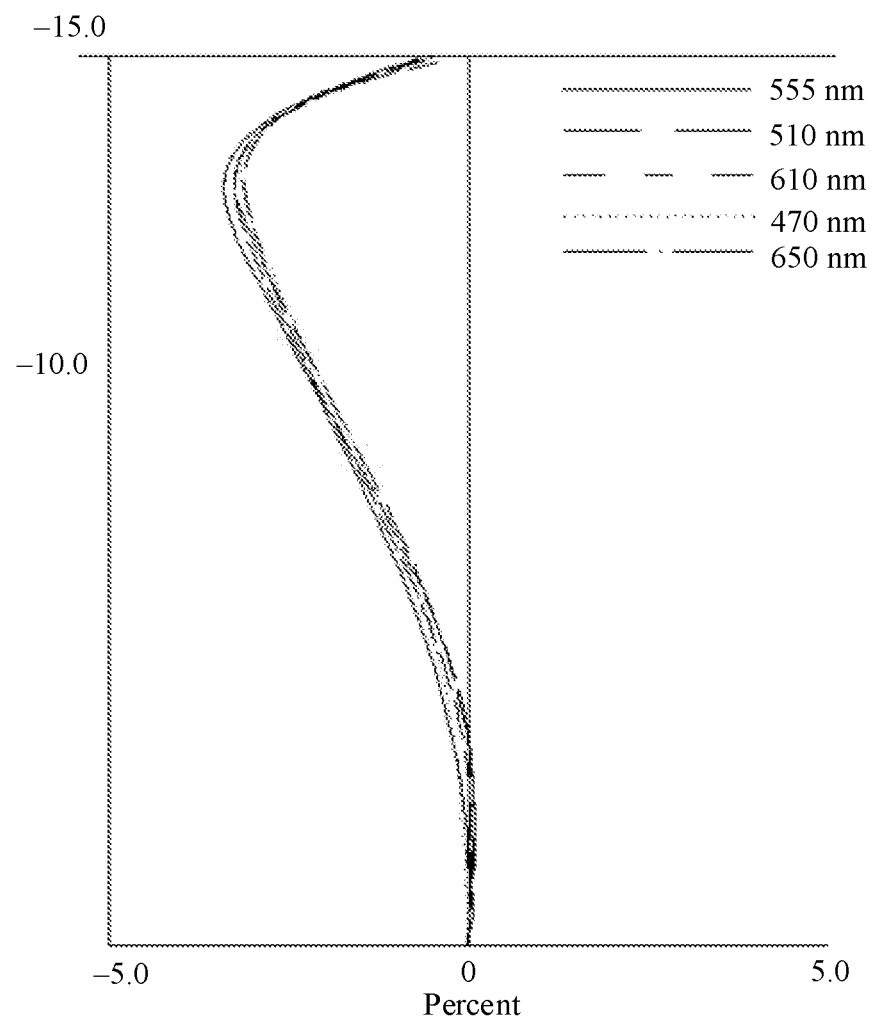
FIG. 45 shows distortion percentage curves of the zoom lens in the wide-angle state according to an embodiment of this application.

FIG. 45 shows distortion curves of the zoom lens 10 at the wide-angle end at different wavelengths. The distortion curve indicates a deviation between imaging deformation and an ideal shape. It can be seen from FIG. 45 that, in Embodiment 3, a distortion rate of the zoom lens 10 using the foregoing technical parameters can be effectively controlled below 4%.

Embodiment 4

In this embodiment, ratios of focal lengths of the first lens group 11, the second lens group 12, the third lens group 13, and the fourth lens group 14 to a focal length at the telephoto end of the zoom lens 10 are determined to be 0.26, 0.085, 0.26, and 0.25 respectively.

When the zoom lens 10 changes from the wide-angle end to the telephoto end, the first lens group 11 and the third lens group 13 are fastened, and both the second lens group 12 and the fourth lens group 14 moves towards the image side.

The maximum clear aperture diameter of the zoom lens 10, namely, a maximum diameter of a lens in the zoom lens 10, is determined to be 7.8 mm.

In this case, the first lens group 11, the second lens group 12, the third lens group 13, and the fourth lens group 14 each have three lenses arranged from the object side to the image side along the optical axis. The first lens group 11, the second lens group 12, the third lens group 13, and the fourth lens group 14 include 24 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 0.95, and a ratio of an image height of the zoom lens 10 to the effective focal length at the telephoto end of the zoom lens 10 is determined to be 0.093.

When the zoom lens 10 changes from the wide-angle end to the telephoto end, a ratio of a movement distance of the second lens group 12 along the optical axis to the total optical length of the zoom lens is determined to be 0.0516, and a ratio of a movement distance of the fourth lens group 14 along the optical axis to the total optical length of the zoom lens is determined to be 0.2114.

After the foregoing parameters are used, technical effect that can be achieved by the zoom lens 10 is shown in Table 4A to Table 4D.

TABLE 4A

|  | W | M1 | M2 | T |
|---|---|---|---|---|
| Focal length (mm) | 9.300 | 13.000 | 15.041 | 26.799 |
| F-number | 2.859 | 2.896 | 2.910 | 3.581 |
| Image height IMH (mm) | 2.500 | 2.500 | 2.500 | 2.500 |
| Half FOV (°) | 14.910 | 10.602 | 9.163 | 5.165 |
| BFL (mm) | 6.250 | 5.333 | 4.642 | 1.310 |
| TTL (mm) | 25.500 | 25.500 | 25.500 | 25.500 |
| Designed wavelength | 650 nm, 610 nm, 555 nm, 510 nm, and 470 nm | | | |

Table 4A indicates basic optical parameters of the zoom lens 10 at the wide-angle end, the first intermediate focal length, the second intermediate focal length, and the telephoto end. It can be seen from Table 4A that when the image height and TTL remain unchanged, both the focal length and the F-number increase. The zoom lens 10 shows a typical feature of implementing a focal length change from zoom from the wide-angle end to the telephoto end.

TABLE 4B

|  | R | Thickness | | nd | | vd |
|---|---|---|---|---|---|---|
| R1 | 6.565 | d1 | 1.725 | n1 | 1.60 | v1 | 62.7 |
| R2 | −519.634 | a1 | 0.070 | | | | |
| R3 | 10.293 | d2 | 1.132 | n2 | 1.77 | v2 | 49.6 |
| R4 | −34.748 | a2 | 0.081 | | | | |
| R5 | −27.500 | d3 | 0.550 | n3 | 1.95 | v3 | 18.1 |
| R6 | 96.151 | a3 | 0.709 | | | | |
| R7 | −14.145 | d4 | 0.621 | n4 | 1.92 | v4 | 27.8 |
| R8 | 2.868 | a4 | 0.733 | | | | |
| R9 | −38.022 | d5 | 0.360 | n5 | 1.88 | v5 | 39.9 |
| R10 | 4.553 | a5 | 0.161 | | | | |
| R11 | 6.223 | d6 | 0.760 | n6 | 1.95 | v6 | 17.9 |
| R12 | −64.985 | a6 | 1.815 | | | | |
| R13 | 3.763 | d7 | 1.708 | n7 | 1.58 | v7 | 47.2 |
| R14 | −10.848 | a7 | 2.252 | | | | |
| R15 | −11.720 | d8 | 0.360 | n8 | 1.91 | v8 | 22.5 |
| R16 | 16.761 | a8 | 0.500 | | | | |
| R17 | −4.730 | d9 | 0.360 | n9 | 1.50 | v9 | 74.9 |
| R18 | −4.938 | a9 | 0.050 | | | | |
| R19 | 122.662 | d10 | 0.843 | n10 | 1.95 | v10 | 17.9 |
| R20 | −14.727 | a10 | 2.273 | | | | |
| R21 | −69.972 | d11 | 0.200 | n11 | 1.95 | v11 | 17.9 |
| R22 | 6.660 | a11 | 0.016 | | | | |
| R23 | 6.722 | d12 | 1.972 | n12 | 1.82 | V12 | 44.8 |
| R24 | −6.281 | a12 | 5.440 | | | | |
| R25 | Infinity | d13 | 0.210 | n13 | 1.52 | v13 | 64.2 |
| R26 | Infinity | a13 | 0.600 | | | | |

Table 4B indicates a curvature, a thickness, a refractive index, and an abbe coefficient of each lens from the object side to the image side when the zoom lens 10 is at the wide-angle end. R1 to R26 indicate surfaces from the object side to the image side of each lens, R indicates a curvature, Thickness indicates a thickness, nd indicates a refractive index, and vd indicates an abbe coefficient.

TABLE 4C

| | Type | K | A2 | A3 | A4 | A5 | A6 | A7 |
|---|---|---|---|---|---|---|---|---|
| R1 | Even aspheric | 0.00 | 1.32E−04 | −1.09E−05 | 3.91E−06 | −5.42E−07 | 3.55E−08 | −1.07E−09 |
| R2 | Even aspheric | 0.00 | 5.21E−04 | −3.50E−06 | −1.07E−06 | 8.85E−08 | −3.31E−09 | −9.38E−11 |
| R3 | Even aspheric | 0.00 | −1.40E−04 | −3.66E−06 | 3.14E−08 | 4.67E−08 | 9.03E−10 | −6.61E−11 |
| R4 | Even aspheric | 0.00 | 1.27E−04 | 9.00E−06 | 2.41E−07 | 1.09E−08 | 6.45E−10 | 2.83E−12 |
| R5 | Even aspheric | 0.00 | 2.17E−04 | 3.53E−05 | 1.60E−06 | −1.27E−07 | 1.11E−08 | 0.00E+00 |
| R6 | Even aspheric | 0.00 | −2.03E−05 | 4.54E−05 | 7.53E−06 | −9.14E−07 | 7.65E−08 | −1.31E−09 |
| R7 | Even aspheric | 0.00 | 1.02E−03 | 1.02E−04 | −2.81E−05 | 2.77E−06 | −4.31E−15 | 4.20E−17 |
| R8 | Even aspheric | 0.00 | −2.16E−03 | 2.78E−04 | −1.78E−05 | −2.06E−05 | 1.57E−16 | 1.35E−18 |
| R9 | Even aspheric | 0.00 | −8.31E−05 | 7.69E−05 | −1.73E−04 | −3.35E−05 | 4.57E−06 | −1.32E−06 |
| R10 | Even aspheric | 0.00 | −1.82E−03 | −3.50E−04 | −1.33E−04 | −2.33E−05 | 3.69E−06 | 5.54E−08 |
| R11 | Even aspheric | 0.00 | −3.35E−03 | −2.50E−04 | −3.46E−05 | 2.00E−06 | 5.25E−07 | −3.36E−08 |
| R12 | Even aspheric | 0.00 | −4.26E−03 | −2.80E−04 | −1.71E−05 | −1.23E−05 | 3.78E−06 | −3.49E−08 |
| R13 | Even aspheric | 0.00 | −1.18E−03 | 5.00E−05 | −1.33E−05 | 6.32E−07 | 2.26E−07 | −3.77E−08 |
| R14 | Even aspheric | 0.00 | 1.47E−03 | 5.53E−05 | 1.89E−05 | −3.53E−06 | −1.09E−07 | 1.39E−08 |
| R15 | Even aspheric | 0.00 | −2.79E−03 | 1.72E−05 | −3.39E−05 | −2.56E−05 | −1.60E−06 | −1.04E−07 |
| R16 | Even aspheric | 0.00 | 4.99E−03 | 1.05E−03 | 1.78E−04 | −5.28E−05 | −5.31E−07 | −4.88E−08 |
| R17 | Even aspheric | 0.00 | 1.49E−02 | 7.10E−04 | 2.24E−04 | −4.20E−05 | −1.15E−06 | −1.43E−08 |
| R18 | Even aspheric | 0.00 | 6.52E−03 | −6.84E−04 | −9.64E−07 | −2.20E−05 | 1.81E−08 | 1.46E−09 |
| R19 | Even aspheric | 0.00 | −4.69E−03 | −5.21E−05 | −4.94E−05 | 2.83E−06 | −5.96E−07 | 5.30E−08 |
| R20 | Even aspheric | 0.00 | −3.98E−03 | 8.20E−05 | −5.90E−05 | 5.39E−06 | −4.37E−07 | 2.24E−08 |
| R21 | Even aspheric | 0.00 | −1.61E−03 | 2.47E−04 | −5.69E−05 | 6.37E−06 | −3.42E−07 | 8.49E−09 |
| R22 | Even aspheric | −2.43 | −4.28E−04 | −3.91E−04 | 2.93E−05 | −4.04E−07 | −5.08E−09 | 3.30E−10 |
| R23 | Even aspheric | 0.00 | −3.41E−04 | −6.80E−04 | 9.03E−05 | −7.30E−06 | 3.84E−07 | −8.50E−09 |
| R24 | Even aspheric | 0.00 | 3.29E−04 | −2.28E−05 | 3.17E−06 | −1.75E−07 | −1.70E−08 | 1.68E−09 |

In Table 4C, R1 to R24 indicate mirrors that are aspheric surfaces, K is a conic constant, and A2, A3, A4, A5, A6, and A7 are aspheric coefficients respectively. It can be seen from Table 4C that, in Embodiment 4, the first lens group 11, the second lens group 12, the third lens group 13, and the fourth lens group 14 of the zoom lens 10 include 24 aspheric surfaces in total.

TABLE 4D

| | W | M1 | M2 | T |
|---|---|---|---|---|
| a3 | 0.709 mm | 1.375 mm | 1.599 mm | 2.024 mm |
| a6 | 1.815 mm | 1.148 mm | 0.924 mm | 0.500 mm |
| a9 | 0.050 mm | 0.967 mm | 1.658 mm | 4.990 mm |
| a12 | 5.440 mm | 4.523 mm | 3.832 mm | 0.500 mm |

Table 4D indicates spacings between the first lens group 11 to the fourth lens group 14 when the zoom lens 10 is in the wide-angle state, the first intermediate focal length state, the second intermediate focal length state, and the telephoto state.

Figure 18:
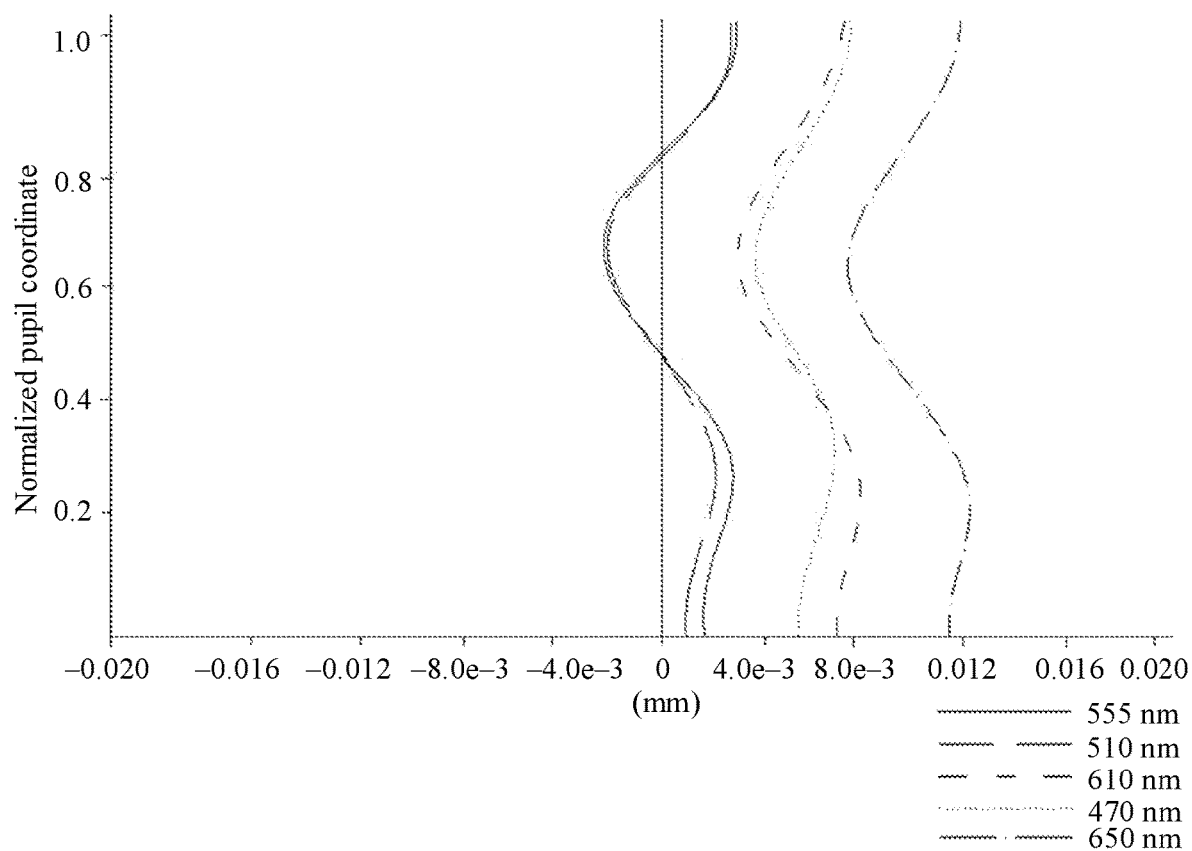
FIG. 18 shows axial chromatic aberration curves of the zoom lens in the wide-angle state according to an embodiment of this application.

FIG. 18 shows axial chromatic aberration curves of the zoom lens 10 at the wide-angle end at different wavelengths. It can be seen from FIG. 18 that, in Embodiment 4, an axial chromatic aberration of the zoom lens 10 using the foregoing technical parameters can be controlled within a small change range from 0.010 mm to 0.012 mm.

Figure 32:
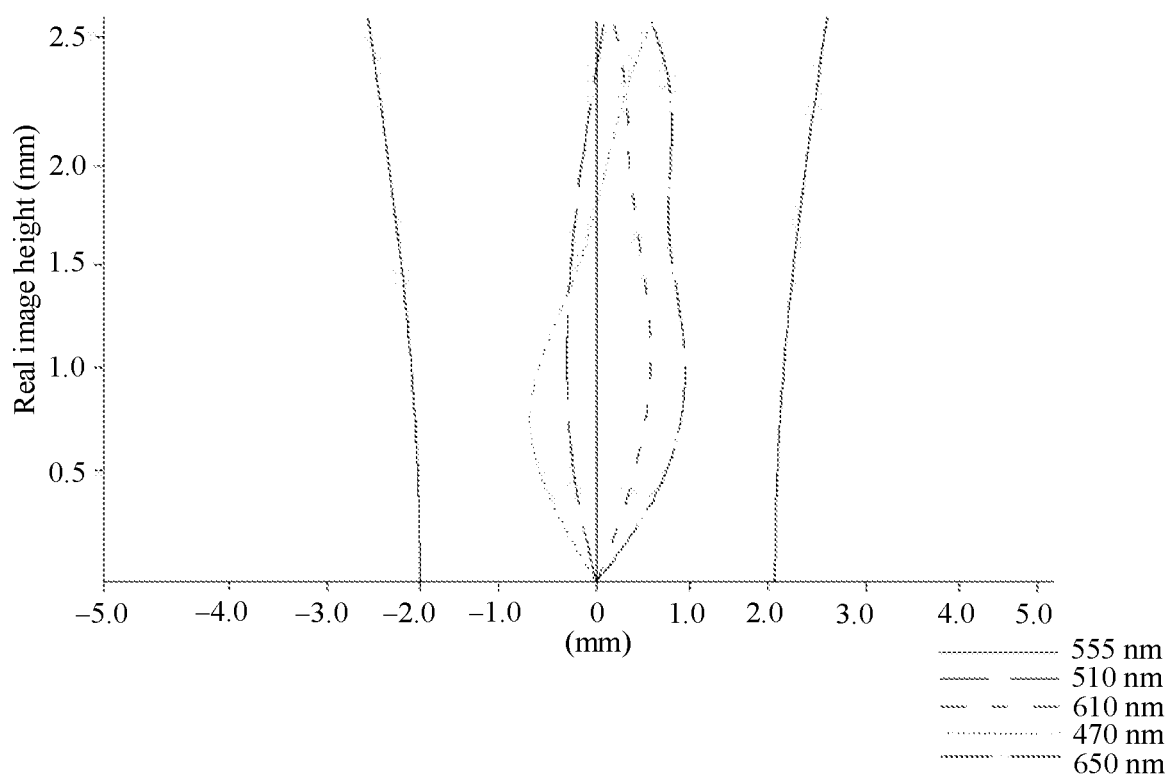
FIG. 32 shows lateral chromatic aberration curves of the zoom lens in the wide-angle state according to an embodiment of this application.

FIG. 32 shows lateral chromatic aberration curves of the zoom lens 10 at the wide-angle end at different wavelengths. It can be seen from FIG. 32 that, in Embodiment 4, lateral chromatic aberrations of the zoom lens 10 using the foregoing technical parameters at the wide-angle end and in the first intermediate focal length state at different wavelengths can be controlled around a lateral diffraction limit range. When the zoom lens 10 zooms to the second intermediate focal length state and even the telephoto end, a light ray with a wavelength of 650 nm and a light ray with a wavelength of 470 nm exceeds lateral diffraction limits.

Figure 46:
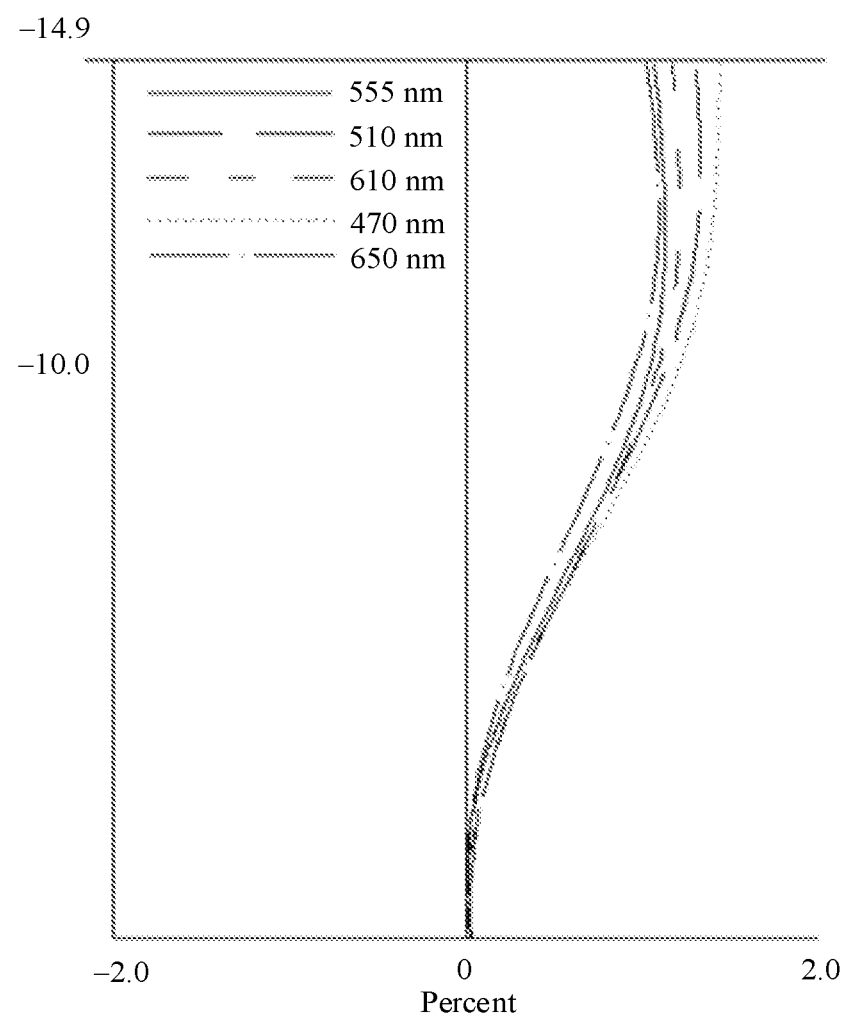
FIG. 46 shows distortion percentage curves of the zoom lens in the wide-angle state according to an embodiment of this application.

FIG. 46 shows distortion curves of the zoom lens 10 at the wide-angle end at different wavelengths. The distortion curve indicates a deviation between imaging deformation and an ideal shape. It can be seen from FIG. 46 that, in Embodiment 4, a distortion rate of the zoom lens 10 using the foregoing technical parameters can be effectively controlled below 1.9%. Therefore, the zoom lens 10 using the foregoing technical parameters can effectively control the distortion rate.

Embodiment 5

In this embodiment, ratios of focal lengths of the first lens group 11, the second lens group 12, the third lens group 13, and the fourth lens group 14 to a focal length at the telephoto end of the zoom lens 10 are determined to be 0.99, 0.5, 0.58, and 0.42 respectively.

When the zoom lens 10 changes from the wide-angle end to the telephoto end, the first lens group 11 and the third lens group 13 are fastened, and both the second lens group 12 and the fourth lens group 14 moves towards the image side.

The maximum clear aperture diameter of the zoom lens 10, namely, a maximum diameter of a lens in the zoom lens 10, is determined to be 8.0 mm.

In this case, the first lens group 11, the second lens group 12, the third lens group 13, and the fourth lens group 14 each have three lenses arranged from the object side to the image side along the optical axis. The first lens group 11, the second lens group 12, the third lens group 13, and the fourth lens group 14 include 24 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 1.275, and a ratio of an image height of the zoom lens 10 to the effective focal length at the telephoto end of the zoom lens 10 is determined to be 0.125.

When the zoom lens 10 changes from the wide-angle end to the telephoto end, a ratio of a movement distance of the second lens group 12 along the optical axis to the total optical length of the zoom lens is determined to be 0.2029, and a ratio of a movement distance of the fourth lens group 14 along the optical axis to the total optical length of the zoom lens is determined to be 0.1249.

After the foregoing parameters are used, technical effect that can be achieved by the zoom lens 10 is shown in Table 5A to Table 5D.

TABLE 5A

|  | W | M1 | M2 | T |
|---|---|---|---|---|
| Focal length (mm) | 9.300 | 13.000 | 15.041 | 20.000 |
| F-number | 2.757 | 2.810 | 2.829 | 3.467 |
| Image height IMH (mm) | 2.500 | 2.500 | 2.500 | 2.500 |
| Half FOV (°) | 14.949 | 10.679 | 9.241 | 6.934 |
| BFL (mm) | 5.982 | 5.209 | 4.578 | 2.796 |
| TTL (mm) | 25.500 | 25.500 | 25.500 | 25.500 |
| Designed wavelength | 650 nm, 610 nm, 555 nm, 510 nm, and 470 nm | | | |

Table 5A indicates basic optical parameters of the zoom lens 10 at the wide-angle end, the first intermediate focal length, the second intermediate focal length, and the telephoto end. It can be seen from Table 5A that when the image height and TTL remain unchanged, both the focal length and the F-number increase. The zoom lens 10 shows a typical feature of implementing a focal length change from zoom from the wide-angle end to the telephoto end.

TABLE 5B

|  | R | | Thickness | | nd | | Vd |
|---|---|---|---|---|---|---|---|
| R1 | 10.741 | d1 | 1.720 | n1 | 1.53 | v1 | 72.5 |
| R2 | −11.209 | a1 | 0.070 | | | | |
| R3 | −19.120 | d2 | 0.361 | n2 | 1.92 | v2 | 18.7 |
| R4 | −19.045 | a2 | 0.070 | | | | |
| R5 | −18.852 | d3 | 0.360 | n3 | 1.86 | v3 | 27.7 |
| R6 | 447.613 | a3 | 0.289 | | | | |
| R7 | −45.608 | d4 | 0.472 | n4 | 1.51 | v4 | 78.9 |
| R8 | 3.930 | a4 | 0.607 | | | | |
| R9 | 6.223 | d5 | 0.360 | n5 | 1.57 | v5 | 41.3 |
| R10 | 3.288 | a5 | 0.051 | | | | |
| R11 | 3.326 | d6 | 0.847 | n6 | 1.91 | v6 | 31.6 |
| R12 | 5.662 | a6 | 5.981 | | | | |
| R13 | 3.596 | d7 | 1.914 | n7 | 1.55 | v7 | 53.5 |
| R14 | −9.000 | a7 | 0.211 | | | | |
| R15 | 26.179 | d8 | 1.127 | n8 | 1.83 | v8 | 32.4 |
| R16 | 6.629 | a8 | 0.256 | | | | |
| R17 | 123.695 | d9 | 0.375 | n9 | 1.64 | v9 | 46.7 |
| R18 | 5.377 | a9 | 1.412 | | | | |
| R19 | −3.175 | d10 | 0.360 | n10 | 1.91 | v10 | 24.9 |
| R20 | −6.651 | a10 | 0.200 | | | | |
| R21 | −12.354 | d11 | 1.355 | n11 | 1.77 | v11 | 49.7 |
| R22 | −3.442 | a11 | 0.167 | | | | |
| R23 | 5.358 | d12 | 0.954 | n12 | 1.51 | v12 | 79.1 |
| R24 | 8.575 | a12 | 5.172 | | | | |
| R25 | Infinity | d13 | 0.210 | n13 | 1.52 | v13 | 64.2 |
| R26 | Infinity | a13 | 0.600 | | | | |

Table 5B indicates a curvature, a thickness, a refractive index, and an abbe coefficient of each lens from the object side to the image side when the zoom lens 10 is at the wide-angle end. R1 to R26 indicate surfaces from the object side to the image side of each lens, R indicates a curvature, Thickness indicates a thickness, nd indicates a refractive index, and vd indicates an abbe coefficient.

TABLE 5C

| | | | | Aspheric coefficient | | | | |
|---|---|---|---|---|---|---|---|---|
| | Type | K | A2 | A3 | A4 | A5 | A6 | A7 |
| R1 | Even aspheric | 0.00 | −4.65E−05 | −2.37E−05 | 4.31E−06 | −5.64E−07 | 3.51E−08 | −9.30E−10 |
| R2 | Even aspheric | 0.00 | 5.99E−04 | −8.15E−06 | −1.03E−06 | 1.03E−07 | −3.34E−09 | −5.75E−11 |
| R3 | Even aspheric | 0.00 | 1.31E−05 | 1.50E−06 | 9.31E−08 | 1.64E−08 | 0.00E+00 | 0.00E+00 |
| R4 | Even aspheric | 0.00 | 6.48E−06 | 3.84E−06 | 3.91E−07 | 1.37E−08 | 0.00E+00 | 0.00E+00 |
| R5 | Even aspheric | 0.00 | 1.63E−04 | 2.75E−05 | 4.44E−07 | −1.98E−07 | 9.04E−09 | 0.00E+00 |
| R6 | Even aspheric | 0.00 | −1.07E−04 | 8.89E−06 | 6.08E−06 | −1.02E−06 | 6.09E−08 | −1.22E−09 |

TABLE 5C-continued

| | | | Aspheric coefficient | | | | | |
|---|---|---|---|---|---|---|---|---|
| | Type | K | A2 | A3 | A4 | A5 | A6 | A7 |
| R7 | Even aspheric | 0.00 | 4.16E−04 | −6.89E−05 | 4.51E−06 | −1.41E−07 | 0.00E+00 | 0.00E+00 |
| R8 | Even aspheric | 0.00 | −1.16E−03 | 1.26E−04 | 5.91E−06 | −2.99E−06 | 0.00E+00 | 0.00E+00 |
| R9 | Even aspheric | 0.00 | 3.25E−04 | 1.62E−04 | −5.55E−05 | 1.27E−06 | −1.88E−07 | 1.26E−08 |
| R10 | Even aspheric | 0.00 | −2.78E−03 | −3.72E−04 | −8.06E−05 | 5.24E−06 | −7.68E−07 | 3.00E−08 |
| R11 | Even aspheric | 0.00 | −4.52E−03 | −3.52E−04 | −1.17E−05 | 1.28E−06 | 6.35E−07 | −5.73E−08 |
| R12 | Even aspheric | 0.00 | −2.69E−03 | −8.50E−05 | −8.45E−06 | 6.94E−06 | 2.87E−07 | −2.71E−08 |
| R13 | Even aspheric | 0.00 | −9.59E−04 | −5.78E−05 | −1.50E−05 | −3.54E−07 | −2.44E−07 | 2.02E−08 |
| R14 | Even aspheric | 0.00 | 1.68E−03 | −1.47E−04 | 1.70E−06 | −1.95E−06 | 6.78E−07 | −3.19E−08 |
| R15 | Even aspheric | 0.00 | −3.20E−04 | 1.26E−04 | 2.31E−05 | −5.04E−06 | 1.57E−06 | −1.04E−07 |
| R16 | Even aspheric | 0.00 | 4.38E−03 | 2.37E−03 | 2.44E−04 | 7.05E−05 | −5.31E−07 | −4.88E−08 |
| R17 | Even aspheric | 0.00 | 1.19E−02 | 7.21E−04 | 3.70E−04 | −5.23E−06 | 9.48E−07 | −1.43E−08 |
| R18 | Even aspheric | 0.00 | 1.05E−02 | −1.38E−03 | 1.11E−04 | −5.14E−05 | 1.81E−08 | 1.46E−09 |
| R19 | Even aspheric | 0.00 | −7.56E−03 | 4.08E−04 | −3.25E−04 | 7.99E−05 | −1.13E−05 | −4.87E−08 |
| R20 | Even aspheric | 0.00 | −2.57E−03 | 2.41E−04 | −6.90E−06 | −6.55E−06 | −1.32E−07 | 1.57E−08 |
| R21 | Even aspheric | 0.00 | 3.56E−03 | −6.63E−05 | −7.66E−05 | 1.34E−05 | −1.10E−06 | 3.45E−08 |
| R22 | Even aspheric | −0.26 | 1.29E−03 | −2.25E−04 | 2.93E−05 | 0.00E+00 | 0.00E+00 | 0.00E+00 |
| R23 | Even aspheric | 0.00 | 3.84E−04 | −8.44E−04 | 1.03E−04 | −9.90E−06 | 7.89E−07 | −2.24E−08 |
| R24 | Even aspheric | 0.00 | −9.65E−04 | −2.68E−04 | −1.13E−05 | 2.75E−06 | 0.00E+00 | 0.00E+00 |

In Table 5C, R1 to R24 indicate mirrors that are aspheric surfaces, K is a conic constant, and A2, A3, A4, A5, A6, and A7 are aspheric coefficients respectively. It can be seen from Table 5C that, in Embodiment 5, the first lens group 11, the second lens group 12, the third lens group 13, and the fourth lens group 14 of the zoom lens 10 include 24 aspheric surfaces in total.

TABLE 5D

| | W | M1 | M2 | T |
|---|---|---|---|---|
| a3 | 0.289 mm | 3.115 mm | 4.144 mm | 5.464 mm |
| a6 | 5.981 mm | 3.155 mm | 2.127 mm | 0.806 mm |
| a9 | 1.412 mm | 2.185 mm | 2.816 mm | 4.598 mm |
| a12 | 5.172 mm | 4.399 mm | 3.768 mm | 1.986 mm |

Table 5D indicates spacings between the first lens group 11 to the fourth lens group 14 when the zoom lens 10 is in the wide-angle state, the first intermediate focal length state, the second intermediate focal length state, and the telephoto state.

Figure 19:
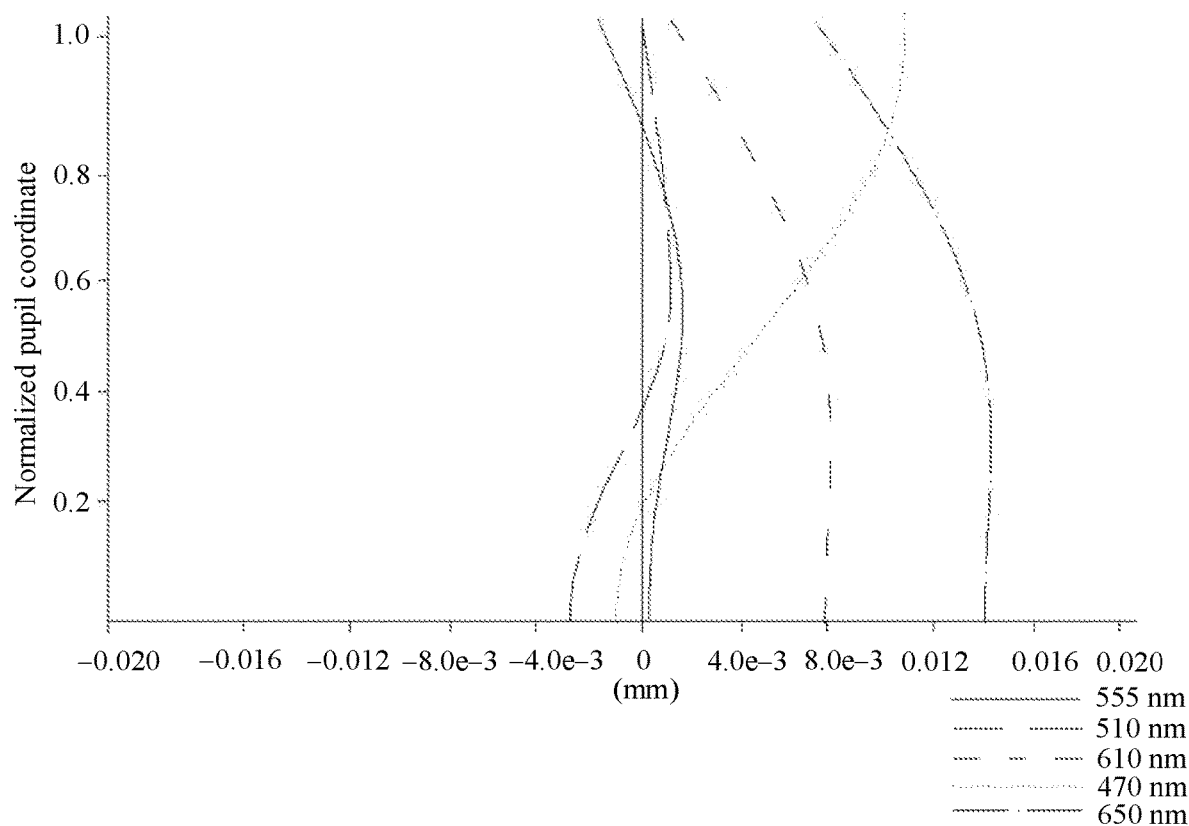
FIG. 19 shows axial chromatic aberration curves of the zoom lens in the wide-angle state according to an embodiment of this application.

FIG. 19 shows axial chromatic aberration curves of the zoom lens 10 at the wide-angle end at different wavelengths. It can be seen from FIG. 19 that, in Embodiment 5, an axial chromatic aberration of the zoom lens 10 using the foregoing technical parameters can be controlled within a small change range from 0.13 mm to 0.03 mm.

Figure 33:
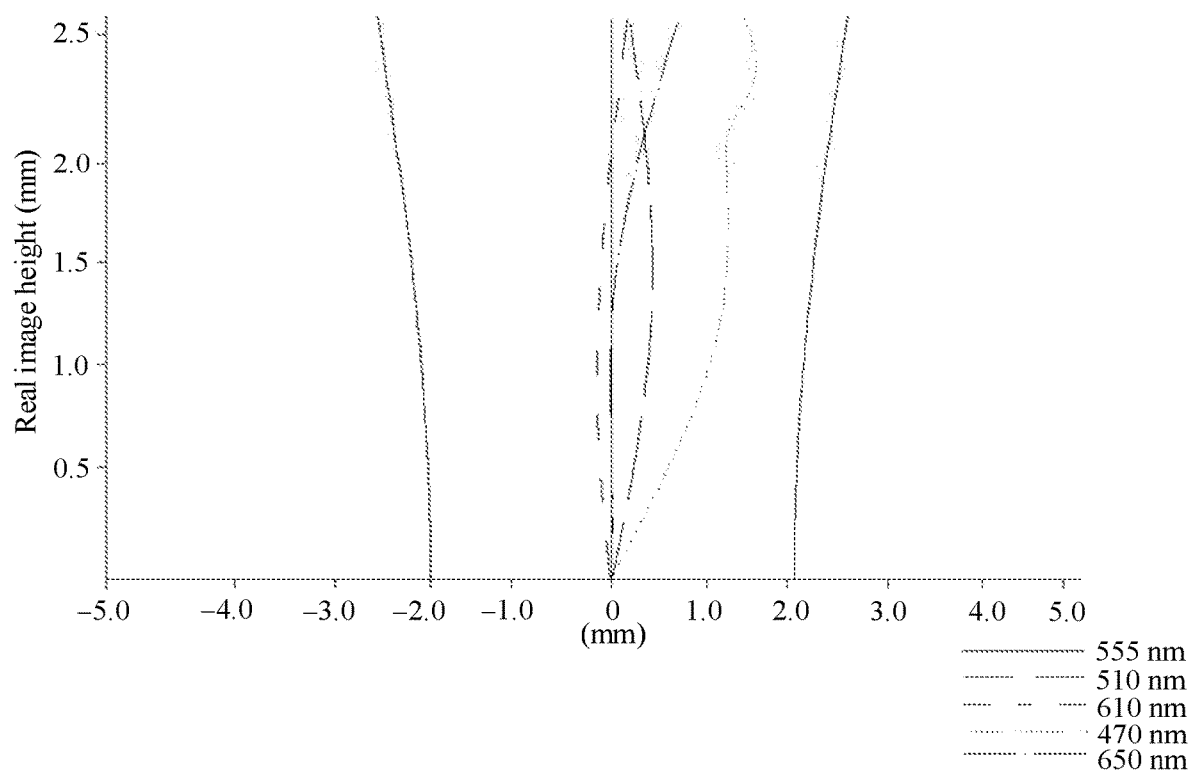
FIG. 33 shows lateral chromatic aberration curves of the zoom lens in the wide-angle state according to an embodiment of this application.

FIG. 33 shows lateral chromatic aberration curves of the zoom lens 10 at the wide-angle end at different wavelengths. It can be seen from FIG. 33 that, in Embodiment 5, lateral chromatic aberrations of the zoom lens 10 using the foregoing technical parameters at different wavelengths can be controlled around a lateral diffraction limit range.

Figure 47:
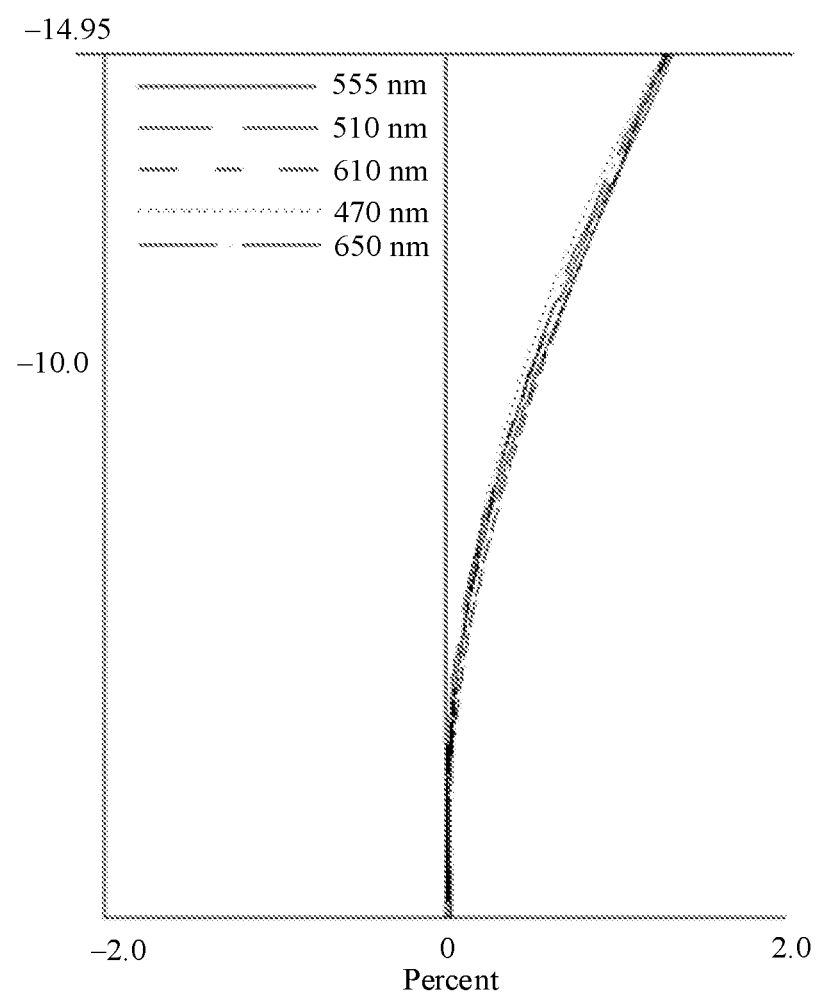
FIG. 47 shows distortion percentage curves of the zoom lens in the wide-angle state according to an embodiment of this application.

FIG. 47 shows distortion curves of the zoom lens 10 at the wide-angle end at different wavelengths. The distortion curve indicates a deviation between imaging deformation and an ideal shape. It can be seen from FIG. 47 that, in Embodiment 5, a distortion rate of the zoom lens 10 using the foregoing technical parameters can be effectively controlled below 1.9%.

Embodiment 6

In this embodiment, ratios of focal lengths of the first lens group 11, the second lens group 12, the third lens group 13, and the fourth lens group 14 to a focal length at the telephoto end of the zoom lens 10 are determined to be 0.55, 0.148, 0.13, and 0.16 respectively.

When the zoom lens 10 changes from the wide-angle end to the telephoto end, the first lens group 11 and the third lens group 13 are fastened, the second lens group 12 moves towards the image side, and the fourth lens group 14 first moves towards the object side and then moves towards the image side.

The maximum clear aperture diameter of the zoom lens 10, namely, a maximum diameter of a lens in the zoom lens 10, is determined to be 8.322 mm.

In this case, the first lens group 11, the second lens group 12, the third lens group 13, and the fourth lens group 14 each have three lenses arranged from the object side to the image side along the optical axis. The first lens group 11, the second lens group 12, the third lens group 13, and the fourth lens group 14 include 24 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 0.95, and a ratio of an image height of the zoom lens 10 to the effective focal length at the telephoto end of the zoom lens 10 is determined to be 0.094.

When the zoom lens 10 changes from the wide-angle end to the telephoto end, a ratio of a movement distance of the second lens group 12 along the optical axis to the total optical length of the zoom lens is determined to be 0.1814, and a ratio of a movement distance of the fourth lens group 14 along the optical axis to the total optical length of the zoom lens is determined to be 0.065.

After the foregoing parameters are used, technical effect that can be achieved by the zoom lens 10 is shown in Table 6A to Table 6D.

TABLE 6A

|  | W | M1 | M2 | T |
|---|---|---|---|---|
| Focal length (mm) | 9.419 | 13.075 | 15.106 | 26.678 |
| F-number | 2.942 | 2.994 | 3.029 | 3.603 |
| Image height IMH (mm) | 2.500 | 2.500 | 2.500 | 2.500 |
| Half FOV (°) | 14.570 | 11.063 | 9.347 | 5.166 |
| BFL (mm) | 1.175 | 2.591 | 2.834 | 1.759 |
| TTL (mm) | 25.475 | 25.475 | 25.475 | 25.475 |
| Designed wavelength | 650 nm, 610 nm, 555 nm, 510 nm, and 470 nm | | | |

Table 6A indicates basic optical parameters of the zoom lens 10 at the wide-angle end, the first intermediate focal length, the second intermediate focal length, and the telephoto end. It can be seen from Table 6A that when the image height and TTL remain unchanged, both the focal length and the F-number increase. The zoom lens 10 shows a typical feature of implementing a focal length change from zoom from the wide-angle end to the telephoto end.

TABLE 6B

|  | R | Thickness | | nd | | vd | |
|---|---|---|---|---|---|---|---|
| R1 | 9.094 | d1 | 1.893 | n1 | 1.55 | v1 | 69.7 |
| R2 | −13.879 | a1 | 0.079 | | | | |
| R3 | −38.457 | d2 | 0.364 | n2 | 1.68 | v2 | 26.8 |
| R4 | −36.805 | a2 | 0.082 | | | | |
| R5 | −30.128 | d3 | 0.441 | n3 | 1.83 | v3 | 23.9 |
| R6 | 158.546 | a3 | 0.865 | | | | |
| R7 | −22.372 | d4 | 0.413 | n4 | 1.71 | v4 | 31.3 |
| R8 | −14.879 | a4 | 0.322 | | | | |
| R9 | −6.345 | d5 | 0.364 | n5 | 1.74 | v5 | 50.6 |
| R10 | 3.750 | a5 | 0.058 | | | | |
| R11 | 3.432 | d6 | 0.792 | n6 | 1.91 | v6 | 18.8 |
| R12 | 4.205 | a6 | 5.117 | | | | |
| R13 | 3.380 | d7 | 1.997 | n7 | 1.57 | v7 | 64.6 |
| R14 | −7.053 | a7 | 0.717 | | | | |
| R15 | −235.843 | d8 | 2.000 | n8 | 1.87 | v8 | 20.4 |
| R16 | 23.373 | a8 | 2.276 | | | | |
| R17 | −9.231 | d9 | 1.616 | n9 | 1.94 | v9 | 18.8 |
| R18 | 4.220 | a9 | 1.773 | | | | |
| R19 | 5.107 | d10 | 0.958 | n10 | 1.84 | v10 | 29.7 |
| R20 | 9.566 | a10 | 0.065 | | | | |
| R21 | 9.909 | d11 | 1.057 | n11 | 1.73 | v11 | 24.1 |
| R22 | 9.575 | a11 | 0.051 | | | | |
| R23 | 5.228 | d12 | 1.000 | n12 | 1.83 | v12 | 20.4 |
| R24 | −32.551 | a12 | 0.376 | | | | |
| R25 | Infinity | d13 | 0.210 | n13 | 1.52 | v13 | 64.2 |
| R26 | Infinity | a13 | 0.589 | | | | |

Table 6B indicates a curvature, a thickness, a refractive index, and an abbe coefficient of each lens from the object side to the image side when the zoom lens 10 is at the wide-angle end. R1 to R26 indicate surfaces from the object side to the image side of each lens, R indicates a curvature, Thickness indicates a thickness, nd indicates a refractive index, and vd indicates an abbe coefficient.

TABLE 6C

| | | | | | Aspheric coefficient | | | |
|---|---|---|---|---|---|---|---|---|
| | Type | K | A2 | A3 | A4 | A5 | A6 | A7 |
| R1 | Even aspheric | 0.00 | 1.45E−04 | −1.83E−05 | 4.23E−06 | −5.63E−07 | 3.57E−08 | −9.56E−10 |
| R2 | Even aspheric | 0.00 | 5.95E−04 | −7.00E−06 | −1.06E−06 | 9.82E−08 | −3.21E−09 | −5.80E−11 |
| R3 | Even aspheric | 0.00 | 1.97E−05 | 1.13E−06 | 2.60E−08 | 2.53E−09 | 0.00E+00 | 0.00E+00 |
| R4 | Even aspheric | 0.00 | −2.32E−05 | −5.68E−07 | 7.08E−08 | 5.98E−09 | 0.00E+00 | 0.00E+00 |
| R5 | Even aspheric | 0.00 | 4.87E−05 | 2.41E−05 | 5.17E−07 | −1.83E−07 | 1.00E−08 | 0.00E+00 |
| R6 | Even aspheric | 0.00 | −2.46E−06 | 1.24E−05 | 6.24E−06 | −9.98E−07 | 6.35E−08 | −1.27E−09 |
| R7 | Even aspheric | 0.00 | −4.38E−05 | 5.77E−07 | −1.63E−06 | −3.73E−07 | 0.00E+00 | 0.00E+00 |
| R8 | Even aspheric | 0.00 | −9.70E−05 | −8.82E−06 | −2.70E−06 | 2.88E−07 | 0.00E+00 | 0.00E+00 |
| R9 | Even aspheric | 0.00 | 5.08E−04 | 2.32E−04 | −3.73E−05 | 2.53E−06 | 7.72E−08 | −8.79E−09 |
| R10 | Even aspheric | 0.00 | −1.77E−03 | −2.31E−05 | −5.00E−05 | 7.11E−06 | −9.73E−07 | 5.31E−08 |
| R11 | Even aspheric | 0.00 | −3.77E−03 | −4.12E−04 | −3.18E−06 | 3.08E−06 | −2.57E−07 | −3.07E−08 |
| R12 | Even aspheric | 0.00 | −4.39E−03 | −1.72E−04 | 1.49E−06 | 3.50E−06 | −2.67E−07 | −3.95E−08 |
| R13 | Even aspheric | 0.00 | −2.37E−03 | −1.39E−04 | −1.62E−05 | 2.76E−07 | −1.18E−07 | 9.68E−09 |
| R14 | Even aspheric | 0.00 | 2.29E−03 | −6.53E−05 | 1.10E−05 | −2.45E−06 | 3.63E−07 | −1.07E−08 |

TABLE 6C-continued

| | Type | K | A2 | A3 | A4 | A5 | A6 | A7 |
|---|---|---|---|---|---|---|---|---|
| | | | | | Aspheric coefficient | | | |
| R15 | Even aspheric | 0.00 | −8.36E−04 | 2.22E−04 | 3.91E−05 | −1.41E−06 | 5.13E−07 | −1.27E−07 |
| R16 | Even aspheric | 0.00 | 3.28E−03 | 1.01E−03 | 1.45E−05 | 5.08E−05 | −5.54E−07 | −4.90E−08 |
| R17 | Even aspheric | 0.00 | 3.34E−03 | −1.31E−03 | 2.40E−04 | −2.56E−05 | 9.58E−07 | −1.42E−08 |
| R18 | Even aspheric | 0.00 | 2.07E−03 | −1.70E−03 | 1.61E−04 | −6.21E−06 | −7.09E−09 | 1.27E−09 |
| R19 | Even aspheric | 0.00 | −5.48E−04 | −2.43E−04 | −1.07E−05 | 5.54E−06 | −4.38E−07 | −2.83E−09 |
| R20 | Even aspheric | 0.00 | −2.54E−03 | 7.76E−06 | −4.42E−05 | 1.08E−05 | −1.05E−06 | 2.88E−08 |
| R21 | Even aspheric | 0.00 | −2.96E−04 | 5.56E−04 | −6.83E−05 | 3.59E−06 | 6.45E−08 | −5.65E−09 |
| R22 | Even aspheric | 5.39 | 1.22E−03 | −3.29E−04 | 3.25E−05 | 0.00E+00 | 0.00E+00 | 0.00E+00 |
| R23 | Even aspheric | 0.00 | −4.25E−04 | −5.79E−04 | 7.65E−05 | −7.71E−06 | 4.68E−07 | −1.11E−08 |
| R24 | Even aspheric | 0.00 | −6.14E−04 | 9.52E−05 | −4.96E−06 | −5.26E−08 | 0.00E+00 | 0.00E+00 |

In Table 6C, R1 to R24 indicate mirrors that are aspheric surfaces, K is a conic constant, and A2, A3, A4, A5, A6, and A7 are aspheric coefficients respectively. It can be seen from Table 6C that, in Embodiment 6, the first lens group 11, the second lens group 12, the third lens group 13, and the fourth lens group 14 of the zoom lens 10 include 24 aspheric surfaces in total.

TABLE 6D

| | W | M1 | M2 | T |
|---|---|---|---|---|
| a3 | 0.865 mm | 2.663 mm | 3.206 mm | 5.464 mm |
| a6 | 5.117 mm | 3.319 mm | 2.776 mm | 0.518 mm |
| a9 | 1.773 mm | 0.357 mm | 0.114 mm | 1.188 mm |
| a12 | 0.376 mm | 1.792 mm | 2.035 mm | 0.960 mm |

Table 6D indicates spacings between the first lens group 11 to the fourth lens group 14 when the zoom lens 10 is in the wide-angle state, the first intermediate focal length state, the second intermediate focal length state, and the telephoto state.

Figure 20:
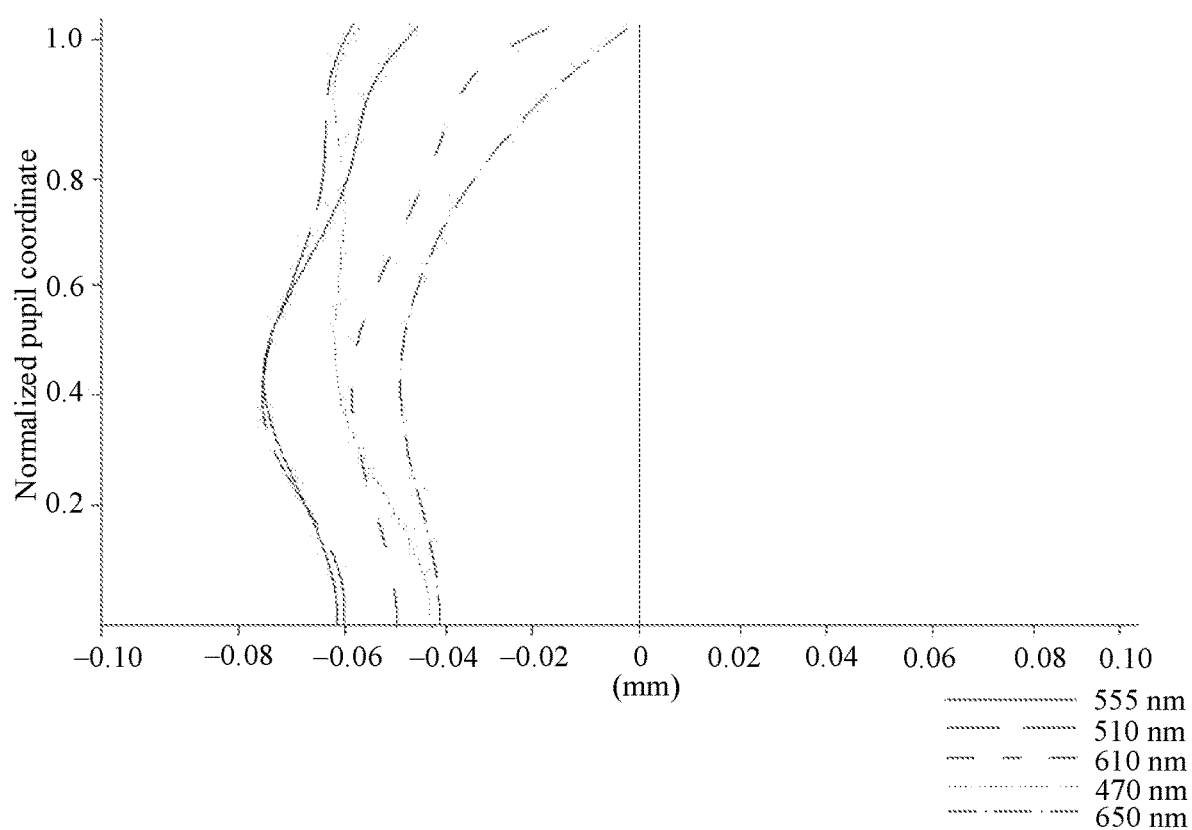
FIG. 20 shows axial chromatic aberration curves of the zoom lens in the wide-angle state according to an embodiment of this application.

FIG. 20 shows axial chromatic aberration curves of the zoom lens 10 at the wide-angle end at different wavelengths. It can be seen from FIG. 20 that, in Embodiment 6, an axial chromatic aberration of the zoom lens 10 using the foregoing technical parameters can be controlled within a small change range from 0.03 mm to 0.06 mm.

Figure 34:
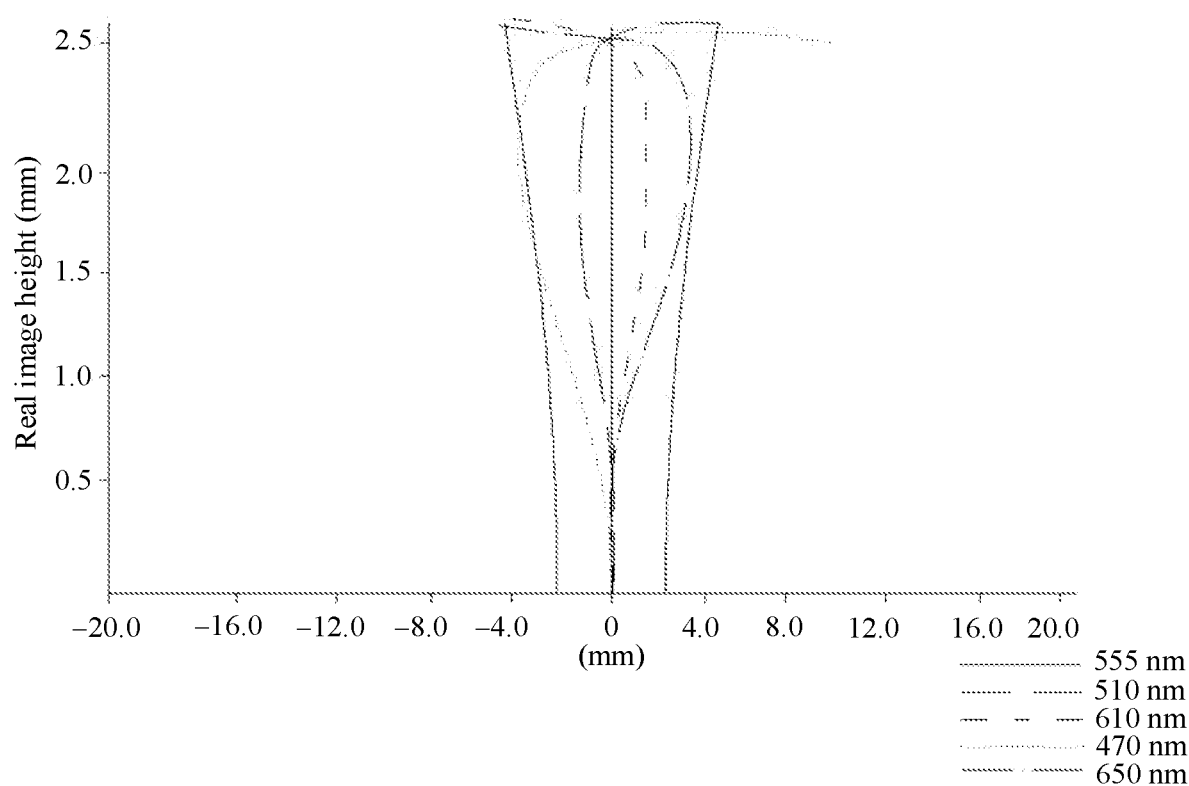
FIG. 34 shows lateral chromatic aberration curves of the zoom lens in the wide-angle state according to an embodiment of this application.

FIG. 34 shows lateral chromatic aberration curves of the zoom lens 10 at the wide-angle end at different wavelengths. It can be seen from FIG. 34 that, in Embodiment 6, lateral diffraction limits for lateral chromatic aberrations of the zoom lens 10 using the foregoing technical parameters at the wide-angle end and the telephoto end are narrow at different wavelengths. Accordingly, a light ray with a wavelength of 650 nm and a light ray with a wavelength of 470 nm exceeds the lateral diffraction limits at the wide-angle end and the telephoto end, but can be controlled around a lateral diffraction limit range.

Figure 48:
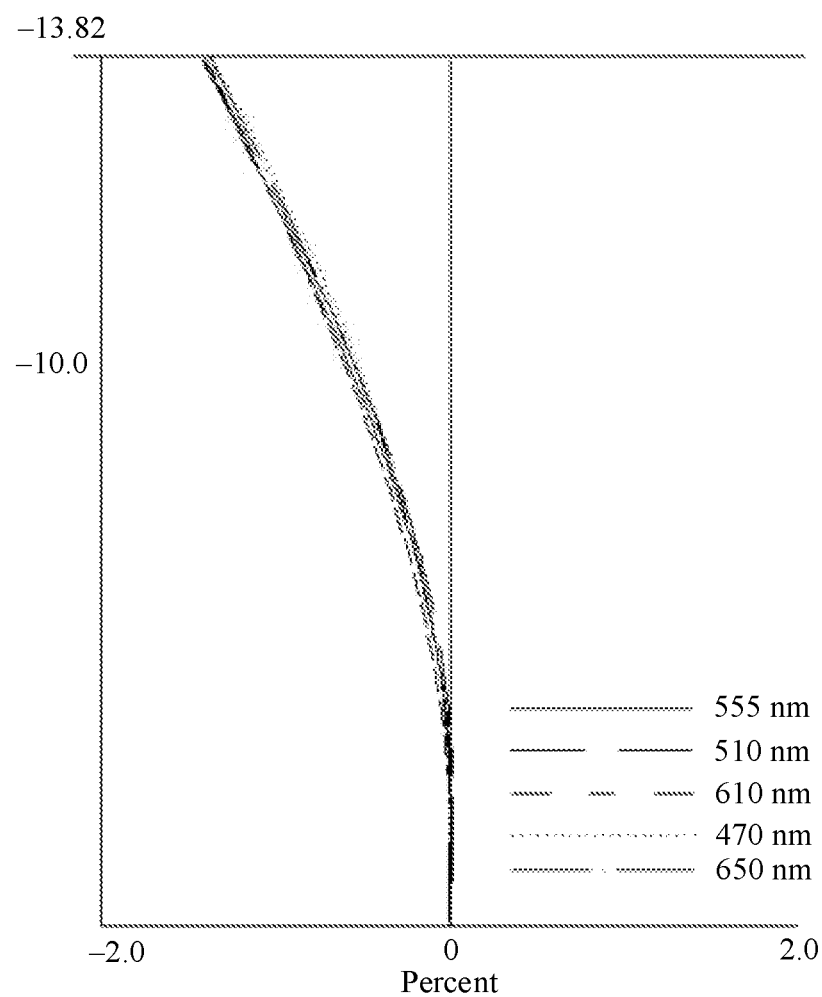
FIG. 48 shows distortion percentage curves of the zoom lens in the wide-angle state according to an embodiment of this application.

FIG. 48 shows distortion curves of the zoom lens 10 at the wide-angle end at different wavelengths. The distortion curve indicates a deviation between imaging deformation and an ideal shape. It can be seen from FIG. 48 that, in Embodiment 6, a distortion rate of the zoom lens 10 using the foregoing technical parameters can be effectively controlled below 1.7%.

Embodiment 7

In this embodiment, ratios of focal lengths of the first lens group 11, the second lens group 12, the third lens group 13, and the fourth lens group 14 to a focal length at the telephoto end of the zoom lens 10 are determined to be 0.62, 0.201, 0.235, and 0.15 respectively.

When the zoom lens 10 changes from the wide-angle end to the telephoto end, the first lens group 11 and the third lens group 13 are fastened, the second lens group 12 moves towards the image side, and the fourth lens group 14 first moves towards the object side and then moves towards the image side.

The maximum clear aperture diameter of the zoom lens 10, namely, a maximum diameter of a lens in the zoom lens 10, is determined to be 8.144 mm.

In this case, the first lens group 11, the second lens group 12, the third lens group 13, and the fourth lens group 14 each have three lenses arranged from the object side to the image side along the optical axis. The first lens group 11, the second lens group 12, the third lens group 13, and the fourth lens group 14 include 24 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 0.95, and a ratio of an image height of the zoom lens 10 to the effective focal length at the telephoto end of the zoom lens 10 is determined to be 0.093. When the zoom lens 10 changes from the wide-angle end to the telephoto end, a ratio of a movement distance of the second lens group 12 along the optical axis to the total optical length of the zoom lens is determined to be 0.1806, and a ratio of a movement distance of the fourth lens group 14 along the optical axis to the total optical length of the zoom lens is determined to be 0.093.

After the foregoing parameters are used, technical effect that can be achieved by the zoom lens 10 is shown in Table 7A to Table 7D.

TABLE 7A

|  | W | M1 | M2 | T |
|---|---|---|---|---|
| Focal length (mm) | 9.301 | 13.001 | 15.042 | 26.804 |
| F-number | 2.567 | 2.605 | 2.585 | 3.541 |
| Image height IMH (mm) | 2.250 | 2.250 | 2.250 | 2.250 |
| Half FOV (°) | 13.820 | 9.653 | 8.375 | 4.651 |
| BFL (mm) | 3.375 | 3.484 | 3.296 | 1.310 |
| TTL (mm) | 25.500 | 25.500 | 25.500 | 25.500 |
| Designed wavelength | 650 nm, 610 nm, 555 nm, 510 nm, and 470 nm | | | |

Table 7A indicates basic optical parameters of the zoom lens 10 at the wide-angle end, the first intermediate focal length, the second intermediate focal length, and the telephoto end. It can be seen from Table 7A that when the image height and TTL remain unchanged, both the focal length and the F-number increase. The zoom lens 10 shows a typical feature of implementing a focal length change from zoom from the wide-angle end to the telephoto end.

TABLE 7B

|  | R |  | Thickness | nd |  | vd |  |
|---|---|---|---|---|---|---|---|
| R1 | 8.507 | d1 | 1.901 | n1 | 1.55 | v1 | 69.5 |
| R2 | −14.892 | a1 | 0.070 |  |  |  |  |
| R3 | −93.156 | d2 | 0.385 | n2 | 1.70 | v2 | 25.7 |
| R4 | −61.873 | a2 | 0.070 |  |  |  |  |
| R5 | −59.650 | d3 | 0.381 | n3 | 1.83 | v3 | 25.2 |
| R6 | 24.736 | a3 | 0.795 |  |  |  |  |
| R7 | 47.871 | d4 | 0.675 | n4 | 1.95 | v4 | 17.9 |
| R8 | −27.394 | a4 | 0.478 |  |  |  |  |
| R9 | −6.694 | d5 | 0.360 | n5 | 1.69 | v5 | 41.5 |
| R10 | 3.432 | a5 | 0.185 |  |  |  |  |
| R11 | 3.540 | d6 | 0.572 | n6 | 1.95 | v6 | 17.9 |
| R12 | 4.423 | a6 | 5.106 |  |  |  |  |
| R13 | 3.377 | d7 | 2.000 | n7 | 1.55 | v7 | 69.9 |
| R14 | −8.634 | a7 | 0.678 |  |  |  |  |
| R15 | 231.226 | d8 | 2.000 | n8 | 1.85 | v8 | 20.0 |
| R16 | 11.930 | a8 | 1.754 |  |  |  |  |
| R17 | −3.167 | d9 | 0.363 | n9 | 1.94 | v9 | 19.3 |
| R18 | 126.912 | a9 | 0.236 |  |  |  |  |
| R19 | 6.078 | d10 | 1.819 | n10 | 1.74 | v10 | 27.9 |
| R20 | −74.921 | a10 | 0.562 |  |  |  |  |
| R21 | −284.824 | d11 | 0.539 | n11 | 1.56 | v11 | 67.8 |
| R22 | 6.024 | a11 | 0.130 |  |  |  |  |
| R23 | 6.834 | d12 | 1.065 | n12 | 1.91 | v12 | 35.3 |
| R24 | −6.610 | a12 | 2.565 |  |  |  |  |
| R25 | Infinity | d13 | 0.210 | n13 | 1.52 | v13 | 64.2 |
| R26 | Infinity | a13 | 0.600 |  |  |  |  |

Table 7B indicates a curvature, a thickness, a refractive index, and an abbe coefficient of each lens from the object side to the image side when the zoom lens 10 is at the wide-angle end. R1 to R26 indicate surfaces from the object side to the image side of each lens, R indicates a curvature, Thickness indicates a thickness, nd indicates a refractive index, and vd indicates an abbe coefficient.

TABLE 7C

| | | | | Aspheric coefficient | | | | |
|---|---|---|---|---|---|---|---|---|
|  | Type | K | A2 | A3 | A4 | A5 | A6 | A7 |
| R1 | Even aspheric | 0.00 | 1.33E−04 | −1.70E−05 | 4.21E−06 | −5.62E−07 | 3.58E−08 | −9.39E−10 |
| R2 | Even aspheric | 0.00 | 5.84E−04 | −7.22E−06 | −1.07E−06 | 9.91E−08 | −2.97E−09 | −5.28E−11 |
| R3 | Even aspheric | 0.00 | 4.57E−06 | 6.60E−07 | −1.46E−08 | 2.55E−10 | 6.65E−11 | 7.04E−12 |
| R4 | Even aspheric | 0.00 | −5.14E−06 | −2.66E−07 | 5.62E−08 | 2.12E−09 | 2.04E−11 | −9.86E−13 |
| R5 | Even aspheric | 0.00 | 2.91E−05 | 2.33E−05 | 4.78E−07 | −1.86E−07 | 9.87E−09 | 0.00E+00 |
| R6 | Even aspheric | 0.00 | 1.82E−05 | 1.21E−05 | 6.19E−06 | −9.95E−07 | 6.43E−08 | −1.30E−09 |
| R7 | Even aspheric | 0.00 | 8.19E−05 | −2.17E−05 | −2.62E−06 | −6.87E−08 | −2.21E−08 | 2.82E−10 |
| R8 | Even aspheric | 0.00 | −4.00E−05 | −8.05E−06 | −3.28E−06 | −5.53E−07 | 3.99E−09 | 1.21E−09 |
| R9 | Even aspheric | 0.00 | 4.93E−04 | 2.60E−04 | −4.03E−05 | 1.96E−06 | 6.22E−08 | −5.62E−09 |
| R10 | Even aspheric | 0.00 | −2.07E−03 | −9.74E−05 | −4.94E−05 | 6.19E−06 | −6.76E−07 | 5.54E−08 |
| R11 | Even aspheric | 0.00 | −3.78E−03 | −3.85E−04 | −5.79E−06 | 2.88E−06 | −5.96E−07 | −1.54E−08 |
| R12 | Even aspheric | 0.00 | −4.32E−03 | −1.70E−04 | 6.90E−07 | 6.91E−07 | −5.15E−07 | −1.29E−08 |
| R13 | Even aspheric | 0.00 | −1.91E−03 | −9.52E−05 | −1.39E−05 | −1.15E−07 | −1.84E−07 | 1.71E−08 |
| R14 | Even aspheric | 0.00 | 2.21E−03 | −4.98E−05 | 8.55E−06 | −2.36E−06 | 4.26E−07 | −2.34E−08 |
| R15 | Even aspheric | 0.00 | −9.98E−05 | 1.75E−04 | 5.56E−05 | −1.48E−06 | −1.78E−09 | −1.04E−07 |
| R16 | Even aspheric | 0.00 | 1.35E−03 | 1.22E−03 | 7.75E−05 | 7.42E−05 | −5.31E−07 | −4.88E−08 |
| R17 | Even aspheric | 0.00 | 9.72E−03 | −4.21E−04 | 1.93E−04 | −7.75E−05 | 9.48E−07 | −1.43E−08 |
| R18 | Even aspheric | 0.00 | 9.93E−03 | −6.86E−04 | −1.87E−04 | 1.92E−05 | 1.81E−08 | 1.46E−09 |
| R19 | Even aspheric | 0.00 | −4.26E−03 | −1.58E−04 | −5.03E−05 | 9.00E−06 | −5.22E−07 | −7.32E−08 |

TABLE 7C-continued

| | | Aspheric coefficient | | | | | | |
|---|---|---|---|---|---|---|---|---|
| | Type | K | A2 | A3 | A4 | A5 | A6 | A7 |
| R20 | Even aspheric | 0.00 | −3.92E−03 | −1.15E−04 | −1.72E−05 | 6.86E−06 | −8.83E−07 | 3.11E−08 |
| R21 | Even aspheric | 0.00 | −3.61E−03 | 5.86E−04 | −4.79E−05 | 3.15E−06 | 8.11E−08 | −1.07E−08 |
| R22 | Even aspheric | −1.68 | −1.02E−03 | −6.98E−04 | 2.36E−05 | 0.00E+00 | 0.00E+00 | 0.00E+00 |
| R23 | Even aspheric | 0.00 | −2.61E−04 | −7.33E−04 | 7.50E−05 | −8.75E−06 | 7.64E−07 | −2.57E−08 |
| R24 | Even aspheric | 0.00 | 1.60E−03 | −7.03E−05 | 1.11E−05 | −4.05E−07 | 7.45E−10 | 4.89E−09 |

In Table 7C, R1 to R24 indicate mirrors that are aspheric surfaces, K is a conic constant, and A2, A3, A4, A5, A6, and A7 are aspheric coefficients respectively. It can be seen from Table 7C that, in Embodiment 7, the first lens group 11, the second lens group 12, the third lens group 13, and the fourth lens group 14 of the zoom lens 10 include 24 aspheric surfaces in total.

TABLE 7D

| | W | M1 | M2 | T |
|---|---|---|---|---|
| a3 | 0.865 mm | 2.663 mm | 3.206 mm | 5.464 mm |
| a6 | 5.117 mm | 3.319 mm | 2.776 mm | 0.518 mm |
| a9 | 1.773 mm | 0.357 mm | 0.114 mm | 1.188 mm |
| a12 | 0.376 mm | 1.792 mm | 2.035 mm | 0.960 mm |

Table 7D indicates spacings between the first lens group 11 to the fourth lens group 14 when the zoom lens 10 is in the wide-angle state, the first intermediate focal length state, the second intermediate focal length state, and the telephoto state.

Figure 21:
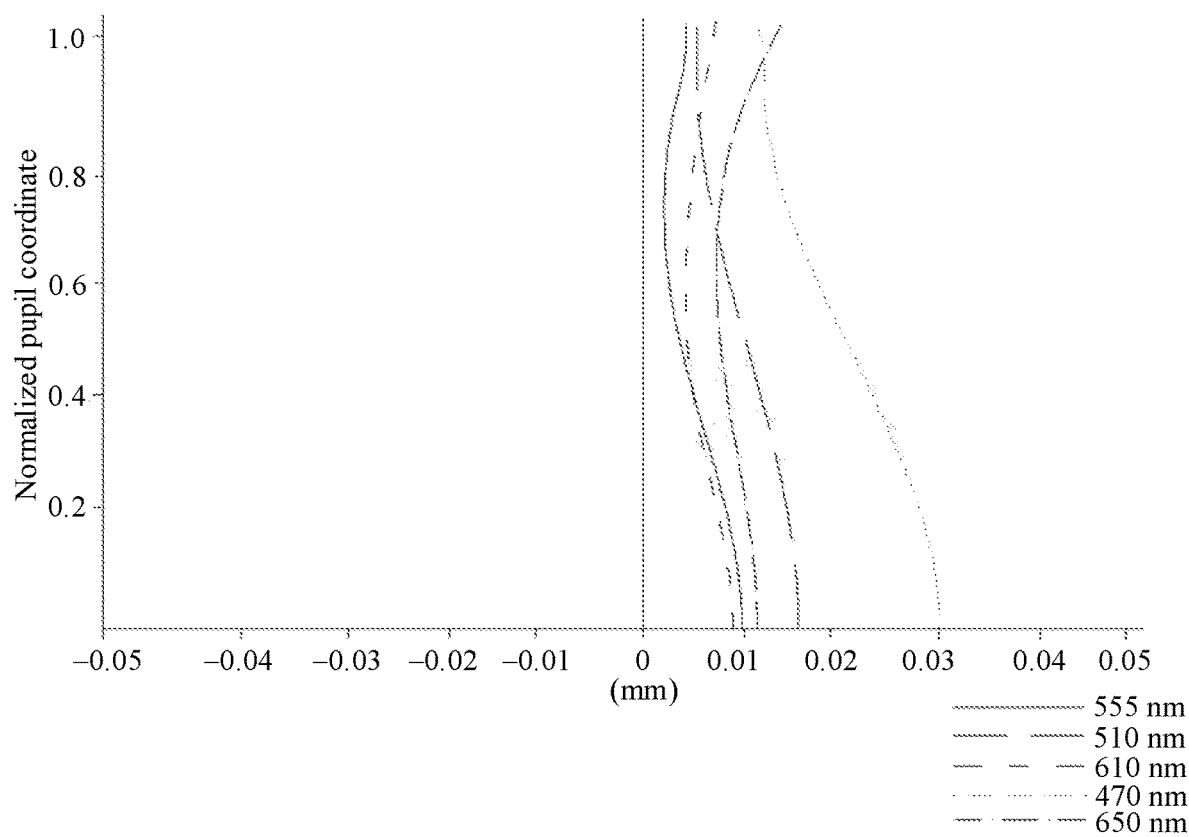
FIG. 21 shows axial chromatic aberration curves of the zoom lens in the wide-angle state according to an embodiment of this application.

FIG. 21 shows axial chromatic aberration curves of the zoom lens 10 at the wide-angle end at different wavelengths. It can be seen from FIG. 21 that, in Embodiment 7, an axial chromatic aberration of the zoom lens 10 using the foregoing technical parameters can be controlled within a small change range from 0.017 mm to 0.02 mm.

Figure 35:
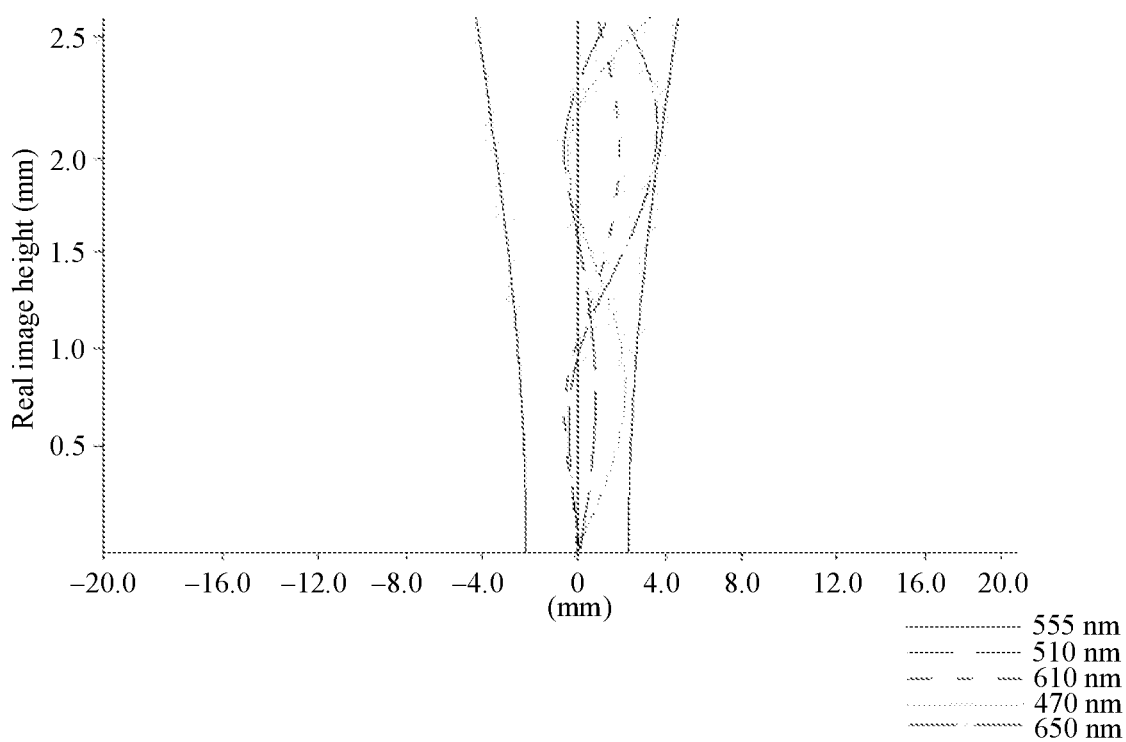
FIG. 35 shows lateral chromatic aberration curves of the zoom lens in the wide-angle state according to an embodiment of this application.

FIG. 35 shows lateral chromatic aberration curves of the zoom lens 10 at the wide-angle end at different wavelengths. It can be seen from FIG. 35 that, in Embodiment 7, lateral chromatic aberrations of the zoom lens 10 using the foregoing technical parameters at different wavelengths can be controlled around a lateral diffraction limit range.

Figure 49:
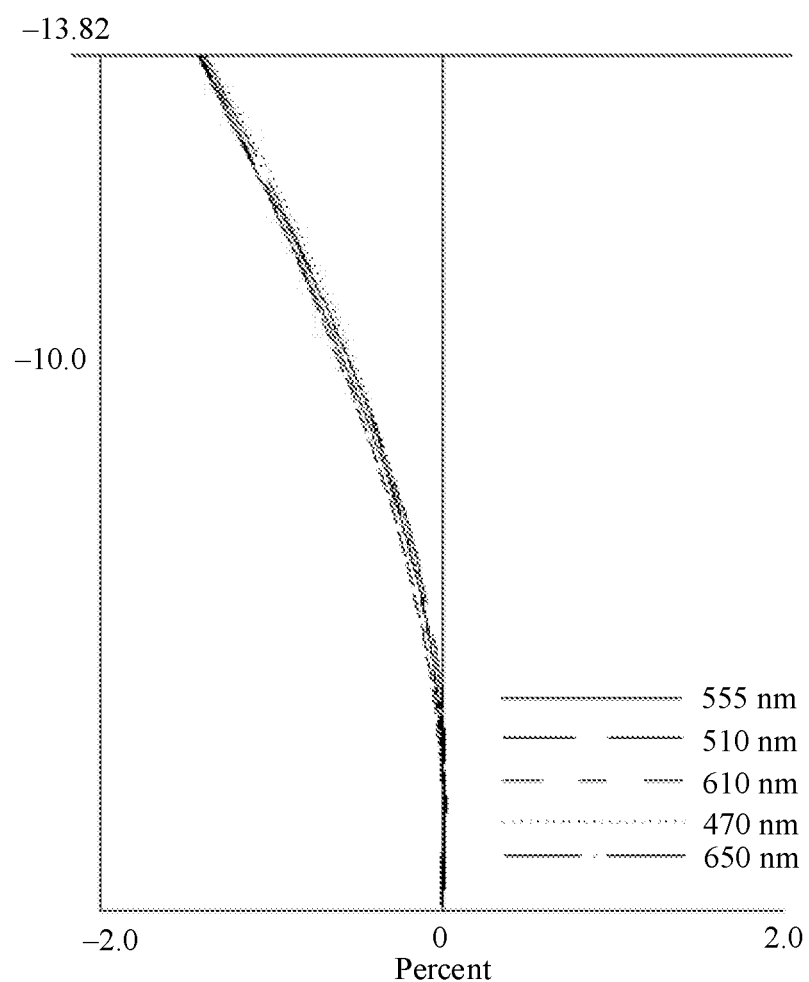
FIG. 49 shows distortion percentage curves of the zoom lens in the wide-angle state according to an embodiment of this application.

FIG. 49 shows distortion curves of the zoom lens 10 at the wide-angle end at different wavelengths. The distortion curve indicates a deviation between imaging deformation and an ideal shape. It can be seen from FIG. 49 that, in Embodiment 7, a distortion rate of the zoom lens 10 using the foregoing technical parameters can be effectively controlled below 1.8%.

Embodiment 8

In this embodiment, ratios of focal lengths of the first lens group 11, the second lens group 12, the third lens group 13, and the fourth lens group 14 to a focal length at the telephoto end of the zoom lens 10 are determined to be 0.66, 0.18, 0.24, and 72.57 respectively.

When the zoom lens 10 changes from the wide-angle end to the telephoto end, the first lens group 11 and the third lens group 13 are fastened, the second lens group 12 moves towards the image side, and the fourth lens group 14 first moves towards the object side and then moves towards the image side.

The maximum clear aperture diameter of the zoom lens 10, namely, a maximum diameter of a lens in the zoom lens 10, is determined to be 8.032 mm.

In this case, the first lens group 11, the second lens group 12, the third lens group 13, and the fourth lens group 14 each have three lenses arranged from the object side to the image side along the optical axis. The first lens group 11, the second lens group 12, the third lens group 13, and the fourth lens group 14 include 24 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 0.95, and a ratio of an image height of the zoom lens 10 to the effective focal length at the telephoto end of the zoom lens 10 is determined to be 0.093.

When the zoom lens 10 changes from the wide-angle end to the telephoto end, a ratio of a movement distance of the second lens group 12 along the optical axis to the total optical length of the zoom lens is determined to be 0.1934, and a ratio of a movement distance of the fourth lens group 14 along the optical axis to the total optical length of the zoom lens is determined to be 0.1824.

After the foregoing parameters are used, technical effect that can be achieved by the zoom lens 10 is shown in Table 8A to Table 8D.

TABLE 8A

| | W | M1 | M2 | T |
|---|---|---|---|---|
| Focal length (mm) | 9.300 | 12.999 | 15.040 | 26.796 |
| F-number | 2.874 | 2.975 | 3.013 | 3.600 |
| Image height IMH (mm) | 2.500 | 2.500 | 2.500 | 2.500 |
| Half FOV (°) | 15.487 | 10.981 | 9.429 | 5.205 |
| BFL (mm) | 1.328 | 4.638 | 5.980 | 5.307 |
| TTL (mm) | 25.500 | 25.500 | 25.500 | 25.500 |
| Designed wavelength | 650 nm, 610 nm, 555 nm, 510 nm, and 470 nm | | | |

Table 8A indicates basic optical parameters of the zoom lens 10 at the wide-angle end, the first intermediate focal length, the second intermediate focal length, and the telephoto end. It can be seen from Table 8A that when the image height and TTL remain unchanged, both the focal length and the F-number increase. The zoom lens 10 shows a typical feature of implementing a focal length change from zoom from the wide-angle end to the telephoto end.

TABLE 8B

|  | R | | Thickness | | nd | | vd |
|---|---|---|---|---|---|---|---|
| R1 | 8.025 | d1 | 1.942 | n1 | 1.54 | v1 | 70.7 |
| R2 | −14.151 | a1 | 0.070 | | | | |
| R3 | −92.744 | d2 | 0.428 | n2 | 1.95 | v2 | 17.9 |
| R4 | −44.306 | a2 | 0.081 | | | | |
| R5 | −35.478 | d3 | 0.360 | n3 | 1.86 | v3 | 26.6 |
| R6 | 21.556 | a3 | 0.631 | | | | |
| R7 | 50.789 | d4 | 0.453 | n4 | 1.95 | v4 | 17.9 |
| R8 | −2569.9 | a4 | 0.533 | | | | |
| R9 | −8.225 | d5 | 0.360 | n5 | 1.72 | v5 | 47.6 |
| R10 | 3.441 | a5 | 0.070 | | | | |
| R11 | 3.238 | d6 | 0.608 | n6 | 1.95 | v6 | 17.9 |
| R12 | 4.218 | a6 | 5.431 | | | | |
| R13 | 3.668 | d7 | 1.945 | n7 | 1.55 | v7 | 69.5 |
| R14 | −6.020 | a7 | 0.074 | | | | |
| R15 | −32.787 | d8 | 1.409 | n8 | 1.76 | v8 | 23.2 |
| R16 | 17.558 | a8 | 0.301 | | | | |
| R17 | −9.964 | d9 | 0.360 | n9 | 1.63 | v9 | 41.4 |
| R18 | −25.485 | a9 | 4.702 | | | | |

TABLE 8B-continued

|  | R | | Thickness | | nd | | vd |
|---|---|---|---|---|---|---|---|
| R19 | 6.237 | d10 | 0.888 | n10 | 1.50 | v10 | 81.4 |
| R20 | 80.682 | a10 | 0.775 | | | | |
| R21 | 33.202 | d11 | 0.745 | n11 | 1.91 | v11 | 35.3 |
| R22 | 5.299 | a11 | 0.921 | | | | |
| R23 | 7.288 | d12 | 1.082 | n12 | 1.90 | v12 | 18.8 |
| R24 | 12.590 | a12 | 0.518 | | | | |
| R25 | Infinity | d13 | 0.210 | n13 | 1.52 | v13 | 64.2 |
| R26 | Infinity | a13 | 0.600 | | | | |

Table 8B indicates a curvature, a thickness, a refractive index, and an abbe coefficient of each lens from the object side to the image side when the zoom lens 10 is at the wide-angle end. R1 to R26 indicate surfaces from the object side to the image side of each lens, R indicates a curvature, Thickness indicates a thickness, nd indicates a refractive index, and vd indicates an abbe coefficient.

TABLE 8C

| | | | Aspheric coefficient | | | | | |
|---|---|---|---|---|---|---|---|---|
| | Type | K | A2 | A3 | A4 | A5 | A6 | A7 |
| R1 | Even aspheric | 0.00 | 8.80E−05 | −1.66E−05 | 4.16E−06 | −5.61E−07 | 3.49E−08 | −9.24E−10 |
| R2 | Even aspheric | 0.00 | 6.14E−04 | −6.87E−06 | −1.17E−06 | 9.61E−08 | −3.04E−09 | −4.01E−11 |
| R3 | Even aspheric | 0.00 | 2.51E−05 | −2.13E−07 | 2.40E−08 | 1.00E−08 | 0.00E+00 | 0.00E+00 |
| R4 | Even aspheric | 0.00 | −2.41E−05 | 1.24E−06 | 1.55E−07 | 8.27E−09 | 0.00E+00 | 0.00E+00 |
| R5 | Even aspheric | 0.00 | 8.13E−06 | 2.19E−05 | 4.49E−07 | −1.91E−07 | 1.02E−08 | 0.00E+00 |
| R6 | Even aspheric | 0.00 | −5.74E−06 | 1.05E−05 | 5.93E−06 | −1.01E−06 | 6.51E−08 | −1.33E−09 |
| R7 | Even aspheric | 0.00 | 1.66E−04 | −1.04E−05 | −2.57E−06 | 1.14E−06 | 0.00E+00 | 0.00E+00 |
| R8 | Even aspheric | 0.00 | 2.47E−04 | −3.09E−05 | 3.91E−07 | 9.86E−08 | 0.00E+00 | 0.00E+00 |
| R9 | Even aspheric | 0.00 | 1.12E−04 | 1.05E−04 | −5.28E−05 | 2.88E−06 | −7.92E−08 | 1.51E−08 |
| R10 | Even aspheric | 0.00 | −2.19E−03 | −2.79E−04 | −8.71E−05 | 4.62E−06 | −2.37E−07 | 5.54E−08 |
| R11 | Even aspheric | 0.00 | −4.52E−03 | −4.09E−04 | −5.91E−06 | 2.15E−06 | 9.07E−08 | −3.17E−08 |
| R12 | Even aspheric | 0.00 | −4.54E−03 | −1.10E−05 | 8.13E−06 | 6.36E−06 | −2.24E−07 | −3.49E−08 |
| R13 | Even aspheric | 0.00 | −1.50E−03 | −9.31E−05 | −1.10E−05 | −2.32E−07 | −1.79E−07 | 2.15E−08 |
| R14 | Even aspheric | 0.00 | 2.82E−03 | −2.15E−05 | 1.28E−05 | −2.57E−06 | 3.30E−07 | 1.12E−08 |
| R15 | Even aspheric | 0.00 | −3.14E−04 | 2.14E−04 | 3.70E−05 | −3.64E−06 | 6.27E−07 | −5.93E−08 |
| R16 | Even aspheric | 0.00 | 7.60E−04 | 4.28E−04 | 1.94E−04 | 4.52E−06 | 5.33E−08 | −4.88E−08 |
| R17 | Even aspheric | 0.00 | 1.04E−02 | −1.26E−04 | 2.55E−04 | −1.79E−05 | 8.90E−07 | −1.43E−08 |
| R18 | Even aspheric | 0.00 | 1.15E−02 | 1.20E−04 | 1.76E−05 | −4.56E−06 | 1.81E−08 | 1.46E−09 |
| R19 | Even aspheric | 0.00 | −2.25E−03 | 3.36E−05 | −4.78E−05 | 3.67E−06 | 4.01E−07 | −4.87E−08 |
| R20 | Even aspheric | 0.00 | −6.04E−03 | 5.38E−04 | −5.21E−05 | −3.09E−06 | 1.99E−06 | −1.44E−07 |
| R21 | Even aspheric | 0.00 | −2.29E−03 | 5.17E−04 | −4.75E−05 | 1.28E−06 | 8.99E−07 | −7.68E−08 |
| R22 | Even aspheric | 0.06 | 1.16E−03 | 1.03E−04 | 1.49E−06 | 0.00E+00 | 0.00E+00 | 0.00E+00 |
| R23 | Even aspheric | 0.00 | 9.30E−04 | −1.39E−04 | 7.71E−05 | −7.12E−06 | 2.55E−07 | 3.18E−09 |
| R24 | Even aspheric | 0.00 | −3.82E−04 | −3.93E−05 | 4.32E−05 | −1.41E−06 | 0.00E+00 | 0.00E+00 |

In Table 8C, R1 to R24 indicate mirrors that are aspheric surfaces, K is a conic constant, and A2, A3, A4, A5, A6, and A7 are aspheric coefficients respectively. It can be seen from Table 8C that, in Embodiment 8, the first lens group 11, the second lens group 12, the third lens group 13, and the fourth lens group 14 of the zoom lens 10 include 24 aspheric surfaces in total.

TABLE 8D

|  | W | M1 | M2 | T |
|---|---|---|---|---|
| a3 | 0.631 mm | 2.056 mm | 2.659 mm | 5.562 mm |
| a6 | 5.431 mm | 4.007 mm | 3.403 mm | 0.500 mm |
| a9 | 4.702 mm | 1.393 mm | 0.050 mm | 0.723 mm |
| a12 | 0.518 mm | 3.828 mm | 5.170 mm | 4.497 mm |

Table 8D indicates spacings between the first lens group 11 to the fourth lens group 14 when the zoom lens 10 is in the wide-angle state, the first intermediate focal length state, the second intermediate focal length state, and the telephoto state.

Figure 22:
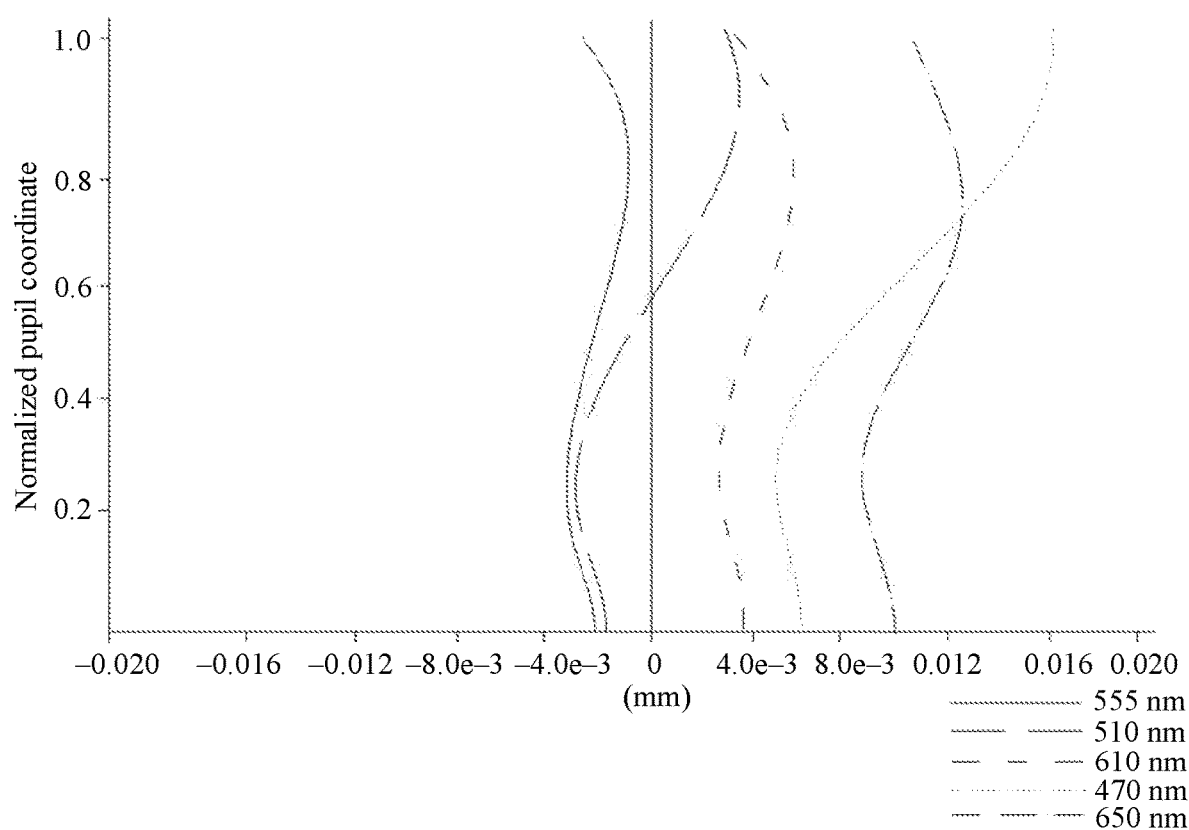
FIG. 22 shows axial chromatic aberration curves of the zoom lens in the wide-angle state according to an embodiment of this application.

FIG. 22 shows axial chromatic aberration curves of the zoom lens 10 at the wide-angle end at different wavelengths. It can be seen from FIG. 22 that, in Embodiment 8, an axial chromatic aberration of the zoom lens 10 using the foregoing technical parameters can be controlled within a small change range from 0.016 mm to 0.04 mm.

Figure 36:
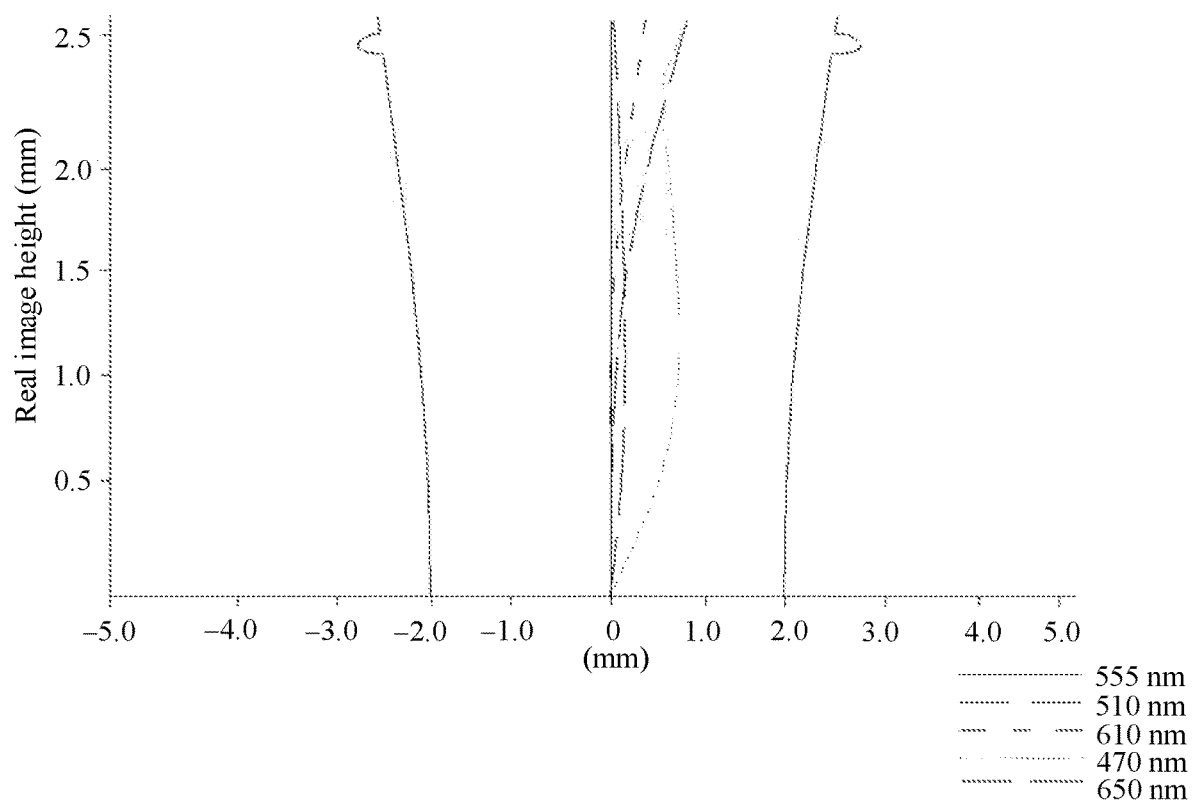
FIG. 36 shows lateral chromatic aberration curves of the zoom lens in the wide-angle state according to an embodiment of this application.

FIG. 36 shows lateral chromatic aberration curves of the zoom lens 10 at the wide-angle end at different wavelengths. It can be seen from FIG. 36 that, in Embodiment 8, lateral chromatic aberrations of the zoom lens 10 using the foregoing technical parameters at different wavelengths can be controlled around a lateral diffraction limit range.

Figure 50:
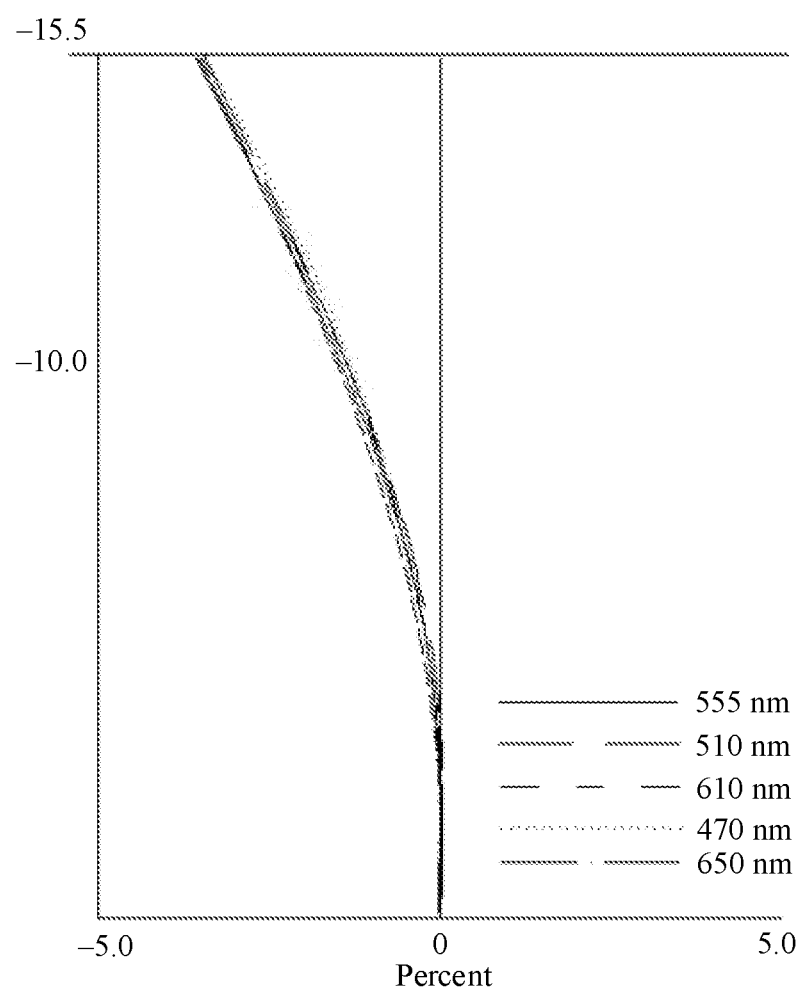
FIG. 50 shows distortion percentage curves of the zoom lens in the wide-angle state according to an embodiment of this application.

FIG. 50 shows distortion curves of the zoom lens 10 at the wide-angle end at different wavelengths. The distortion curve indicates a deviation between imaging deformation and an ideal shape. It can be seen from FIG. 50 that, in Embodiment 8, a distortion rate of the zoom lens 10 using the foregoing technical parameters can be effectively controlled below 4.1%.

Embodiment 9

In this embodiment, ratios of focal lengths of the first lens group 11, the second lens group 12, the third lens group 13, and the fourth lens group 14 to a focal length at the telephoto end of the zoom lens 10 are determined to be 0.83, 0.24, 4.104, and 0.188 respectively.

When the zoom lens 10 changes from the wide-angle end to the telephoto end, the first lens group 11 and the third lens group 13 are fastened, the second lens group 12 moves towards the image side, and the fourth lens group 14 moves towards the object side.

The maximum clear aperture diameter of the zoom lens 10, namely, a maximum diameter of a lens in the zoom lens 10, is determined to be 8.78 mm.

In this case, the first lens group 11, the second lens group 12, the third lens group 13, and the fourth lens group 14 each have three lenses arranged from the object side to the image side along the optical axis. The first lens group 11, the second lens group 12, the third lens group 13, and the fourth lens group 14 include 24 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 0.95, and a ratio of an image height of the zoom lens 10 to the effective focal length at the telephoto end of the zoom lens 10 is determined to be 0.093.

When the zoom lens 10 changes from the wide-angle end to the telephoto end, a ratio of a movement distance of the second lens group 12 along the optical axis to the total optical length of the zoom lens is determined to be 0.1786, and a ratio of a movement distance of the fourth lens group 14 along the optical axis to the total optical length of the zoom lens is determined to be 0.0698.

After the foregoing parameters are used, technical effect that can be achieved by the zoom lens 10 is shown in Table 9A to Table 9D.

TABLE 9A

|  | W | M1 | M2 | T |
|---|---|---|---|---|
| Focal length (mm) | 9.299 | 12.998 | 15.039 | 26.794 |
| F-number | 2.784 | 2.857 | 2.885 | 3.524 |
| Image height IMH (mm) | 2.500 | 2.500 | 2.500 | 2.500 |
| Half FOV (°) | 15.083 | 10.864 | 9.437 | 5.286 |
| BFL (mm) | 1.679 | 2.390 | 2.771 | 3.460 |
| TTL (mm) | 25.500 | 25.500 | 25.500 | 25.500 |
| Designed wavelength | 650 nm, 610 nm, 555 nm, 510 nm, and 470 nm | | | |

Table 9A indicates basic optical parameters of the zoom lens 10 at the wide-angle end, the first intermediate focal length, the second intermediate focal length, and the telephoto end. It can be seen from Table 9A that when the image height and TTL remain unchanged, both the focal length and the F-number increase. The zoom lens 10 shows a typical feature of implementing a focal length change from zoom from the wide-angle end to the telephoto end.

TABLE 9B

| R |  | Thickness |  | nd |  | vd |
|---|---|---|---|---|---|---|
| R1 | 8.025 | d1 | 1.942 | n1 | 1.54 | v1 | 70.7 |
| R2 | −14.151 | a1 | 0.070 |  |  |  |
| R3 | −92.744 | d2 | 0.428 | n2 | 1.95 | v2 | 17.9 |
| R4 | −44.306 | a2 | 0.081 |  |  |  |
| R5 | −35.478 | d3 | 0.360 | n3 | 1.86 | v3 | 26.6 |
| R6 | 21.556 | a3 | 0.631 |  |  |  |
| R7 | 50.789 | d4 | 0.453 | n4 | 1.95 | v4 | 17.9 |
| R8 | −2569.9 | a4 | 0.533 |  |  |  |
| R9 | −8.225 | d5 | 0.360 | n5 | 1.72 | v5 | 47.6 |
| R10 | 3.441 | a5 | 0.070 |  |  |  |
| R11 | 3.238 | d6 | 0.608 | n6 | 1.95 | v6 | 17.9 |
| R12 | 4.218 | a6 | 5.431 |  |  |  |
| R13 | 3.668 | d7 | 1.945 | n7 | 1.55 | v7 | 69.5 |
| R14 | −6.020 | a7 | 0.074 |  |  |  |
| R15 | −32.787 | d8 | 1.409 | n8 | 1.76 | v8 | 23.2 |
| R16 | 17.558 | a8 | 0.301 |  |  |  |
| R17 | −9.964 | d9 | 0.360 | n9 | 1.63 | v9 | 41.4 |
| R18 | −25.485 | a9 | 4.702 |  |  |  |
| R19 | 6.237 | d10 | 0.888 | n10 | 1.50 | v10 | 81.4 |
| R20 | 80.682 | a10 | 0.775 |  |  |  |
| R21 | 33.202 | d11 | 0.745 | n11 | 1.91 | v11 | 35.3 |
| R22 | 5.299 | a11 | 0.921 |  |  |  |
| R23 | 7.288 | d12 | 1.082 | n12 | 1.90 | v12 | 18.8 |
| R24 | 12.590 | a12 | 0.518 |  |  |  |
| R25 | Infinity | d13 | 0.210 | n13 | 1.52 | v13 | 64.2 |
| R26 | Infinity | a13 | 0.600 |  |  |  |

Table 9B indicates a curvature, a thickness, a refractive index, and an abbe coefficient of each lens from the object side to the image side when the zoom lens 10 is at the wide-angle end. R1 to R26 indicate surfaces from the object side to the image side of each lens.

TABLE 9C

| | Type | K | A2 | A3 | A4 | A5 | A6 | A7 |
|---|---|---|---|---|---|---|---|---|
| R1 | Even aspheric | 0.00 | 1.89E−04 | −1.56E−05 | 4.60E−06 | −5.65E−07 | 3.32E−08 | −8.02E−10 |
| R2 | Even aspheric | 0.00 | 6.03E−04 | −6.37E−06 | −1.11E−06 | 9.86E−08 | −3.36E−09 | −6.54E−12 |
| R3 | Even aspheric | 0.00 | 8.54E−05 | 1.67E−06 | 8.49E−08 | 2.03E−08 | 8.11E−10 | 1.80E−10 |
| R4 | Even aspheric | 0.00 | −7.82E−05 | −8.96E−08 | 1.92E−07 | 2.51E−08 | 1.59E−09 | 9.36E−11 |
| R5 | Even aspheric | 0.00 | −1.37E−04 | 1.29E−05 | 5.67E−08 | −2.32E−07 | 9.39E−09 | 0.00E+00 |
| R6 | Even aspheric | 0.00 | 2.96E−04 | 2.29E−05 | 4.92E−06 | −1.09E−06 | 6.62E−08 | −1.00E−09 |
| R7 | Even aspheric | 0.00 | −2.79E−05 | 3.38E−06 | 2.08E−06 | 1.08E−06 | −1.98E−08 | −9.25E−09 |
| R8 | Even aspheric | 0.00 | 6.72E−04 | 1.54E−05 | 6.35E−06 | 1.59E−06 | −1.93E−09 | 2.40E−08 |
| R9 | Even aspheric | 0.00 | −4.06E−04 | −3.31E−05 | −4.17E−05 | 9.03E−06 | −1.01E−07 | −1.71E−08 |
| R10 | Even aspheric | 0.00 | −3.08E−03 | −2.79E−04 | −7.59E−05 | 2.38E−06 | −5.62E−07 | −1.70E−08 |
| R11 | Even aspheric | 0.00 | −4.54E−03 | −3.58E−04 | −1.29E−05 | 1.73E−06 | −1.26E−07 | −5.92E−08 |
| R12 | Even aspheric | 0.00 | −4.90E−03 | −2.05E−04 | 1.67E−05 | 8.78E−06 | −1.37E−08 | −1.00E−07 |
| R13 | Even aspheric | 0.00 | −1.11E−03 | −2.35E−04 | −1.53E−05 | 8.78E−07 | −1.87E−07 | −7.12E−09 |
| R14 | Even aspheric | 0.00 | 3.63E−03 | 1.99E−04 | 1.94E−05 | −3.24E−06 | 3.32E−07 | 1.40E−09 |
| R15 | Even aspheric | 0.00 | −2.90E−04 | 2.59E−04 | 5.10E−05 | −2.50E−06 | 6.40E−07 | −6.27E−08 |
| R16 | Even aspheric | 0.00 | 4.66E−04 | 2.85E−04 | 1.54E−04 | −6.56E−06 | −3.98E−07 | −4.35E−08 |
| R17 | Even aspheric | 0.00 | 1.08E−02 | −3.40E−04 | 2.03E−04 | −1.80E−05 | −7.12E−08 | 2.09E−08 |
| R18 | Even aspheric | 0.00 | 7.42E−03 | −3.87E−04 | 4.17E−06 | −6.14E−06 | 6.89E−07 | 2.98E−08 |
| R19 | Even aspheric | 0.00 | −3.42E−03 | 7.00E−05 | −3.72E−05 | −1.64E−06 | 1.46E−07 | −2.88E−08 |
| R20 | Even aspheric | 0.00 | −4.91E−03 | 4.81E−04 | −5.74E−05 | −3.64E−06 | 9.51E−07 | −5.65E−08 |
| R21 | Even aspheric | 0.00 | −7.19E−03 | 5.27E−04 | −5.37E−05 | −1.19E−05 | 5.35E−06 | −3.22E−07 |
| R22 | Even aspheric | 10.08 | −2.22E−03 | 5.76E−06 | −1.02E−05 | 0.00E+00 | 0.00E+00 | 0.00E+00 |
| R23 | Even aspheric | 0.00 | −1.80E−02 | −3.95E−04 | −5.27E−05 | −7.51E−05 | 8.67E−07 | −7.27E−07 |
| R24 | Even aspheric | 0.00 | −1.78E−02 | 4.10E−04 | −1.70E−04 | −1.22E−05 | 1.69E−16 | 1.39E−18 |

In Table 9C, R1 to R24 indicate mirrors that are aspheric surfaces, K is a conic constant, and A2, A3, A4, A5, A6, and A7 are aspheric coefficients respectively. It can be seen from Table 9C that, in Embodiment 9, the first lens group 11, the second lens group 12, the third lens group 13, and the fourth lens group 14 of the zoom lens 10 include 24 aspheric surfaces in total.

TABLE 9D

| | W | M1 | M2 | T |
|---|---|---|---|---|
| a3 | 0.500 mm | 1.815 mm | 2.263 mm | 5.055 mm |
| a6 | 5.055 mm | 3.740 mm | 3.292 mm | 0.500 mm |
| a9 | 1.831 mm | 1.121 mm | 0.740 mm | 0.050 mm |
| a12 | 0.869 mm | 1.580 mm | 1.961 mm | 2.650 mm |

Table 9D indicates spacings between the first lens group 11 to the fourth lens group 14 when the zoom lens 10 is in the wide-angle state, the first intermediate focal length state, the second intermediate focal length state, and the telephoto state.

Figure 23:
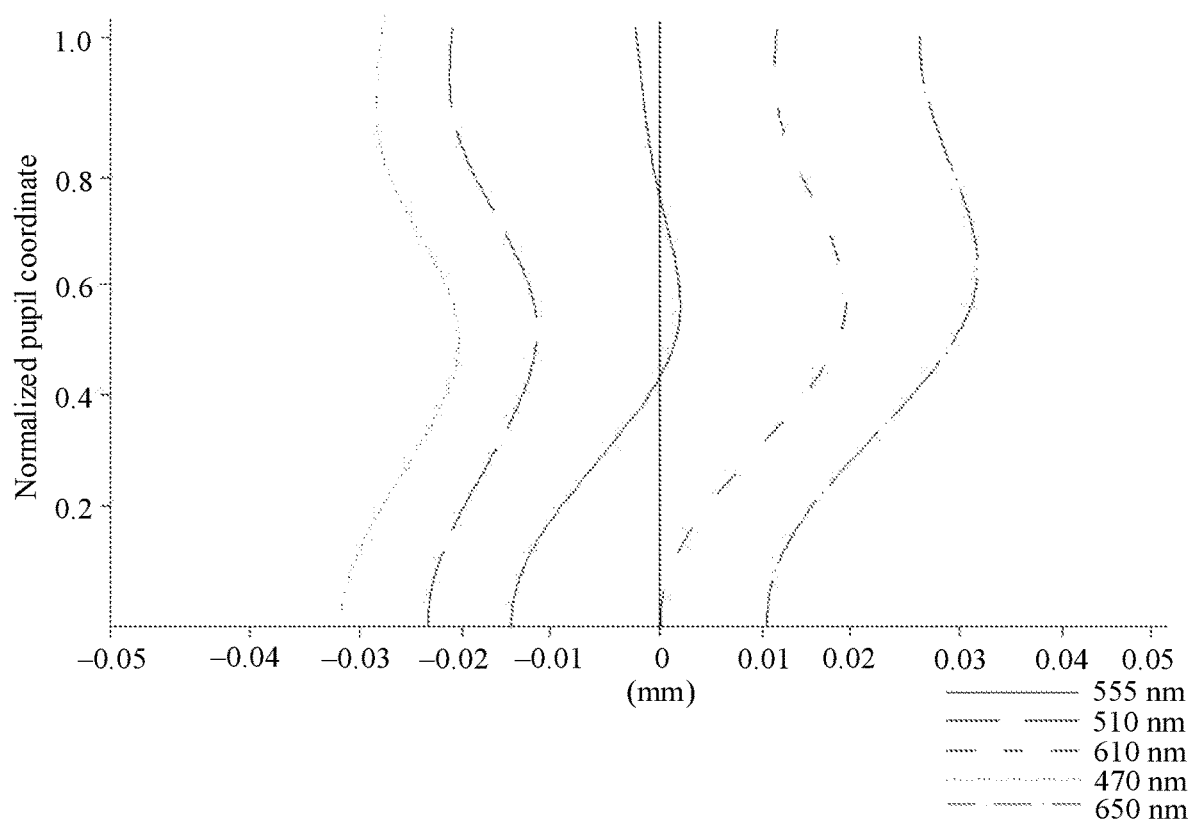
FIG. 23 shows axial chromatic aberration curves of the zoom lens in the wide-angle state according to an embodiment of this application.

FIG. 23 shows axial chromatic aberration curves of the zoom lens 10 at the wide-angle end at different wavelengths. It can be seen from FIG. 23 that, in Embodiment 9, an axial chromatic aberration of the zoom lens 10 using the foregoing technical parameters can be controlled within a small change range from 0.016 mm to 0.03 mm.

Figure 37:
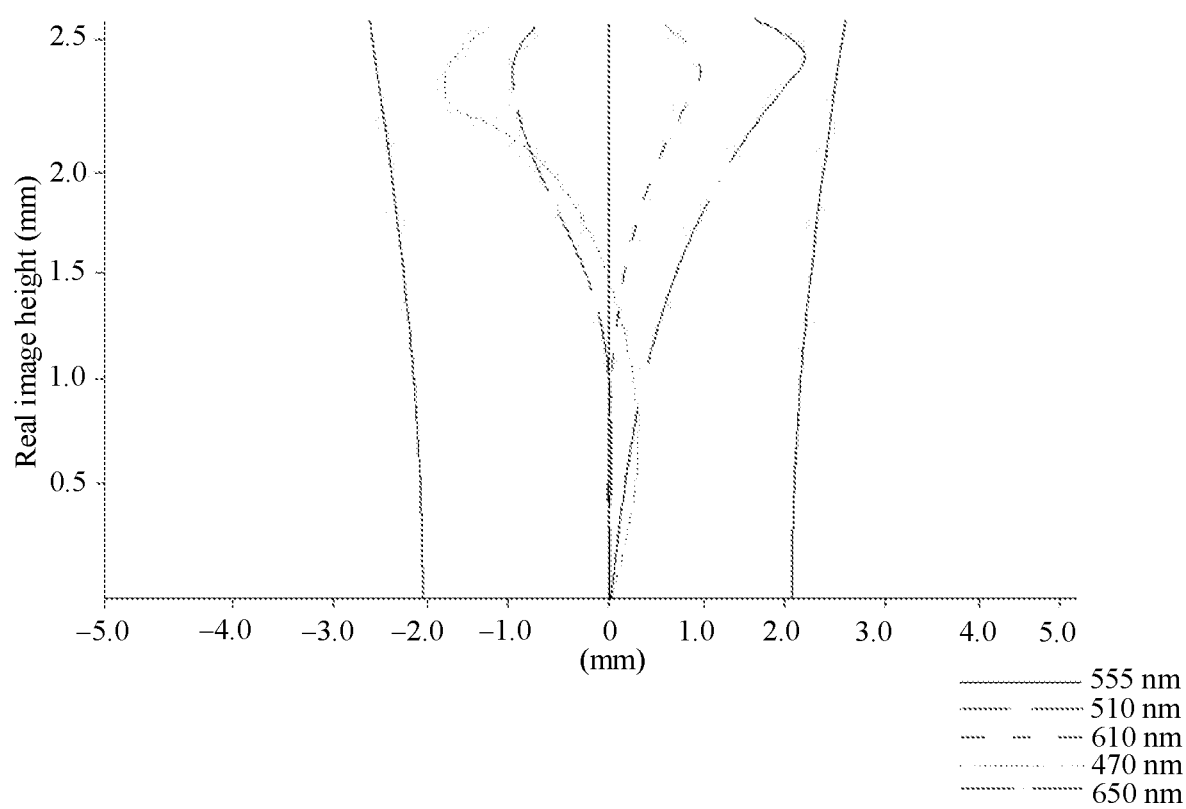
FIG. 37 shows lateral chromatic aberration curves of the zoom lens in the wide-angle state according to an embodiment of this application.

FIG. 37 shows lateral chromatic aberration curves of the zoom lens 10 in the wide-angle state, the first intermediate focal length state, the second intermediate focal length state, and the telephoto state at different wavelengths. It can be seen from FIG. 37 that, in Embodiment 9, lateral chromatic aberrations of the zoom lens 10 using the foregoing technical parameters at different wavelengths can be controlled around a lateral diffraction limit range.

Figure 51:
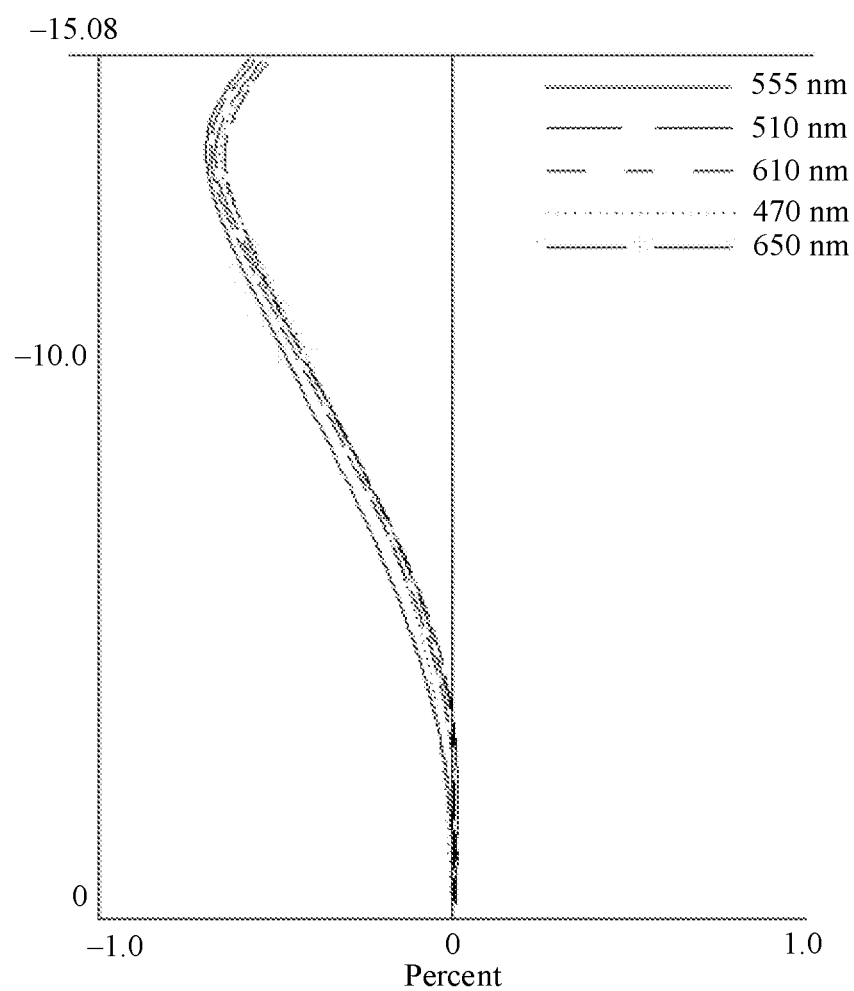
FIG. 51 shows distortion percentage curves of the zoom lens in the wide-angle state according to an embodiment of this application.

FIG. 51 shows distortion curves of the zoom lens 10 at the wide-angle end at different wavelengths. The distortion curve indicates a deviation between imaging deformation and an ideal shape. It can be seen from FIG. 51 that, in Embodiment 9, a distortion rate of the zoom lens 10 using the foregoing technical parameters can be effectively controlled below 0.9%. This significantly reduces the distortion rate of the zoom lens 10.

Embodiment 10

In this embodiment, ratios of focal lengths of the first lens group 11, the second lens group 12, the third lens group 13, and the fourth lens group 14 to a focal length at the telephoto end of the zoom lens 10 are determined to be 0.32, 0.06, 0.19, and 0.42 respectively.

When the zoom lens 10 changes from the wide-angle end to the telephoto end, the first lens group 11 and the third lens group 13 are fastened, the second lens group 12 moves towards the image side, and the fourth lens group 14 moves towards the object side.

The maximum clear aperture diameter of the zoom lens 10, namely, a maximum diameter of a lens in the zoom lens 10, is determined to be 9.458 mm.

In this case, the first lens group 11, the second lens group 12, the third lens group 13, and the fourth lens group 14 each have three lenses arranged from the object side to the image side along the optical axis. The first lens group 11, the second lens group 12, the third lens group 13, and the fourth lens group 14 include 24 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 0.95, and a ratio of an image height of the zoom lens 10 to the effective focal length at the telephoto end of the zoom lens 10 is determined to be 0.093.

When the zoom lens 10 changes from the wide-angle end to the telephoto end, a ratio of a movement distance of the second lens group 12 along the optical axis to the total optical length of the zoom lens is determined to be 0.0676, and a ratio of a movement distance of the fourth lens group 14 along the optical axis to the total optical length of the zoom lens is determined to be 0.0857.

After the foregoing parameters are used, technical effect that can be achieved by the zoom lens 10 is shown in Table 10A to Table 10D.

TABLE 10A

|  | W | M1 | M2 | T |
| --- | --- | --- | --- | --- |
| Focal length (mm) | 9.300 | 13.000 | 15.041 | 26.800 |
| F-number | 3.016 | 3.120 | 3.160 | 3.731 |
| Image height | 2.500 | 2.500 | 2.500 | 2.500 |

TABLE 10A-continued

|  | W | M1 | M2 | T |
| --- | --- | --- | --- | --- |
| IMH (mm) |  |  |  |  |
| Half FOV (°) | 15.188 | 11.090 | 9.627 | 5.313 |
| BFL (mm) | 0.860 | 2.475 | 3.040 | 3.046 |
| TTL (mm) | 25.500 | 25.500 | 25.500 | 25.500 |
| Designed wavelength | 650 nm, 610 nm, 555 nm, 510 nm, and 470 nm | | | |

Table 10A indicates basic optical parameters of the zoom lens 10 at the wide-angle end, the first intermediate focal length, the second intermediate focal length, and the telephoto end. It can be seen from Table 10A that when the image height and TTL remain unchanged, both the focal length and the F-number increase. The zoom lens 10 shows a typical feature of implementing a focal length change from zoom from the wide-angle end to the telephoto end.

TABLE 10B

|  | R | Thickness | | nd | | vd | |
| --- | --- | --- | --- | --- | --- | --- | --- |
| R1 | 6.303 | d1 | 2.343 | n1 | 1.51 | v1 | 79.0 |
| R2 | −29.357 | a1 | 0.070 | | | | |
| R3 | 26.813 | d2 | 1.131 | n2 | 1.57 | v2 | 66.3 |
| R4 | −28.230 | a2 | 0.070 | | | | |
| R5 | 93.469 | d3 | 0.360 | n3 | 1.95 | v3 | 17.9 |
| R6 | 35.911 | a3 | 2.225 | | | | |
| R7 | 14.357 | d4 | 0.360 | n4 | 1.88 | v4 | 40.8 |
| R8 | 3.414 | a4 | 1.712 | | | | |
| R9 | −7.802 | d5 | 0.360 | n5 | 1.88 | v5 | 40.8 |
| R10 | 3.501 | a5 | 0.070 | | | | |
| R11 | 3.096 | d6 | 1.442 | n6 | 1.95 | v6 | 17.9 |
| R12 | 4.176 | a6 | 0.500 | | | | |
| R13 | 3.898 | d7 | 1.740 | n7 | 1.61 | v7 | 61.4 |
| R14 | −7.728 | a7 | 0.070 | | | | |
| R15 | 5.180 | d8 | 0.360 | n8 | 1.95 | v8 | 18.0 |
| R16 | 4.917 | a8 | 0.194 | | | | |
| R17 | 10.043 | d9 | 0.360 | n9 | 1.54 | v9 | 71.3 |
| R18 | 5.004 | a9 | 0.050 | | | | |
| R19 | 3.238 | d10 | 1.891 | n10 | 1.54 | v10 | 71.3 |
| R20 | −42.184 | a10 | 0.897 | | | | |
| R21 | −19.495 | d11 | 0.360 | n11 | 1.93 | v11 | 25.0 |
| R22 | 7.883 | a11 | 5.130 | | | | |
| R23 | −174.163 | d12 | 0.761 | n12 | 1.89 | v12 | 19.0 |
| R24 | −12.272 | a12 | 2.236 | | | | |
| R25 | Infinity | d13 | 0.210 | n13 | 1.52 | v13 | 64.2 |
| R26 | Infinity | a13 | 0.600 | | | | |

Table 10B indicates a curvature, a thickness, a refractive index, and an abbe coefficient of each lens from the object side to the image side when the zoom lens 10 is at the wide-angle end. R1 to R26 indicate surfaces from the object side to the image side of each lens, R indicates a curvature, Thickness indicates a thickness, nd indicates a refractive index, and vd indicates an abbe coefficient.

TABLE 10C

| | | | Aspheric coefficient | | | | | |
| --- | --- | --- | --- | --- | --- | --- | --- | --- |
| | Type | K | A2 | A3 | A4 | A5 | A6 | A7 |
| R1 | Even aspheric | 0.00 | 5.91E−05 | −2.11E−05 | 4.59E−06 | −5.70E−07 | 3.30E−08 | −8.10E−10 |
| R2 | Even aspheric | 0.00 | 8.24E−04 | −5.11E−06 | −9.73E−07 | 1.13E−07 | −3.05E−09 | −8.30E−11 |
| R3 | Even aspheric | 0.00 | −6.63E−05 | 5.03E−06 | 6.59E−07 | 4.77E−08 | 0.00E+00 | 0.00E+00 |
| R4 | Even aspheric | 0.00 | −3.36E−05 | 1.41E−06 | 3.12E−07 | 9.57E−10 | 0.00E+00 | 0.00E+00 |
| R5 | Even aspheric | 0.00 | 1.14E−04 | 3.41E−05 | 1.35E−06 | −1.89E−07 | 8.60E−09 | 0.00E+00 |
| R6 | Even aspheric | 0.00 | 2.20E−04 | 3.43E−05 | 6.89E−06 | −9.32E−07 | 6.91E−08 | −1.33E−09 |

TABLE 10C-continued

| | | | | Aspheric coefficient | | | | |
|---|---|---|---|---|---|---|---|---|
| | Type | K | A2 | A3 | A4 | A5 | A6 | A7 |
| R7 | Even aspheric | 0.00 | 5.20E−04 | 1.92E−06 | −1.51E−05 | 5.03E−07 | 0.00E+00 | 0.00E+00 |
| R8 | Even aspheric | 0.00 | 3.53E−03 | 5.68E−04 | 3.41E−05 | 1.28E−05 | 0.00E+00 | 0.00E+00 |
| R9 | Even aspheric | 0.00 | −4.61E−04 | 1.09E−04 | −9.30E−05 | −2.22E−06 | −3.69E−06 | 1.17E−06 |
| R10 | Even aspheric | 0.00 | −6.12E−03 | −1.13E−03 | −2.21E−04 | 1.48E−05 | 8.89E−06 | −1.00E−06 |
| R11 | Even aspheric | 0.00 | −6.35E−03 | −5.79E−04 | 3.33E−05 | 5.02E−06 | −7.11E−07 | −6.95E−08 |
| R12 | Even aspheric | 0.00 | −7.08E−03 | 9.42E−04 | 6.88E−05 | −4.74E−06 | −2.74E−06 | 1.70E−07 |
| R13 | Even aspheric | 0.00 | −2.94E−03 | −5.28E−05 | 8.74E−07 | −1.30E−08 | −2.59E−07 | 6.64E−09 |
| R14 | Even aspheric | 0.00 | 2.33E−03 | −7.43E−05 | 6.64E−06 | −2.88E−06 | 2.98E−07 | −2.03E−08 |
| R15 | Even aspheric | 0.00 | −8.91E−04 | 1.91E−04 | 3.90E−05 | −4.69E−06 | 4.86E−07 | −2.40E−08 |
| R16 | Even aspheric | 0.00 | 1.07E−03 | 3.08E−04 | 1.43E−04 | −6.07E−06 | 2.73E−08 | −3.77E−08 |
| R17 | Even aspheric | 0.00 | 1.03E−02 | −4.02E−04 | 2.13E−04 | −1.75E−05 | −8.27E−08 | 1.41E−07 |
| R18 | Even aspheric | 0.00 | 7.72E−03 | −7.11E−05 | 8.57E−06 | −6.88E−06 | 1.52E−06 | 1.96E−07 |
| R19 | Even aspheric | 0.00 | −7.57E−04 | 7.88E−06 | −3.88E−05 | 6.61E−07 | 1.50E−07 | −1.06E−07 |
| R20 | Even aspheric | 0.00 | −3.39E−03 | 2.10E−04 | −5.03E−05 | −1.73E−06 | 8.74E−07 | −6.44E−08 |
| R21 | Even aspheric | 0.00 | −5.62E−03 | 1.04E−03 | −4.36E−05 | −2.35E−05 | 8.70E−06 | −3.87E−07 |
| R22 | Even aspheric | 12.11 | 6.23E−04 | 1.10E−03 | −9.59E−07 | 0.00E+00 | 0.00E+00 | 0.00E+00 |
| R23 | Even aspheric | 0.00 | 9.93E−04 | −2.57E−04 | 9.31E−05 | −1.37E−05 | 1.23E−06 | −4.65E−08 |
| R24 | Even aspheric | 0.00 | −6.09E−04 | −1.05E−04 | 2.75E−05 | −7.33E−07 | 0.00E+00 | 0.00E+00 |

In Table 10C, R1 to R24 indicate mirrors that are aspheric surfaces, K is a conic constant, and A2, A3, A4, A5, A6, and A7 are aspheric coefficients respectively. It can be seen from Table 10C that, in Embodiment 10, the first lens group 11, the second lens group 12, the third lens group 13, and the fourth lens group 14 of the zoom lens 10 include 24 aspheric surfaces in total.

TABLE 10D

| | W | M1 | M2 | T |
|---|---|---|---|---|
| a3 | 0.500 mm | 1.069 mm | 1.288 mm | 2.225 mm |
| a6 | 2.225 mm | 1.656 mm | 1.437 mm | 0.500 mm |
| a9 | 2.236 mm | 0.621 mm | 0.056 mm | 0.050 mm |
| a12 | 0.050 mm | 1.665 mm | 2.230 mm | 2.236 mm |

Table 10D indicates spacings between the first lens group 11 to the fourth lens group 14 when the zoom lens 10 is in the wide-angle state, the first intermediate focal length state, the second intermediate focal length state, and the telephoto state.

Figure 24:
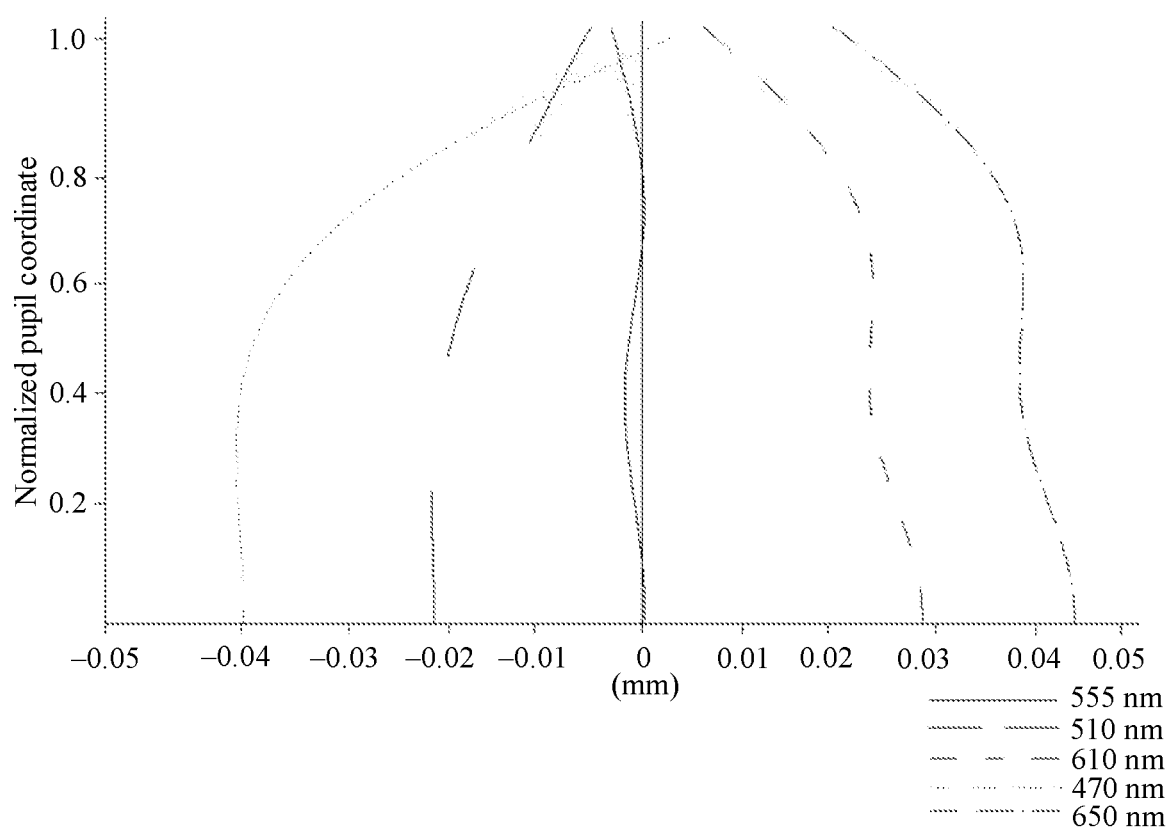
FIG. 24 shows axial chromatic aberration curves of the zoom lens in the wide-angle state according to an embodiment of this application.

FIG. 24 shows axial chromatic aberration curves of the zoom lens 10 at the wide-angle end at different wavelengths. It can be seen from FIG. 24 that, in Embodiment 10, an axial chromatic aberration of the zoom lens 10 using the foregoing technical parameters can be controlled within a small change range from 0.016 mm to 0.03 mm.

Figure 38:
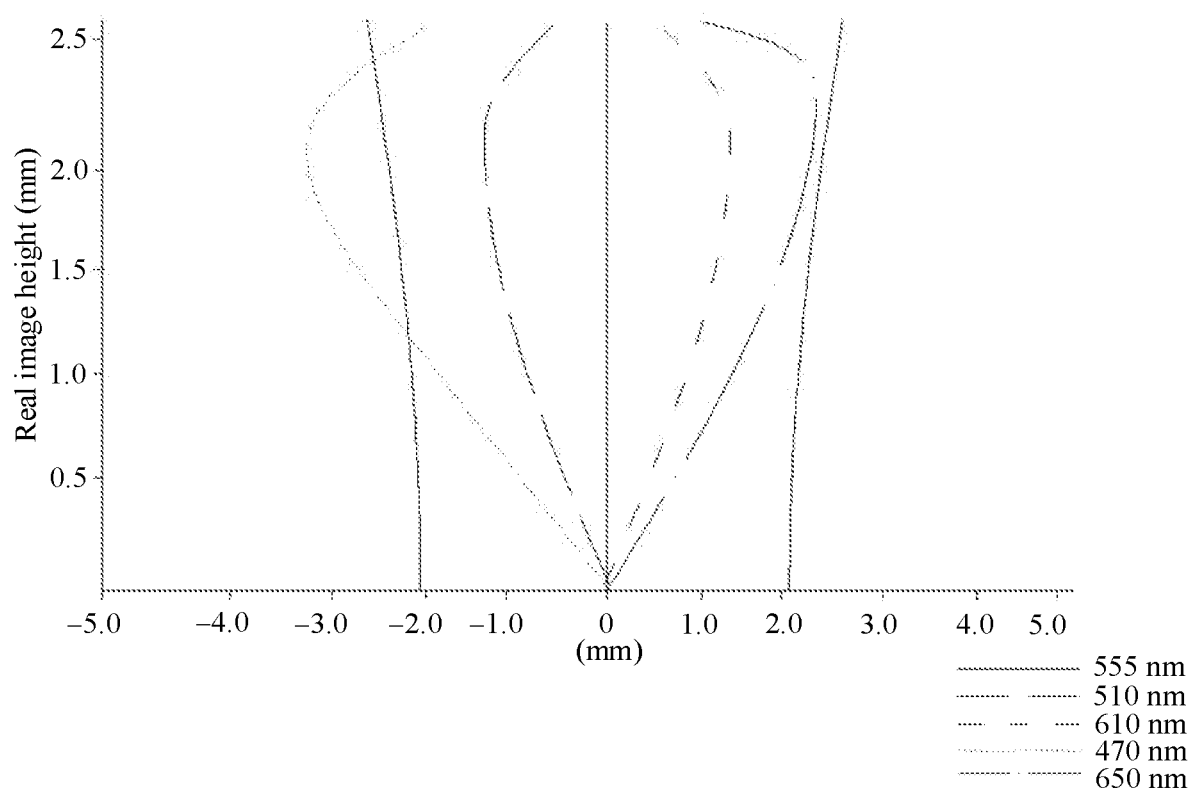
FIG. 38 shows lateral chromatic aberration curves of the zoom lens in the wide-angle state according to an embodiment of this application.

FIG. 38 shows lateral chromatic aberration curves of the zoom lens 10 at the wide-angle end at different wavelengths. It can be seen from FIG. 38 that, in Embodiment 10, lateral chromatic aberrations of the zoom lens 10 using the foregoing technical parameters at different wavelengths can be controlled around a lateral diffraction limit range.

Figure 52:
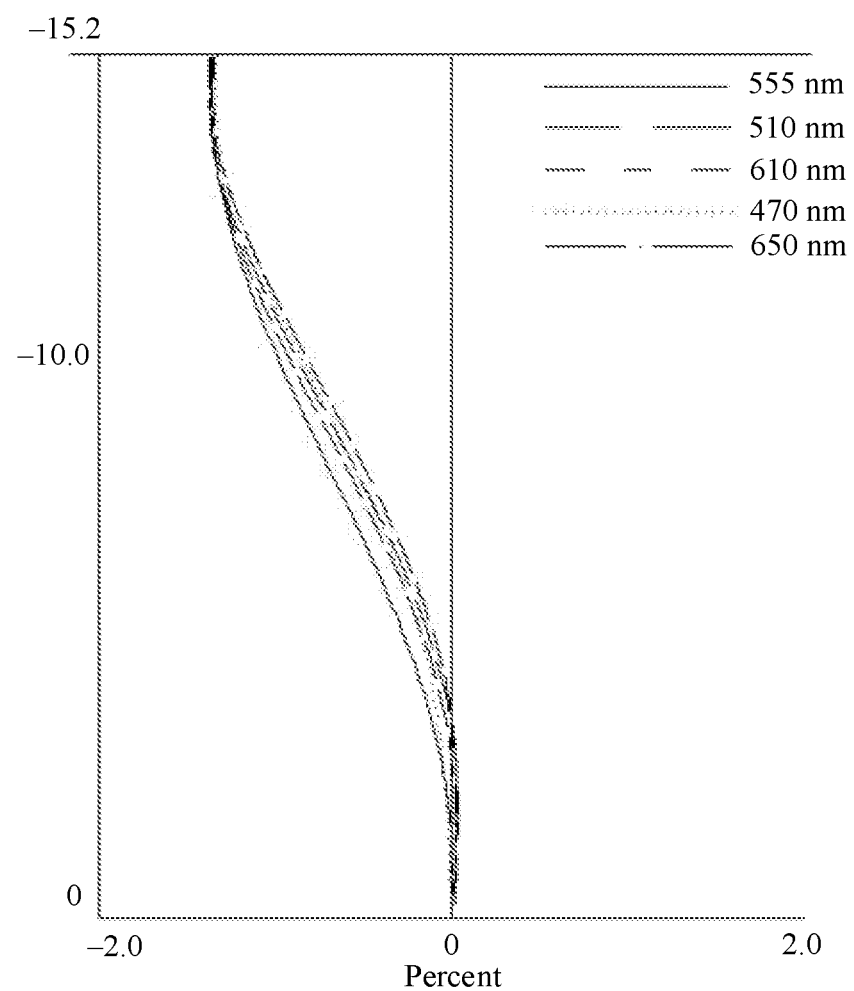
FIG. 52 shows distortion percentage curves of the zoom lens in the wide-angle state according to an embodiment of this application.

FIG. 52 shows distortion curves of the zoom lens 10 at the wide-angle end at different wavelengths. The distortion curve indicates a deviation between imaging deformation and an ideal shape. It can be seen from FIG. 52 that, in Embodiment 10, a distortion rate of the zoom lens 10 using the foregoing technical parameters can be effectively controlled below 1.6%.

Embodiment 11

In this embodiment, ratios of focal lengths of the first lens group 11, the second lens group 12, the third lens group 13, and the fourth lens group 14 to a focal length at the telephoto end of the zoom lens 10 are determined to be 0.79, 0.26, 0.29, and 1.79 respectively.

When the zoom lens 10 changes from the wide-angle end to the telephoto end, the first lens group 11 and the third lens group 13 are fastened, the second lens group 12 moves towards the image side, and the fourth lens group 14 first moves towards the image side and then moves towards the object side.

The maximum clear aperture diameter of the zoom lens 10, namely, a maximum diameter of a lens in the zoom lens 10, is determined to be 7.9 mm.

In this case, the first lens group 11 and the second lens group 12 have two lenses arranged along the optical axis, the third lens group 13 has three lenses arranged along the optical axis, and the fourth lens group 14 has one lens arranged along the optical axis. The first lens group 11, the second lens group 12, the third lens group 13, and the fourth lens group 14 include 14 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 1.05, and a ratio of an image height of the zoom lens 10 to the effective focal length at the telephoto end of the zoom lens 10 is determined to be 0.12.

When the zoom lens 10 changes from the wide-angle end to the telephoto end, a ratio of a movement distance of the second lens group 12 along the optical axis to the total optical length of the zoom lens is determined to be 0.2123, and a ratio of a movement distance of the fourth lens group 14 along the optical axis to the total optical length of the zoom lens is determined to be 0.1758.

A spacing between the third lens group 13 and a stop of the zoom lens 10 is 0.12 mm.

After the foregoing parameters are used, technical effect that can be achieved by the zoom lens 10 is shown in Table 11A to Table 11D.

TABLE 11A

|  | W | M1 | M2 | T |
|---|---|---|---|---|
| Focal length (mm) | 9.201 | 14.001 | 17.501 | 21.802 |
| F-number | 2.488 | 2.449 | 2.503 | 2.849 |
| Image height IMH (mm) | 2.550 | 2.550 | 2.550 | 2.550 |
| Half FOV (°) | 15.727 | 10.254 | 8.154 | 6.531 |
| BFL (mm) | 6.750 | 4.268 | 5.491 | 8.313 |
| TTL (mm) | 23.000 | 23.000 | 23.000 | 23.000 |
| Designed wavelength | | 650 nm, 610 nm, 555 nm, 510 nm, and 470 nm | | |

Table 11A indicates basic optical parameters of the zoom lens 10 at the wide-angle end, the first intermediate focal length, the second intermediate focal length, and the telephoto end. It can be seen from Table 11A that when the image height and TTL remain unchanged, both the focal length and the F-number increase. The zoom lens 10 shows a typical feature of implementing a focal length change from zoom from the wide-angle end to the telephoto end.

TABLE 11B

| | R | | Thickness | | nd | | vd |
|---|---|---|---|---|---|---|---|
| R1 | 7.081 | d1 | 1.557 | n1 | 1.59 | v1 | 67.0 |
| R2 | −46.243 | a1 | 0.060 | | | | |
| R3 | 32.607 | d2 | 0.400 | n2 | 1.82 | v2 | 24.1 |
| R4 | 12.061 | a2 | 0.500 | | | | |
| R5 | −40.559 | d3 | 0.350 | n3 | 1.54 | v3 | 56.0 |
| R6 | 6.719 | a3 | 0.755 | | | | |
| R7 | 7.062 | d4 | 0.361 | n4 | 1.54 | v4 | 56.0 |
| R8 | 2.525 | a4 | 0.067 | | | | |
| R9 | 2.664 | d5 | 0.605 | n5 | 1.67 | v5 | 19.2 |
| R10 | 3.453 | a5 | 5.383 | | | | |
| Stop | Infinity | | 0.120 | | | | |
| R11 | 3.728 | d6 | 1.672 | n6 | 1.54 | v6 | 56.0 |
| R12 | −5.882 | a6 | 0.254 | | | | |
| R13 | −4.986 | d7 | 1.400 | n7 | 1.67 | v7 | 19.2 |
| R14 | −12.135 | a7 | 2.262 | | | | |
| R15 | 4.091 | d8 | 0.504 | n8 | 1.54 | v8 | 56.0 |
| R16 | 3.283 | a8 | 3.722 | | | | |
| R17 | Infinity | d9 | 0.210 | n9 | 1.54 | v9 | 64.2 |
| R18 | Infinity | a9 | 2.818 | | | | |

Table 11B indicates a curvature, a thickness, a refractive index, and an abbe coefficient of each lens from the object side to the image side when the zoom lens 10 is at the wide-angle end. R1 to R18 indicate surfaces from the object side to the image side of each lens, R indicates a curvature, Thickness indicates a thickness, nd indicates a refractive index, and vd indicates an abbe coefficient. It should be noted that, in this embodiment, the stop is disposed near a mirror surface of the third lens group facing the object side, and is 0.12 mm away from a mirror surface of the third lens group facing the object side.

TABLE 11C

| | | | | Aspheric coefficient | | | |
|---|---|---|---|---|---|---|---|
| | Type | K | A2 | A3 | A4 | A5 | A6 | A7 |
| R1 | Even aspheric | 0.00 | −9.28E−05 | −5.17E−06 | −3.01E−07 | 5.25E−08 | −2.70E−09 | 0.00E+00 |
| R2 | Even aspheric | 0.00 | 1.68E−04 | −1.19E−05 | 9.90E−07 | −4.18E−08 | 0.00E+00 | 0.00E+00 |
| R5 | Even aspheric | 0.00 | 1.99E−02 | −1.94E−03 | 2.10E−04 | −2.12E−05 | 5.30E−07 | 0.00E+00 |
| R6 | Even aspheric | 0.00 | 1.40E−02 | 1.82E−03 | −3.49E−04 | 7.88E−05 | −2.30E−06 | 0.00E+00 |
| R7 | Even aspheric | 0.00 | −3.04E−02 | 4.01E−03 | −1.44E−05 | −1.97E−05 | −6.64E−07 | 0.00E+00 |
| R8 | Even aspheric | 0.00 | −2.05E−02 | −2.28E−03 | 4.37E−04 | 9.94E−06 | −1.52E−05 | 0.00E+00 |
| R9 | Even aspheric | 0.00 | −2.06E−02 | −2.02E−04 | 1.37E−05 | −3.31E−05 | 3.26E−06 | 0.00E+00 |
| R10 | Even aspheric | 0.00 | −3.11E−02 | 5.01E−03 | −6.70E−04 | −1.74E−05 | 1.03E−05 | 0.00E+00 |
| R11 | Even aspheric | 0.00 | −4.57E−04 | 7.96E−06 | −1.90E−05 | 5.62E−06 | −8.42E−07 | 0.00E+00 |
| R12 | Even aspheric | 0.00 | 4.93E−03 | 1.17E−04 | −4.31E−06 | −3.89E−06 | 2.21E−07 | 0.00E+00 |
| R13 | Even aspheric | 0.00 | 7.89E−03 | 4.24E−04 | −8.46E−05 | 7.98E−06 | 0.00E+00 | 0.00E+00 |
| R14 | Even aspheric | 0.00 | 6.62E−03 | 6.57E−04 | −8.10E−05 | 2.02E−05 | 0.00E+00 | 0.00E+00 |
| R15 | Even aspheric | 0.00 | −6.35E−03 | −8.47E−05 | −1.66E−05 | 1.64E−06 | 1.70E−12 | 0.00E+00 |

TABLE 11C-continued

| | | | Aspheric coefficient | | | | | |
|---|---|---|---|---|---|---|---|---|
| | Type | K | A2 | A3 | A4 | A5 | A6 | A7 |
| R16 | Even aspheric | 0.00 | −8.35E−03 | −2.10E−04 | −2.25E−05 | 7.32E−07 | −1.78E−12 | 0.00E+00 |

In Table 11C, R1 to R16 indicate mirrors that are aspheric surfaces, K is a conic constant, and A2, A3, A4, A5, A6, and A7 are aspheric coefficients respectively. It can be seen from Table 11C that, in Embodiment 11, the first lens group 11, the second lens group 12, the third lens group 13, and the fourth lens group 14 of the zoom lens 10 include 14 aspheric surfaces in total.

TABLE 11D

| | W | M1 | M2 | T |
|---|---|---|---|---|
| a3 | 0.500 mm | 3.112 mm | 4.258 mm | 5.383 mm |
| a6 | 5.383 mm | 2.770 mm | 1.624 mm | 0.500 mm |
| a9 | 2.262 mm | 4.744 mm | 3.521 mm | 0.700 mm |
| a12 | 3.722 mm | 1.241 mm | 2.463 mm | 5.285 mm |

Table 11D indicates spacings between the first lens group 11 to the fourth lens group 14 when the zoom lens 10 is in the wide-angle state, the first intermediate focal length state, the second intermediate focal length state, and the telephoto state.

Figure 25:
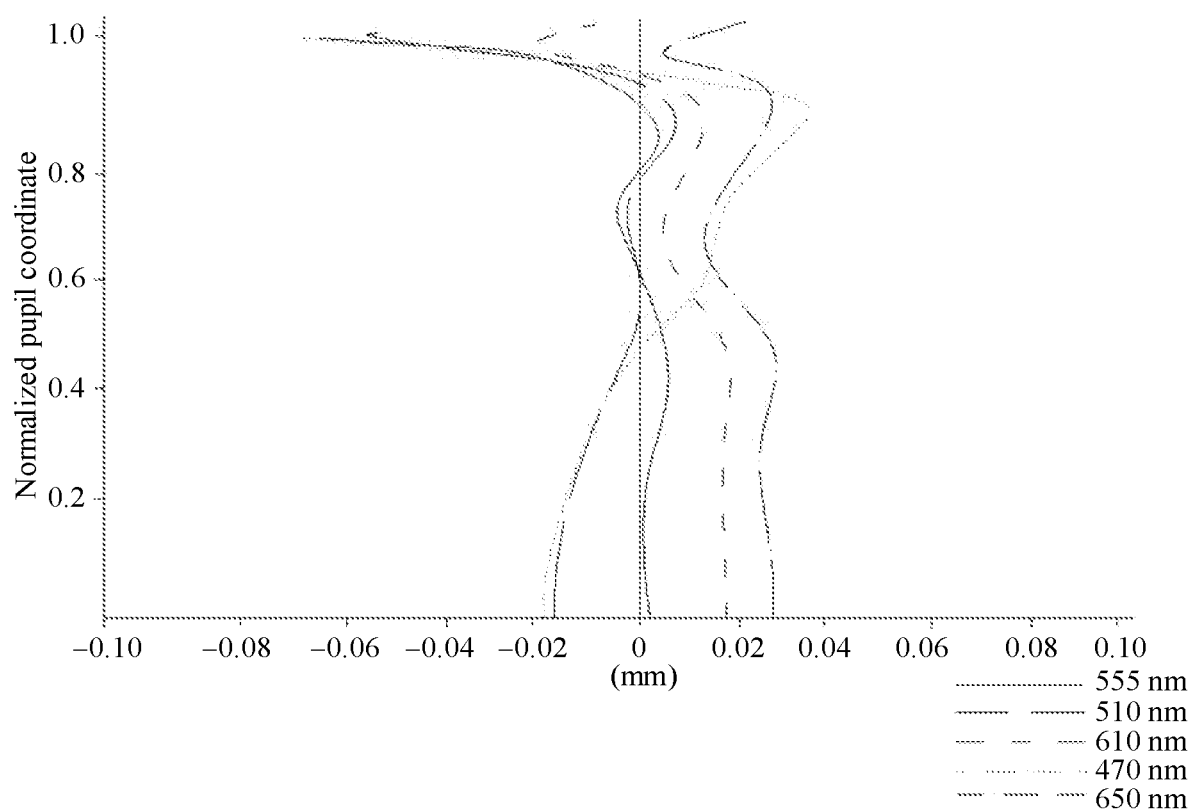
FIG. 25 shows axial chromatic aberration curves of the zoom lens in the wide-angle state according to an embodiment of this application.

FIG. 25 shows axial chromatic aberration curves of the zoom lens 10 at the wide-angle end at different wavelengths. It can be seen from FIG. 25 that, in Embodiment 11, an axial chromatic aberration of the zoom lens 10 using the foregoing technical parameters can be controlled within a small change range from 0.016 mm to 0.03 mm.

Figure 39:
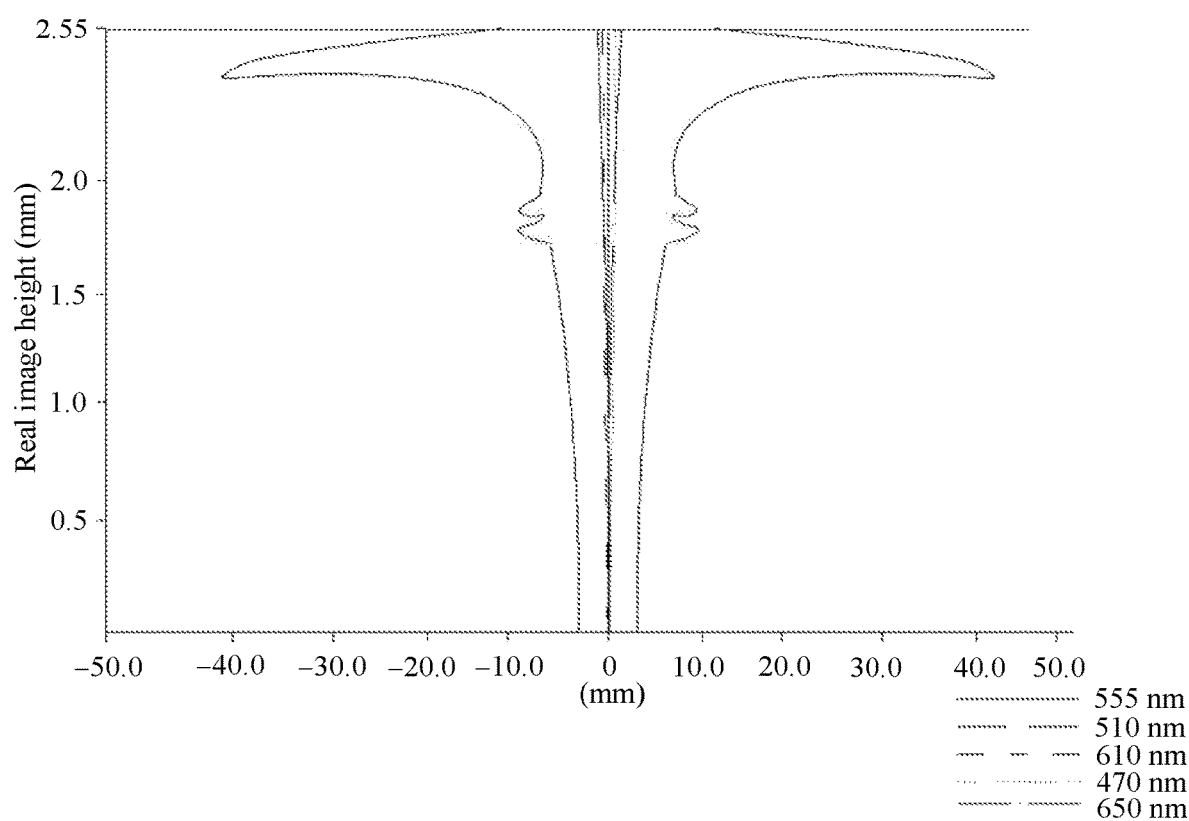
FIG. 39 shows lateral chromatic aberration curves of the zoom lens in the wide-angle state according to Embodiment 11 of this application.

FIG. 39 shows lateral chromatic aberration curves of the zoom lens 10 at the wide-angle end at different wavelengths. It can be seen from FIG. 39 that, in Embodiment 11, lateral chromatic aberrations of the zoom lens 10 using the foregoing technical parameters at different wavelengths can be controlled around a lateral diffraction limit range.

Figure 53:
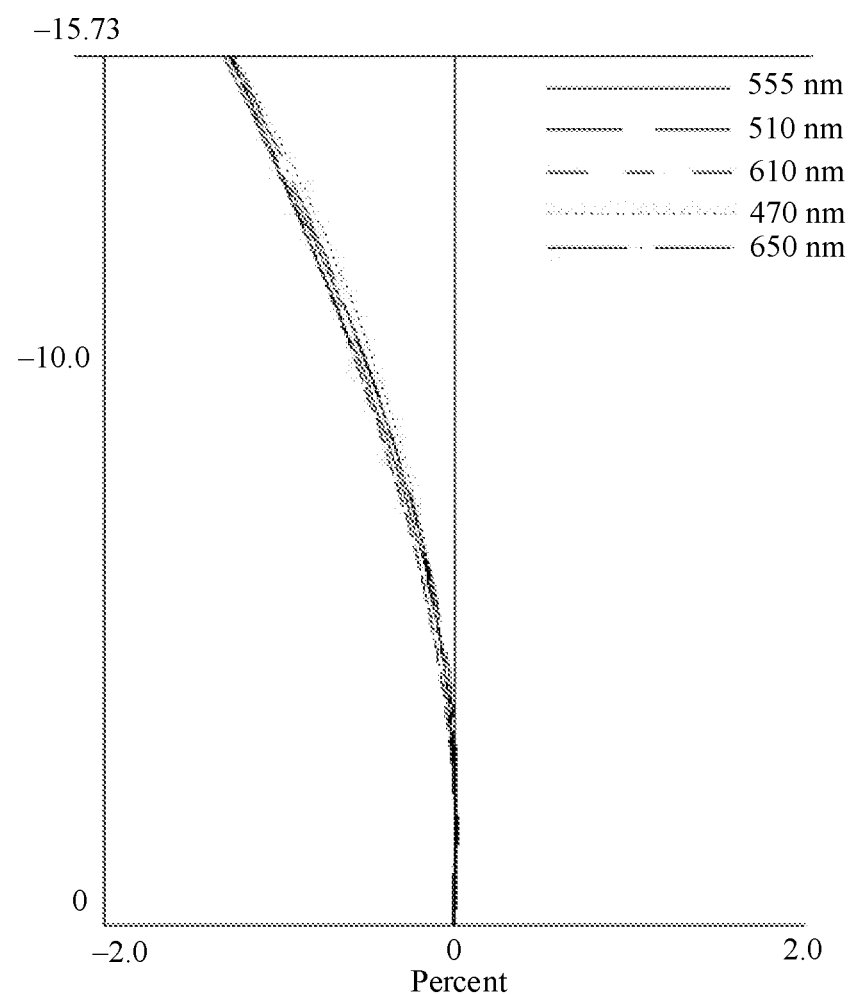
FIG. 53 shows distortion percentage curves of the zoom lens in the wide-angle state according to an embodiment of this application.

FIG. 53 shows distortion curves of the zoom lens 10 at the wide-angle end at different wavelengths. The distortion curve indicates a deviation between imaging deformation and an ideal shape. It can be seen from FIG. 53 that, in Embodiment 11, a distortion rate of the zoom lens 10 using the foregoing technical parameters can be effectively controlled below 1.8%.

Embodiment 12

In this embodiment, ratios of focal lengths of the first lens group 11, the second lens group 12, the third lens group 13, and the fourth lens group 14 to a focal length at the telephoto end of the zoom lens 10 are determined to be 0.55, 0.18, 0.32, and 0.45 respectively.

When the zoom lens 10 changes from the wide-angle end to the telephoto end, the first lens group 11 and the third lens group 13 are fastened, the second lens group 12 moves towards the image side, and the fourth lens group 14 first moves towards the object side and then moves towards the image side.

The maximum clear aperture diameter of the zoom lens 10, namely, a maximum diameter of a lens in the zoom lens 10, is determined to be 8.032 mm.

In this case, the first lens group 11, the second lens group 12, and the third lens group 13 each have three lenses arranged along the optical axis, and the fourth lens group 14 has one lens arranged along the optical axis. The first lens group 11, the second lens group 12, the third lens group 13, and the fourth lens group 14 include 16 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 0.95, and a ratio of an image height of the zoom lens 10 to the effective focal length at the telephoto end of the zoom lens 10 is determined to be 0.095.

When the zoom lens 10 changes from the wide-angle end to the telephoto end, a ratio of a movement distance of the second lens group 12 along the optical axis to the total optical length of the zoom lens 10 is determined to be 0.1845, and a ratio of a movement distance of the fourth lens group 14 along the optical axis to the total optical length of the zoom lens is determined to be 0.1812.

After the foregoing parameters are used, technical effect that can be achieved by the zoom lens 10 is shown in Table 12A to Table 12D.

TABLE 12A

| | W | M1 | M2 | T |
|---|---|---|---|---|
| Focal length (mm) | 9.300 | 13.000 | 15.041 | 26.800 |
| F-number | 2.843 | 2.903 | 2.918 | 3.497 |
| Image height IMH (mm) | 2.500 | 2.500 | 2.500 | 2.500 |
| Half FOV (°) | 15.490 | 10.806 | 9.298 | 5.035 |
| BFL (mm) | 7.260 | 7.460 | 7.260 | 2.840 |
| TTL (mm) | 25.498 | 25.499 | 25.498 | 25.499 |
| Designed wavelength | 650 nm, 610 nm, 555 nm, 510 nm, and 470 nm | | | |

Table 12A indicates basic optical parameters of the zoom lens 10 at the wide-angle end, the first intermediate focal length, the second intermediate focal length, and the telephoto end. It can be seen from Table 12A that when the image height and TTL remain unchanged, both the focal length and the F-number increase. The zoom lens 10 shows a typical feature of implementing a focal length change from zoom from the wide-angle end to the telephoto end.

TABLE 12B

| | R | Thickness | | nd | | vd |
|---|---|---|---|---|---|---|
| R1 | 9.216 | d1 | 1.813 | n1 | 1.55 | v1 | 68.7 |
| R2 | −13.719 | a1 | 0.070 | | | |
| R3 | −65.353 | d2 | 0.360 | n2 | 1.95 | v2 | 17.9 |
| R4 | −59.303 | a2 | 0.070 | | | |
| R5 | −57.291 | d3 | 0.370 | n3 | 1.81 | v3 | 20.9 |
| R6 | 39.825 | a3 | 0.669 | | | |
| R7 | −203.495 | d4 | 0.518 | n4 | 1.95 | v4 | 17.9 |
| R8 | −43.590 | a4 | 0.409 | | | |
| R9 | −7.965 | d5 | 0.360 | n5 | 1.69 | v5 | 54.5 |
| R10 | 3.508 | a5 | 0.140 | | | |
| R11 | 3.497 | d6 | 0.581 | n6 | 1.95 | v6 | 17.9 |
| R12 | 4.464 | a6 | 5.205 | | | |
| R13 | 3.504 | d7 | 1.504 | n7 | 1.55 | v7 | 69.8 |
| R14 | −7.950 | a7 | 0.727 | | | |
| R15 | −56.432 | d8 | 1.488 | n8 | 1.74 | v8 | 23.5 |
| R16 | 4.298 | a8 | 1.162 | | | |

TABLE 12B-continued

| R | | Thickness | | nd | | vd |
|---|---|---|---|---|---|---|
| R17 | −4.708 | d9 | 0.607 | n9 | 1.81 | v9 | 20.9 |
| R18 | −4.436 | a9 | 0.347 | | | | |
| R19 | 19.759 | d10 | 1.838 | n10 | 1.63 | v10 | 52.2 |
| R20 | −11.971 | a10 | 6.450 | | | | |
| R21 | Infinity | d11 | 0.210 | n11 | 1.52 | v11 | 64.2 |
| R22 | Infinity | a11 | 0.600 | | | | |

Table 12B indicates a curvature, a thickness, a refractive index, and an abbe coefficient of each lens from the object side to the image side when the zoom lens 10 is at the wide-angle end. R1 to R22 indicate surfaces from the object side to the image side of each lens, R indicates a curvature, Thickness indicates a thickness, nd indicates a refractive index, and vd indicates an abbe coefficient.

TABLE 12C

Aspheric coefficient

| | Type | K | A2 | A3 | A4 | A5 | A6 | A7 |
|---|---|---|---|---|---|---|---|---|
| R1 | Even aspheric | 0.00 | 1.44E−04 | −1.66E−05 | 4.21E−06 | −5.66E−07 | 3.58E−08 | −9.38E−10 |
| R2 | Even aspheric | 0.00 | 5.67E−04 | −6.21E−06 | −1.04E−06 | 1.01E−07 | −2.94E−09 | −6.06E−11 |
| R5 | Even aspheric | 0.00 | 2.86E−05 | 2.25E−05 | 5.95E−07 | −1.81E−07 | 9.96E−09 | 0.00E+00 |
| R6 | Even aspheric | 0.00 | 9.18E−06 | 1.31E−05 | 5.98E−06 | −9.93E−07 | 6.51E−08 | −1.33E−09 |
| R9 | Even aspheric | 0.00 | 1.36E−04 | 2.22E−04 | −4.24E−05 | 3.43E−06 | 8.43E−08 | −1.89E−08 |
| R10 | Even aspheric | 0.00 | −1.70E−03 | −7.20E−05 | −5.70E−05 | 7.01E−06 | −5.85E−07 | 5.50E−08 |
| R11 | Even aspheric | 0.00 | −3.54E−03 | −3.83E−04 | −1.32E−05 | 1.36E−06 | −7.70E−07 | −3.28E−08 |
| R12 | Even aspheric | 0.00 | −4.15E−03 | −1.76E−04 | 8.66E−07 | −2.68E−06 | −5.20E−07 | −3.53E−08 |
| R13 | Even aspheric | 0.00 | −1.82E−03 | −6.40E−05 | −5.33E−06 | 5.43E−07 | −1.65E−07 | 1.59E−08 |
| R14 | Even aspheric | 0.00 | 2.30E−03 | −3.47E−05 | 9.56E−06 | −2.34E−06 | 4.27E−07 | −2.70E−08 |
| R15 | Even aspheric | 0.00 | −5.72E−04 | 3.99E−05 | 1.82E−05 | −3.54E−06 | 5.97E−07 | −1.06E−07 |
| R16 | Even aspheric | 0.00 | 3.75E−03 | 4.42E−04 | 1.43E−04 | −1.18E−05 | −2.32E−07 | −4.88E−08 |
| R17 | Even aspheric | 0.00 | 1.26E−02 | 9.58E−05 | 1.16E−04 | −4.64E−05 | 9.75E−07 | 7.46E−18 |
| R18 | Even aspheric | 0.00 | 8.82E−03 | 1.04E−04 | 6.37E−05 | −2.84E−05 | −7.21E−16 | −1.26E−17 |
| R19 | Even aspheric | 0.00 | −3.40E−03 | −1.57E−04 | −4.19E−05 | 4.64E−06 | −3.40E−07 | −4.79E−08 |
| R20 | Even aspheric | 0.00 | −4.17E−03 | −6.96E−06 | −3.41E−05 | 6.01E−06 | −6.98E−07 | 2.38E−08 |

In Table 12C, R1 to R20 indicate mirrors that are aspheric surfaces, K is a conic constant, and A2, A3, A4, A5, A6, and A7 are aspheric coefficients respectively. It can be seen from Table 12C that, in Embodiment 12, the first lens group 11, the second lens group 12, the third lens group 13, and the fourth lens group 14 of the zoom lens 10 include 16 aspheric surfaces in total.

TABLE 12D

| | W | M1 | M2 | T |
|---|---|---|---|---|
| a3 | 0.669 mm | 2.344 mm | 3.058 mm | 5.374 mm |
| a6 | 5.205 mm | 3.529 mm | 2.815 mm | 0.500 mm |
| a9 | 0.347 mm | 0.148 mm | 0.347 mm | 4.768 mm |
| a12 | 6.450 mm | 6.650 mm | 6.450 mm | 2.030 mm |

Table 12D indicates spacings between the first lens group 11 to the fourth lens group 14 when the zoom lens 10 is in the wide-angle state, the first intermediate focal length state, the second intermediate focal length state, and the telephoto state.

Figure 26:
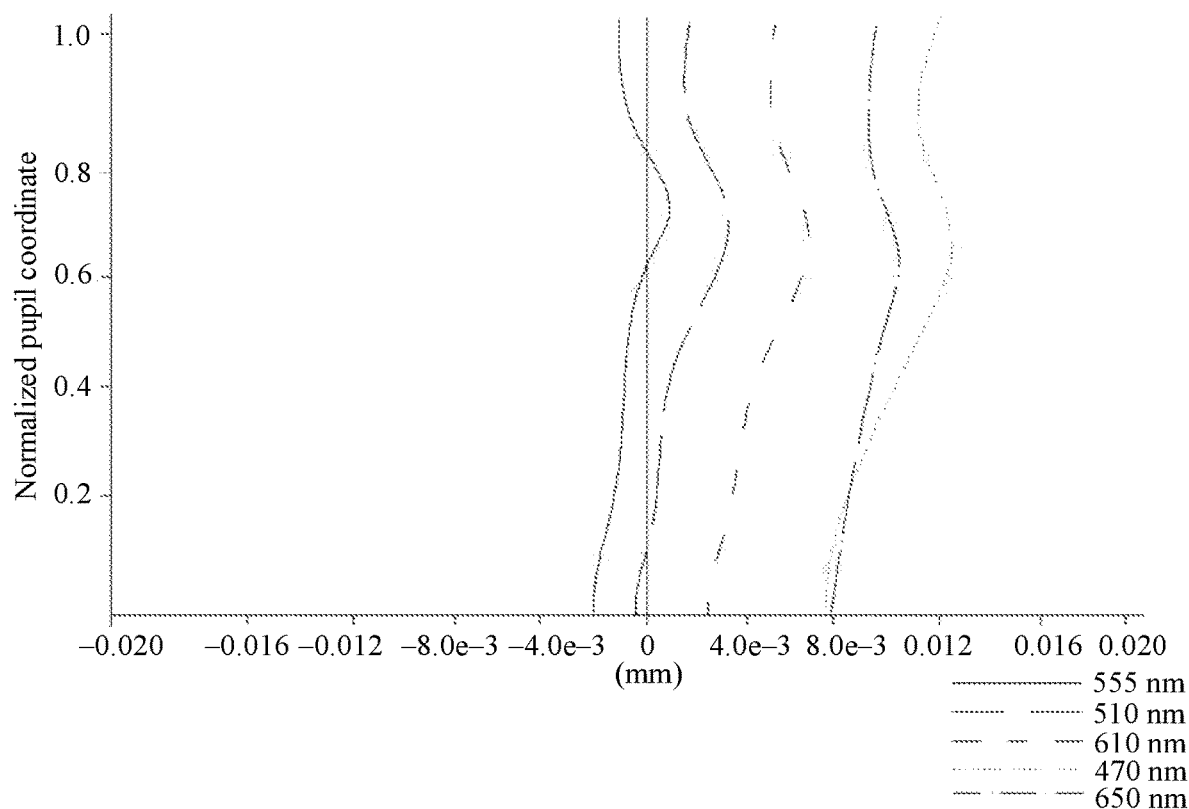
FIG. 26 shows axial chromatic aberration curves of the zoom lens in the wide-angle state according to an embodiment of this application.

FIG. 26 shows axial chromatic aberration curves of the zoom lens 10 at the wide-angle end at different wavelengths. It can be seen from FIG. 26 that, in Embodiment 12, an axial chromatic aberration of the zoom lens 10 using the foregoing technical parameters can be controlled within a small change range from 0.017 mm to 0.04 mm.

Figure 40:
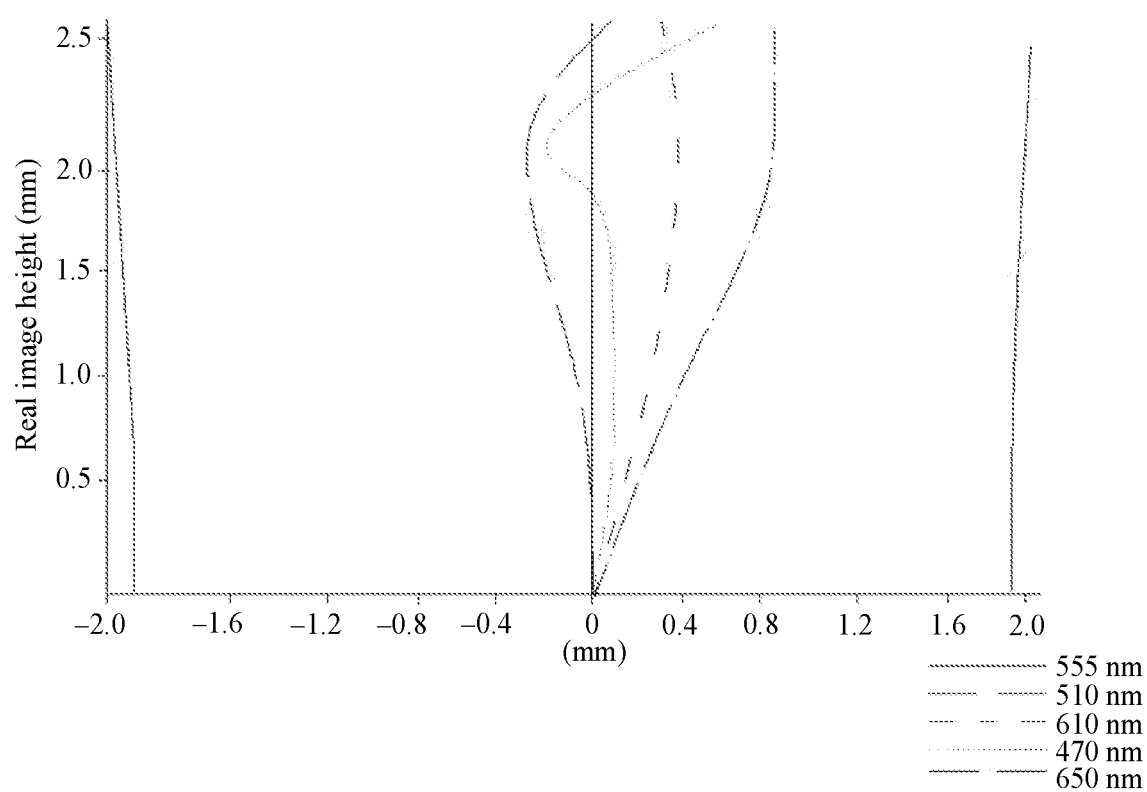
FIG. 40 shows lateral chromatic aberration curves of the zoom lens in the wide-angle state according to an embodiment of this application.

FIG. 40 shows lateral chromatic aberration curves of the zoom lens 10 at the wide-angle end at different wavelengths. It can be seen from FIG. 40 that, in Embodiment 12, lateral chromatic aberrations of the zoom lens 10 using the foregoing technical parameters at different wavelengths can be controlled around a lateral diffraction limit range.

Figure 54:
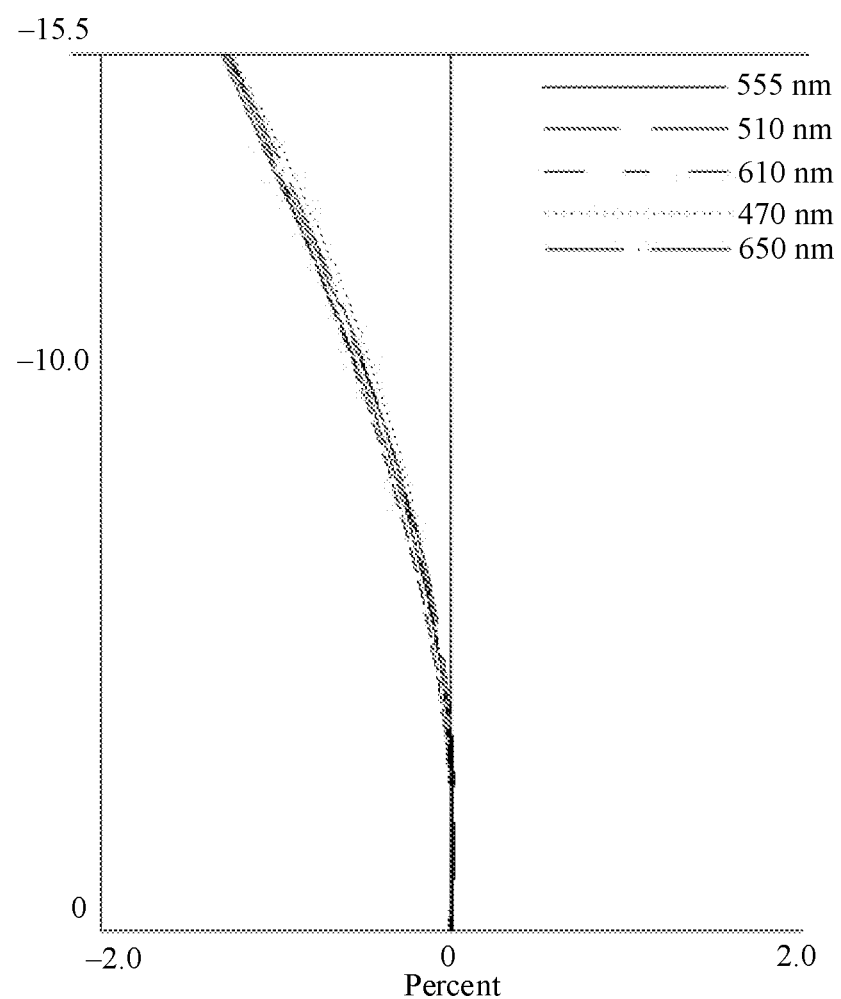
FIG. 54 shows distortion percentage curves of the zoom lens in the wide-angle state according to an embodiment of this application.

FIG. 54 shows distortion curves of the zoom lens 10 at the wide-angle end at different wavelengths. The distortion curve indicates a deviation between imaging deformation and an ideal shape. It can be seen from FIG. 54 that, in Embodiment 12, a distortion rate of the zoom lens 10 using the foregoing technical parameters can be effectively controlled below 1.8%.

Embodiment 13

In this embodiment, ratios of focal lengths of the first lens group 11, the second lens group 12, the third lens group 13, and the fourth lens group 14 to a focal length at the telephoto end of the zoom lens 10 are determined to be 18.471, 6.07, 7.38, and 59.53 respectively.

When the zoom lens 10 changes from the wide-angle end to the telephoto end, the first lens group 11 and the third lens group 13 are fastened, the second lens group 12 moves towards the image side, and the fourth lens group 14 first moves towards the image side and then moves towards the object side.

The maximum clear aperture diameter of the zoom lens 10, namely, a maximum diameter of a lens in the zoom lens 10, is determined to be 8 mm.

In this case, the first lens group 11 and the third lens group 13 each have two lenses arranged from the object side to the image side along the optical axis, the second lens group 12 has three lenses arranged, and the fourth lens group 14 has one lens arranged. The first lens group 11, the second lens group 12, the third lens group 13, and the fourth lens group 14 include 14 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 1.182, and a ratio of an image height of the zoom lens 10 to the effective focal length at the telephoto end of the zoom lens 10 is determined to be 0.186.

When the zoom lens 10 changes from the wide-angle end to the telephoto end, a ratio of a movement distance of the second lens group 12 along the optical axis to the total optical length of the zoom lens 10 is determined to be 0.1687, and a ratio of a movement distance of the fourth lens group 14 along the optical axis to the total optical length of the zoom lens is determined to be 0.1971.

After the foregoing parameters are used, technical effect that can be achieved by the zoom lens 10 is shown in Table 13A to Table 13D.

TABLE 13A

|  | W | M1 | M2 | T |
|---|---|---|---|---|
| Focal length (mm) | 11.000 | 14.000 | 18.000 | 22.000 |
| F-number | 3.201 | 3.188 | 3.136 | 3.199 |
| Image height IMH (mm) | 4.100 | 4.100 | 4.100 | 4.100 |
| Half FOV (°) | 20.726 | 16.327 | 12.720 | 10.331 |

TABLE 13A-continued

|  | W | M1 | M2 | T |
|---|---|---|---|---|
| BFL (mm) | 10.241 | 6.913 | 5.117 | 8.355 |
| TTL (mm) | 26.000 | 26.000 | 26.000 | 26.000 |
| Designed wavelength | 650 nm, 610 nm, 555 nm, 510 nm, and 470 nm | | | |

Table 13A indicates basic optical parameters of the zoom lens 10 at the wide-angle end, the first intermediate focal length, the second intermediate focal length, and the telephoto end. It can be seen from Table 13A that when the image height and TTL remain unchanged, both the focal length and the F-number increase. The zoom lens 10 shows a typical feature of implementing a focal length change from zoom from the wide-angle end to the telephoto end.

TABLE 13B

|  | R | Thickness | | nd | | vd |
|---|---|---|---|---|---|---|
| R1 | 7.971 | d1 | 1.727 | n1 | 1.59 | v1 | 67.0 |
| R2 | −50.037 | a1 | 0.134 | | | | |
| R3 | −91.490 | d2 | 0.403 | n2 | 1.82 | v2 | 24.1 |
| R4 | 31.999 | a2 | 0.516 | | | | |
| R5 | −11.427 | d3 | 0.420 | n3 | 1.54 | v3 | 56.0 |
| R6 | 9.057 | a3 | 1.243 | | | | |
| R7 | 9.845 | d4 | 0.329 | n4 | 1.54 | v4 | 56.0 |
| R8 | 3.403 | a4 | 0.114 | | | | |
| R9 | 3.753 | d5 | 0.645 | n5 | 1.67 | v5 | 19.2 |
| R10 | 5.472 | a5 | 5.127 | | | | |
| R11 | 4.470 | d6 | 1.631 | n6 | 1.54 | v6 | 56.0 |
| R12 | −6.069 | a6 | 0.408 | | | | |
| R13 | −5.357 | d7 | 1.400 | n7 | 1.67 | v7 | 19.2 |
| R14 | −13.730 | a7 | 0.688 | | | | |
| R15 | 5.897 | d8 | 0.974 | n8 | 1.54 | v8 | 56.0 |
| R16 | 4.701 | a8 | 9.269 | | | | |
| R17 | Infinity | d9 | 0.252 | n9 | 1.52 | v9 | 64.2 |
| R18 | Infinity | a9 | 0.720 | | | | |

Table 13B indicates a curvature, a thickness, a refractive index, and an abbe coefficient of each lens from the object side to the image side when the zoom lens 10 is at the wide-angle end. R1 to R16 indicate surfaces from the object side to the image side of each lens.

TABLE 13C

| | | Aspheric coefficient | | | | | | |
|---|---|---|---|---|---|---|---|---|
| | Type | K | A2 | A3 | A4 | A5 | A6 | A7 |
| R1 | Even aspheric | 0.00 | 1.88E−05 | −8.09E−07 | −6.13E−08 | 4.03E−09 | 2.06E−11 | 1.88E−05 |
| R2 | Even aspheric | 0.00 | 1.38E−04 | −5.90E−06 | 2.61E−07 | −3.68E−09 | 0.00E+00 | 1.38E−04 |
| R5 | Even aspheric | 0.00 | 1.17E−02 | −8.91E−04 | 6.42E−05 | −3.05E−06 | 1.29E−07 | 1.17E−02 |
| R6 | Even aspheric | 0.00 | 5.74E−03 | 6.03E−04 | −1.37E−04 | 1.44E−05 | −3.91E−07 | 5.74E−03 |
| R7 | Even aspheric | 0.00 | −2.25E−02 | 1.35E−03 | −2.17E−05 | −2.11E−06 | −3.87E−07 | −2.25E−02 |
| R8 | Even aspheric | 0.00 | −1.23E−02 | −9.25E−04 | 1.25E−04 | −3.10E−06 | −1.67E−07 | −1.23E−02 |
| R9 | Even aspheric | 0.00 | −1.20E−02 | 5.84E−06 | −1.37E−05 | −5.93E−06 | 7.74E−07 | −1.20E−02 |
| R10 | Even aspheric | 0.00 | −1.83E−02 | 1.91E−03 | −1.55E−04 | −2.50E−06 | 6.51E−07 | −1.83E−02 |
| R11 | Even aspheric | 0.00 | −1.11E−04 | −3.82E−05 | −4.44E−06 | 5.38E−07 | −9.53E−08 | −1.11E−04 |
| R12 | Even aspheric | 0.00 | 2.85E−03 | 4.26E−05 | −8.90E−07 | −3.03E−07 | −3.38E−09 | 2.85E−03 |
| R13 | Even aspheric | 0.00 | 5.68E−03 | 2.38E−04 | −2.22E−05 | 1.47E−06 | 0.00E+00 | 5.68E−03 |

TABLE 13C-continued

| | | | | | Aspheric coefficient | | | |
|---|---|---|---|---|---|---|---|---|
| | Type | K | A2 | A3 | A4 | A5 | A6 | A7 |
| R14 | Even aspheric | 0.00 | 5.13E−03 | 3.23E−04 | −1.23E−05 | 3.07E−06 | 0.00E+00 | 5.13E−03 |
| R15 | Even aspheric | 0.00 | −1.57E−03 | −2.00E−05 | 3.12E−06 | −2.94E−07 | 9.40E−09 | −1.57E−03 |
| R16 | Even aspheric | 0.00 | −2.19E−03 | −5.20E−05 | 5.36E−06 | −5.52E−07 | 1.64E−08 | −2.19E−03 |

In Table 13C, R1 to R16 indicate mirrors that are aspheric surfaces, K is a conic constant, and A2, A3, A4, A5, A6, and A7 are aspheric coefficients respectively. It can be seen from Table 13C that, in Embodiment 13, the first lens group 11, the second lens group 12, the third lens group 13, and the fourth lens group 14 of the zoom lens 10 include 14 aspheric surfaces in total.

TABLE 13D

| | W | M1 | M2 | T |
|---|---|---|---|---|
| a2 | 0.516 mm | 2.214 mm | 3.888 mm | 4.903 mm |
| a5 | 5.127 mm | 3.430 mm | 1.756 mm | 0.741 mm |
| a7 | 0.688 mm | 4.016 mm | 5.812 mm | 2.575 mm |
| a8 | 9.269 mm | 5.941 mm | 4.145 mm | 7.383 mm |

Table 13D indicates spacings between the first lens group 11 to the fourth lens group 14 when the zoom lens 10 is in the wide-angle state, the first intermediate focal length state, the second intermediate focal length state, and the telephoto state.

Figure 27:
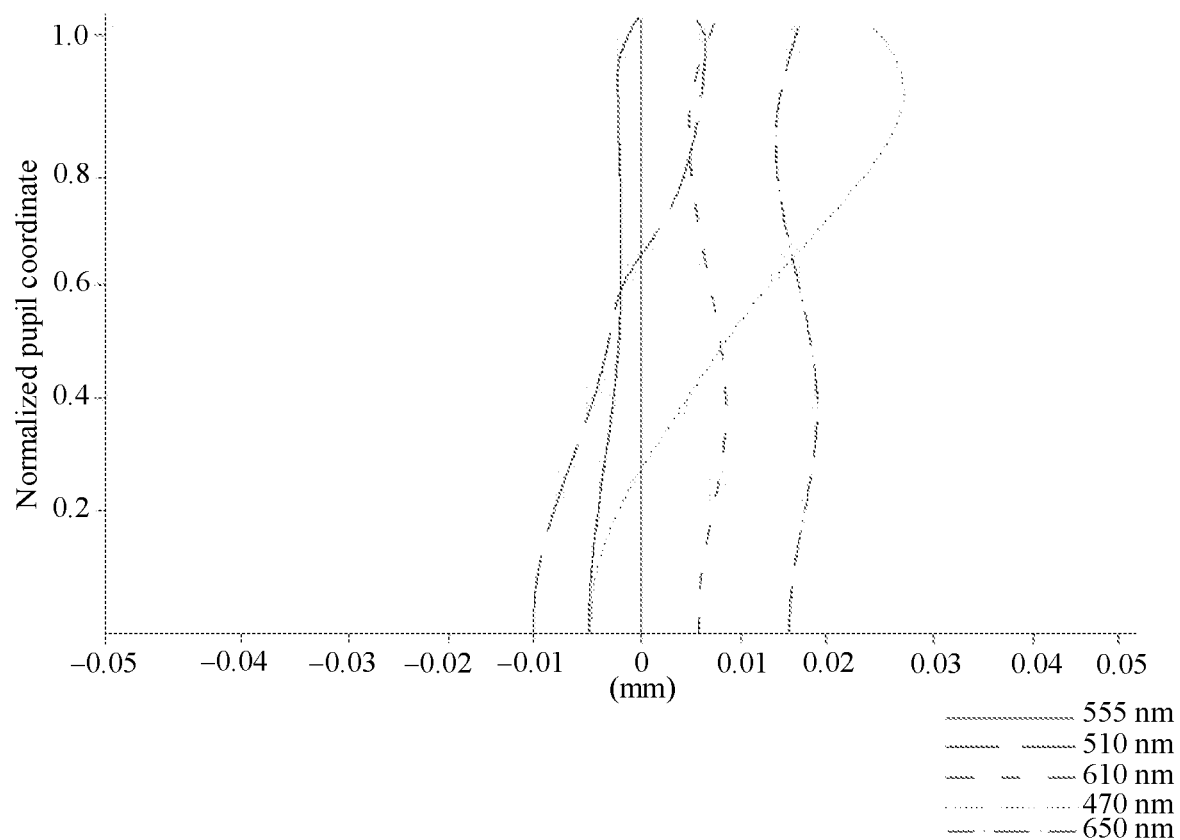
FIG. 27 shows axial chromatic aberration curves of the zoom lens in the wide-angle state according to an embodiment of this application.

FIG. 27 shows axial chromatic aberration curves of the zoom lens 10 at the wide-angle end at different wavelengths. It can be seen from FIG. 27 that, in Embodiment 13, an axial chromatic aberration of the zoom lens 10 using the foregoing technical parameters can be controlled within a small change range from 0.015 mm to 0.025 mm.

Figure 41:
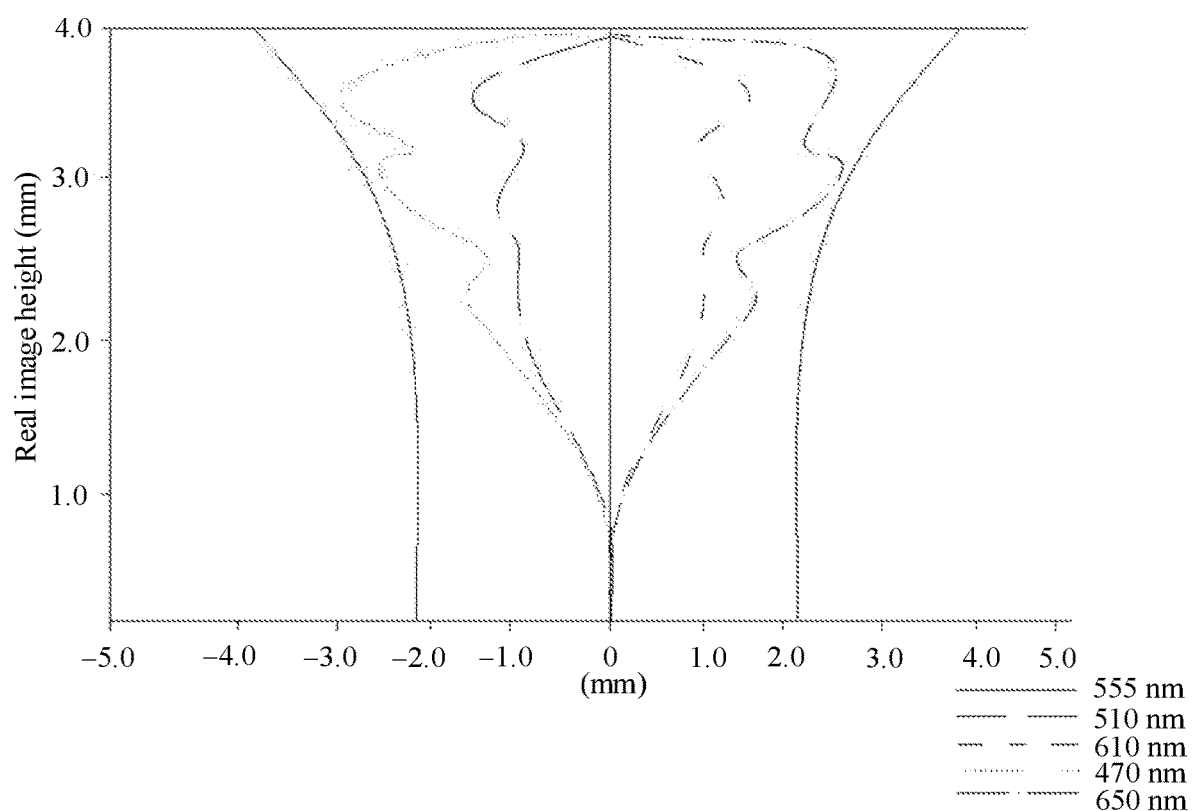
FIG. 41 shows lateral chromatic aberration curves of the zoom lens in the wide-angle state according to an embodiment of this application.

FIG. 41 shows lateral chromatic aberration curves of the zoom lens 10 at the wide-angle end at different wavelengths. It can be seen from FIG. 41 that, in Embodiment 13, for lateral chromatic aberrations of the zoom lens 10 using the foregoing technical parameters at the wide-angle end and the telephoto end at different wavelengths, a light ray with a wavelength of 650 nm and a light ray with a wavelength of 470 nm exceeds lateral diffraction limits.

Figure 55:
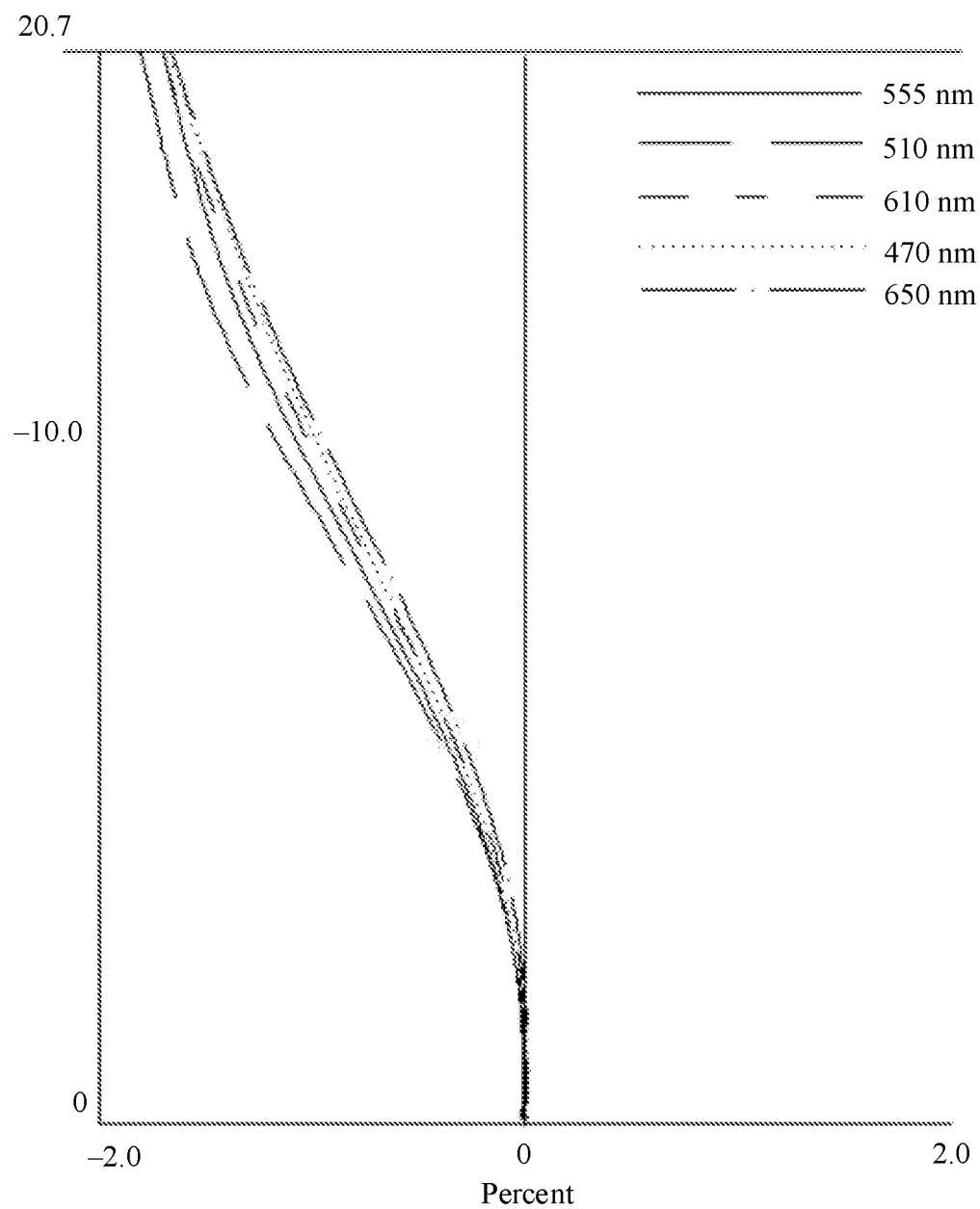
FIG. 55 shows distortion percentage curves of the zoom lens in the wide-angle state according to an embodiment of this application.

FIG. 55 shows distortion curves of the zoom lens 10 at the wide-angle end at different wavelengths. The distortion curve indicates a deviation between imaging deformation and an ideal shape. It can be seen from FIG. 55 that, in Embodiment 13, a distortion rate of the zoom lens 10 using the foregoing technical parameters can be effectively controlled below 3.8%.

Embodiment 14

In this embodiment, ratios of focal lengths of the first lens group 11, the second lens group 12, the third lens group 13, and the fourth lens group 14 to a focal length at the telephoto end of the zoom lens 10 are determined to be 19.17, 6.30, 9.26, and 14.16 respectively.

When the zoom lens 10 changes from the wide-angle end to the telephoto end, the first lens group 11 and the third lens group 13 are fastened, the second lens group 12 moves towards the image side, and the fourth lens group 14 first moves towards the image side and then moves towards the object side.

The maximum clear aperture diameter of the zoom lens 10, namely, a maximum diameter of a lens in the zoom lens 10, is determined to be 8.4 mm.

In this case, the first lens group 11, the second lens group 12, and the fourth lens group 14 each have two lenses arranged from the object side to the image side along the optical axis, and the third lens group 13 has three lenses arranged. The first lens group 11, the second lens group 12, the third lens group 13, and the fourth lens group 14 include 16 aspheric surfaces in total. A lens facing the object side in the first lens group 11 is a biconvex lens with positive refractive power.

A ratio of a total optical length of the zoom lens 10 to an effective focal length at the telephoto end of the zoom lens 10 is determined to be 1.21, and a ratio of an image height of the zoom lens 10 to the effective focal length at the telephoto end of the zoom lens 10 is determined to be 0.16.

When the zoom lens 10 changes from the wide-angle end to the telephoto end, a ratio of a movement distance of the second lens group 12 along the optical axis to the total optical length of the zoom lens is determined to be 0.1645, and a ratio of a movement distance of the fourth lens group 14 along the optical axis to the total optical length of the zoom lens is determined to be 0.0477.

After the foregoing parameters are used, technical effect that can be achieved by the zoom lens 10 is shown in Table 14A to Table 14D.

TABLE 14A

| | W | M1 | M2 | T |
|---|---|---|---|---|
| Focal length (mm) | 11.000 | 14.000 | 17.999 | 22.000 |
| F-number | 3.097 | 3.139 | 3.146 | 3.087 |
| Image height IMH (mm) | 3.500 | 3.500 | 3.500 | 3.500 |
| Half FOV (°) | 18.044 | 13.901 | 10.695 | 8.693 |
| BFL (mm) | 6.629 | 7.449 | 7.966 | 7.901 |
| TTL (mm) | 26.653 | 26.653 | 26.653 | 26.653 |
| Designed wavelength | 650 nm, 610 nm, 555 nm, 510 nm, and 470 nm | | | |

Table 14A indicates basic optical parameters of the zoom lens 10 at the wide-angle end, the first intermediate focal length, the second intermediate focal length, and the telephoto end. It can be seen from Table 14A that when the image height and TTL remain unchanged, both the focal length and the F-number increase. The zoom lens 10 shows a typical feature of implementing a focal length change from zoom from the wide-angle end to the telephoto end.

TABLE 14B

|  | R | Thickness |  | nd |  | vd |
|---|---|---|---|---|---|---|
| R1 | 13.091 | d1 | 1.456 | n1 | 1.50 | v1 | 80.1 |
| R2 | −16.156 | a1 | 0.196 |  |  |  |  |
| R3 | 506.663 | d2 | 0.360 | n2 | 1.92 | v2 | 18.9 |
| R4 | 50.304 | a2 | 2.855 |  |  |  |  |
| R5 | −7.705 | d3 | 0.360 | n3 | 1.54 | v3 | 56.0 |
| R6 | 3.822 | a3 | 0.074 |  |  |  |  |
| R7 | 3.811 | d4 | 0.697 | n4 | 1.67 | v4 | 19.2 |
| R8 | 5.626 | a4 | 3.322 |  |  |  |  |
| R9 | 4.656 | d5 | 1.334 | n5 | 1.54 | v5 | 56.0 |
| R10 | −12.005 | a5 | 0.127 |  |  |  |  |
| R11 | 5.824 | d6 | 0.775 | n6 | 1.54 | v6 | 56.0 |
| R12 | 6.760 | a6 | 0.462 |  |  |  |  |
| R13 | −254.810 | d7 | 0.666 | n7 | 1.66 | v7 | 20.4 |
| R14 | 5.790 | a7 | 1.031 |  |  |  |  |
| R15 | 4.516 | d8 | 1.253 | n8 | 1.54 | v8 | 56.0 |
| R16 | 4.176 | a8 | 2.708 |  |  |  |  |
| R17 | 12.164 | d9 | 1.527 | n9 | 1.75 | v9 | 43.2 |
| R18 | −50.935 | a9 | 6.477 |  |  |  |  |
| R19 | Infinity | d10 | 0.252 | n10 | 1.52 | v10 | 64.2 |
| R20 | Infinity | a10 | 0.720 |  |  |  |  |

Table 14B indicates a curvature, a thickness, a refractive index, and an abbe coefficient of each lens from the object side to the image side when the zoom lens 10 is at the wide-angle end. R1 to R16 indicate surfaces from the object side to the image side of each lens, R indicates a curvature, Thickness indicates a thickness, nd indicates a refractive index, and vd indicates an abbe coefficient.

TABLE 14C

| | | | Aspheric coefficient | | | | | |
|---|---|---|---|---|---|---|---|---|
|  | Type | K | A2 | A3 | A4 | A5 | A6 | A7 |
| R1 | Even aspheric | 0.00 | 1.41E−05 | −2.57E−06 | 8.51E−07 | −9.90E−08 | 5.13E−09 | −9.84E−11 |
| R2 | Even aspheric | 0.00 | 1.96E−04 | 3.51E−06 | −4.36E−07 | 1.58E−08 | 1.47E−10 | −1.47E−11 |
| R5 | Even aspheric | 0.00 | 4.95E−04 | 5.55E−05 | −6.36E−06 | 5.03E−07 | −1.00E−08 | −8.15E−10 |
| R6 | Even aspheric | 0.00 | −1.68E−03 | −1.58E−04 | −8.90E−06 | 3.13E−07 | 6.61E−08 | 1.15E−08 |
| R7 | Even aspheric | 0.00 | −2.36E−03 | −1.75E−04 | −1.44E−05 | −4.78E−08 | −8.32E−08 | 5.29E−09 |
| R8 | Even aspheric | 0.00 | −1.90E−03 | 1.10E−05 | −1.41E−05 | −2.29E−08 | −1.20E−07 | −5.45E−09 |
| R9 | Even aspheric | 0.00 | −7.76E−04 | 3.73E−05 | 6.73E−09 | −9.85E−08 | −7.19E−09 | 2.53E−10 |
| R10 | Even aspheric | 0.00 | 1.43E−03 | −2.65E−05 | 2.44E−06 | −2.06E−07 | −1.17E−09 | −3.68E−10 |
| R11 | Even aspheric | 0.00 | 1.70E−04 | −5.32E−05 | −3.68E−06 | −3.12E−07 | 1.33E−07 | −1.19E−08 |
| R12 | Even aspheric | 0.00 | −9.64E−04 | −6.74E−05 | −2.87E−06 | 7.08E−07 | 1.81E−07 | −2.11E−08 |
| R13 | Even aspheric | 0.00 | 2.25E−03 | −3.08E−04 | 2.40E−05 | −1.19E−06 | 1.55E−07 | −1.86E−08 |
| R14 | Even aspheric | 0.00 | 3.83E−03 | −1.54E−04 | 3.31E−05 | −1.98E−06 | 1.36E−07 | −5.59E−18 |
| R15 | Even aspheric | 0.00 | −1.67E−03 | −3.05E−05 | 1.19E−05 | −2.20E−06 | 6.19E−08 | 3.12E−09 |
| R16 | Even aspheric | 0.00 | −1.79E−03 | 2.06E−05 | 1.17E−05 | −7.47E−07 | −2.23E−07 | 1.51E−08 |
| R17 | Even aspheric | 0.00 | −3.68E−04 | 2.22E−05 | 1.77E−06 | 5.09E−07 | −1.70E−08 | 0.00E+00 |
| R18 | Even aspheric | 0.00 | −2.00E−04 | −2.77E−08 | 3.58E−06 | 3.20E−08 | 1.79E−08 | 0.00E+00 |

In Table 14C, R1 to R18 indicate mirrors that are aspheric surfaces, K is a conic constant, and A2, A3, A4, A5, A6, and A7 are aspheric coefficients respectively. It can be seen from Table 14C that, in Embodiment 14, the first lens group 11, the second lens group 12, the third lens group 13, and the fourth lens group 14 of the zoom lens 10 include 16 aspheric surfaces in total.

TABLE 14D

|  | W | M1 | M2 | T |
|---|---|---|---|---|
| a2 | 1.293 mm | 2.855 mm | 4.401 mm | 5.677 mm |
| a4 | 4.884 mm | 3.322 mm | 1.775 mm | 0.500 mm |
| a6 | 1.851 mm | 1.031 mm | 0.514 mm | 0.579 mm |
| a7 | 5.657 mm | 6.477 mm | 6.994 mm | 6.929 mm |

Table 14D indicates spacings between the first lens group 11 to the fourth lens group 14 when the zoom lens 10 is in the wide-angle state, the first intermediate focal length state, the second intermediate focal length state, and the telephoto state.

Figure 28:
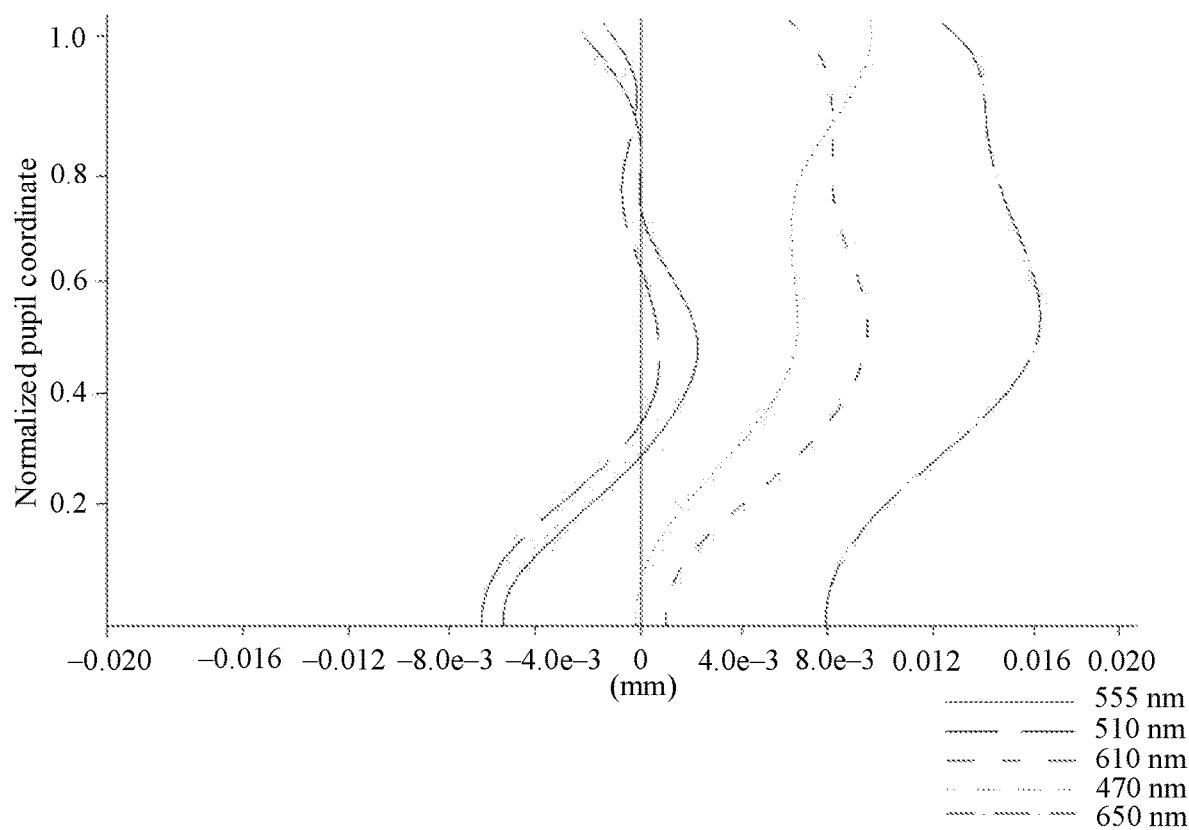
FIG. 28 shows axial chromatic aberration curves of the zoom lens in the wide-angle state according to an embodiment of this application.

FIG. 28 shows axial chromatic aberration curves of the zoom lens 10 at the wide-angle end at different wavelengths. It can be seen from FIG. 28 that, in Embodiment 14, an axial chromatic aberration of the zoom lens 10 using the foregoing technical parameters can be controlled within a small change range from 0.015 mm to 0.025 mm.

Figure 42:
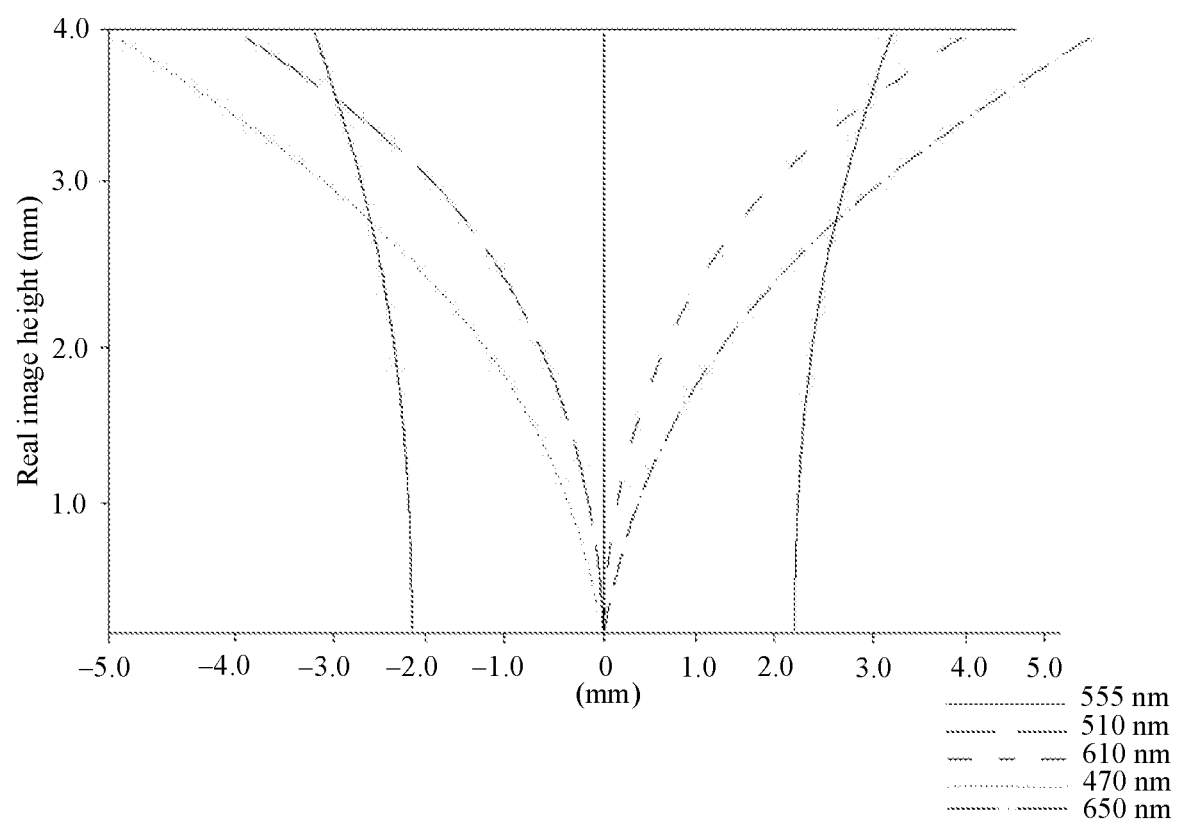
FIG. 42 shows lateral chromatic aberration curves of the zoom lens in the wide-angle state according to an embodiment of this application.

FIG. 42 shows lateral chromatic aberration curves of the zoom lens 10 at the wide-angle end at different wavelengths. It can be seen from FIG. 42 that, in Embodiment 2, for lateral chromatic aberrations of the zoom lens 10 using the foregoing technical parameters at the wide-angle end and the telephoto end at different wavelengths, a light ray with a wavelength of 650 nm and a light ray with a wavelength of 470 nm exceeds lateral diffraction limits.

FIG. 56 shows distortion curves of the zoom lens 10 at the wide-angle end at different wavelengths. The distortion curve indicates a deviation between imaging deformation and an ideal shape. It can be seen from FIG. 56 that, in Embodiment 2, a distortion rate of the zoom lens 10 using the foregoing technical parameters can be effectively controlled below 3.8%.

The foregoing descriptions are embodiments of this application, and are not intended to limit this application. Any modification, equivalent replacement, or improvement made without departing from the principle of this application should fall within the protection scope of this application.

What is claimed is:

1. A zoom lens, comprising:
a first lens group comprising lenses, wherein the first lens group is fixedly disposed along an object side of an optical axis, wherein a first lens of the lenses is a biconvex lens, and wherein at least two lenses of the lenses are glass lenses;
a second lens group adjacent to the first lens group and disposed along the optical axis, wherein the second lens group is configured to move along the optical axis;
a third lens group fixedly disposed and adjacent to the second lens group along the optical axis; and
a fourth lens group adjacent to the third lens group and disposed along the optical axis, wherein the fourth lens group is a compensation group and is configured to move along the optical axis,
wherein the first lens group, the second lens group, the third lens group, and the fourth lens group are sequentially arranged from the object side to an image side along the optical axis,
wherein the first lens group, the third lens group, and the fourth lens group have a positive focal power, and wherein the second lens group has a negative focal power,
wherein the second lens group is a focusing group and the fourth lens group is a compensation group that is configured to move along the optical axis with the second lens group, or the fourth lens group is a focusing group and the second lens group is a compensation group that is configured to move along the optical axis with the fourth lens group,
wherein a maximum clear aperture diameter of the zoom lens meets the following relationship: 4 millimeters (mm)≤φ≤12 mm, and
wherein φ is the maximum clear aperture diameter of the zoom lens.

2. The zoom lens of claim 1, wherein the zoom lens comprises a telephoto end, wherein the zoom lens meets the following relationship: 0.8≤TTL/ft≤1.5, wherein TTL is a total optical length of the zoom lens, and wherein ft is an effective focal length at the telephoto end of the zoom lens.

3. The zoom lens of claim 1, wherein the zoom lens meets the following relationship: 0.02≤TTL/ft≤0.2, wherein IMH is a height from an imaging edge to a center of an imaging plane of a lens of the zoom lens, and wherein ft is an effective focal length at a telephoto end of the zoom lens.

4. The zoom lens of claim 1, further comprising a telephoto end, wherein the first lens group meets the following relationship: 0.2≤f1/ft≤2.3, wherein f1 is a focal length of the first lens group, and wherein ft is an effective focal length at the telephoto end.

5. The zoom lens of claim 1, further comprising a telephoto end, wherein the second lens group meets the following relationship: 0.02≤f2/ft≤0.6, wherein f2 is a focal length of the second lens group, and wherein ft is an effective focal length at the telephoto end.

6. The zoom lens of claim 1, further comprising a telephoto end, wherein the third lens group meets the following relationship: 0.1≤f3/ft≤4.5, wherein f3 is a focal length of the third lens group, and wherein ft is an effective focal length at the telephoto end.

7. The zoom lens of claim 1, further comprising a telephoto end, wherein the fourth lens group meets the following relationship: 0.12≤f4/ft≤200, wherein f4 is a focal length of the fourth lens group, and wherein ft is an effective focal length at the telephoto end.

8. The zoom lens of claim 1, further comprising a telephoto end and a wide-angle end, wherein a ratio of a first effective focal length at the telephoto end (fw) to a second effective focal length at the wide-angle end (fw) meets the following relationship: 1≤ft/fw≤3.7.

9. The zoom lens of claim 1, wherein a first ratio of a movement distance of the second lens group along the optical axis (D1) to a total optical length of the zoom lens (TTL) meets the following relationship: 0.02≤D1/TTL≤0.3, and wherein a second ratio of a movement distance of the fourth lens group along the optical axis (D2) to the TTL meets the following relationship: 0.02≤D2/TTL≤0.35.

10. The zoom lens of claim 1, wherein a total quantity of lenses comprised in the first lens group, the second lens group, the third lens group, and the fourth lens group (N) meets the following relationship: 7≤N≤12.

11. The zoom lens of claim 10, wherein a total quantity of aspheric surfaces of the lenses comprised in the first lens group, the second lens group, the third lens group, and the fourth lens group(S) meets the following relationship: N≤S≤2N.

12. A camera module, comprising:
a zoom lens, comprising:
a first lens group comprising lenses, wherein the first lens group is fixedly disposed along an object side of an optical axis, wherein a first lens of the lenses is a biconvex lens, and wherein at least two lenses of the lenses are glass lenses;
a second lens group adjacent to the first lens group and disposed along the optical axis, wherein the second lens group moves along the optical axis;
a third lens group fixedly disposed and adjacent to the second lens group along the optical axis; and
a fourth lens group adjacent to the third lens group and disposed along the optical axis, wherein the fourth lens group moves along the optical axis,
wherein the first lens group, the second lens group, the third lens group, and the fourth lens group are sequentially arranged from the object side to an image side along the optical axis,
wherein the first lens group, the third lens group, and the fourth lens group have a positive focal power, and wherein the second lens group has a negative focal power,
wherein the second lens group is a focusing group and the fourth lens group is a compensation group that is configured to move along the optical axis with the second lens group, or the fourth lens group is a focusing group and the second lens group is a compensation group that is configured to move along the optical axis with the fourth lens group,
wherein a maximum clear aperture diameter of the zoom lens meets the following relationship: 4 millimeters (mm)≤φ≤12 mm, and
wherein φ is the maximum clear aperture diameter of the zoom lens.

13. The camera module of claim 10, wherein the zoom lens comprises a telephoto end, wherein the zoom lens meets the following relationship: $0.8 \leq TTL/ft \leq 1.5$, wherein TTL is a total optical length of the zoom lens, and wherein ft is an effective focal length at a telephoto end of the zoom lens.

14. The camera module of claim 10, wherein the zoom lens meets the following relationship: $0.02 \leq IMH/ft \leq 0.2$, wherein IMH is a height from an imaging edge to a center of an imaging plane of a lens of the zoom lens, and wherein ft is an effective focal length at a telephoto end of the zoom lens.

15. A terminal device, comprising:
a camera module, wherein the camera module comprises a zoom lens, wherein the zoom lens comprises:
   a first lens group comprising lenses, wherein the first lens group is fixedly disposed along an object side of an optical axis, wherein a first lens of the lenses is a biconvex lens, and wherein at least two lenses of the lenses are glass lenses;
   a second lens group adjacent to the first lens group and disposed along the optical axis, wherein the second lens group is configured to move along the optical axis;
   a third lens group fixedly disposed and adjacent to the second lens group along the optical axis; and
   a fourth lens group adjacent to the third lens group and disposed along the optical axis, wherein the fourth lens group is a compensation group and is configured to move along the optical axis,
   wherein the first lens group, the second lens group, the third lens group, and the fourth lens group are sequentially arranged from the object side to an image side along the optical axis,
   wherein the first lens group, the third lens group, and the fourth lens group have a positive focal power, and wherein the second lens group has a negative focal power,
   wherein the second lens group is a focusing group and the fourth lens group is a compensation group that is configured to move along the optical axis with the second lens group, or the fourth lens group is a focusing group and the second lens group is a compensation group that is configured to move along the optical axis with the fourth lens group,
   wherein a maximum clear aperture diameter of the zoom lens meets the following relationship: 4 millimeters (mm)$\leq \varphi \leq$12 mm, and
   wherein $\varphi$ is the maximum clear aperture diameter of the zoom lens.

16. The terminal device of claim 15, wherein the zoom lens comprises a telephoto end, wherein the zoom lens meets the following relationship: $0.8 \leq TTL/ft \leq 1.5$, wherein TTL is a total optical length of the zoom lens, and wherein ft is an effective focal length at a telephoto end of the zoom lens.

17. The terminal device of claim 15, wherein the zoom lens meets the following relationship: $0.02 \leq IMH/ft \leq 0.2$, wherein IMH is a height from an imaging edge to a center of an imaging plane of a lens of the zoom lens, and wherein ft is an effective focal length at a telephoto end of the zoom lens.

18. The terminal device of claim 15, wherein the zoom lens further comprises a telephoto end, wherein the first lens group meets the following relationship: $0.2 \leq f1/ft \leq 2.3$, wherein f1 is a focal length of the first lens group, and wherein ft is an effective focal length at the telephoto end.

19. The terminal device of claim 15, wherein the zoom lens further comprises a telephoto end, wherein the second lens group meets the following relationship: $0.02 \leq f2/ft \leq 0.6$, wherein f2 is a focal length of the second lens group, and wherein ft is an effective focal length at the telephoto end.

20. The terminal device of claim 15, wherein the zoom lens further comprises a telephoto end, wherein the third lens group meets the following relationship: $0.1 \leq f3/ft \leq 4.5$, wherein f3 is a focal length of the third lens group, and wherein ft is an effective focal length at the telephoto end.

* * * * *